United States Patent [19]

Gieffers

[11] Patent Number: 5,296,840
[45] Date of Patent: Mar. 22, 1994

[54] PROGRAMMABLE EMERGENCY SIGNALLING SYSTEM FOR A VEHICLE

[75] Inventor: Ward J. Gieffers, Oak Lawn, Ill.

[73] Assignee: Federal Signal Corporation, University Park, Ill.

[21] Appl. No.: 529,207

[22] Filed: May 25, 1990

[51] Int. Cl.$^5$ .......................... B60Q 1/26; G08B 3/00
[52] U.S. Cl. ..................... 340/474; 340/468; 340/472; 340/815.69; 340/384.4
[58] Field of Search ............... 340/474, 472, 471, 468, 340/384 E, 326, 384 R

[56] References Cited

U.S. PATENT DOCUMENTS

| | | | |
|---|---|---|---|
| 3,125,742 | 3/1964 | Plowick | 340/472 |
| 3,868,684 | 2/1975 | Nunn, Jr. | 340/384 E |
| 4,040,050 | 8/1977 | Nunn, Jr. | 340/384 E |
| 4,054,869 | 10/1977 | Smith et al. | 340/384 E |
| 4,065,767 | 12/1977 | Neuhof et al. | 340/384 E |
| 4,075,624 | 2/1978 | Sheff | 340/384 E |
| 4,189,718 | 2/1980 | Carson et al. | 340/384 E |
| 4,280,123 | 7/1981 | Right et al. | 340/384 E |
| 4,326,276 | 4/1982 | Scott, Jr. | 340/384 E X |
| 4,375,061 | 2/1983 | Shoff | 340/384 E |
| 4,646,063 | 2/1987 | Carson | 340/384 E |
| 4,759,069 | 7/1988 | Bernstein et al. | 340/902 X |
| 4,831,357 | 5/1989 | Miller | 340/472 |
| 4,958,154 | 9/1990 | Luber et al. | 340/471 X |
| 4,980,837 | 12/1990 | Nunn et al. | 340/384 E X |

FOREIGN PATENT DOCUMENTS

| | | |
|---|---|---|
| 510393 | 12/1977 | Australia . |
| 35316/78 | 10/1979 | Australia . |
| 2222919A | 5/1989 | United Kingdom ............... 340/471 |
| 2222919 | 3/1990 | United Kingdom ............... 340/471 |

OTHER PUBLICATIONS

Brochure entitled "Unitrol Installation Manual, Series L, Siren/P.A. Systems," Dunbar-Nunn Corp., Anaheim, Calif. 92801 (Jan. 1988).
Catalog entitled "Model WS-295MP Electronic Siren Series," Whelen Engineering Company, Inc., Chester, Conn. 06412 (Jan. 1986).
Federal Signal Corp. Catalog for Model PA300* 012 MSB Electronic Siren (Installation and Service Instructions (1989)).
Federal Signal Corp. Catalog for Models PA2050 and PA2100 (Installation and Service Instructions (1988)).
Federal Signal Corp. Catalog for Model PA500L* Electronic Siren (Installation and Service Instructions (1989)).
Pages 2-1 and 2-2 from General Electric Manual entitled "S-825 ®" Series Control Unit (Programming Guide) (Model TQ3337), General Electric Company (Apr., 1989).

Primary Examiner—Donnie L. Crosland
Attorney, Agent, or Firm—Leydig, Voit & Mayer

[57] ABSTRACT

A signalling system is provided that is alternatively operable in programming and operating modes. The signalling system includes a keypad, control head, control unit and a plurality of signalling features selectively activated by the control unit in the operating mode. The system provides for keystrokes to the keypad placing the system in the programming mode and selecting the signalling features to be activated by the control unit in the operating mode.

34 Claims, 13 Drawing Sheets

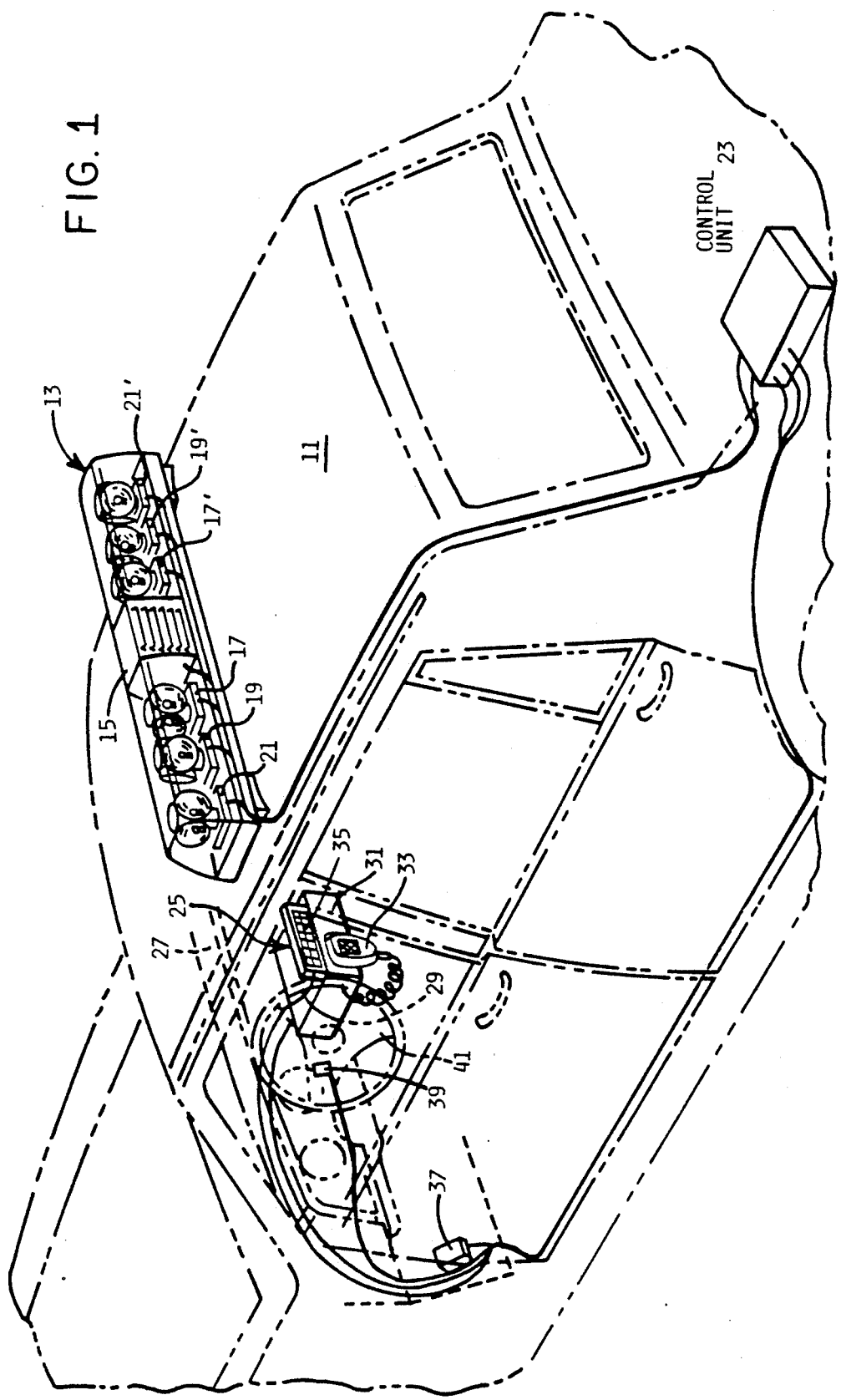

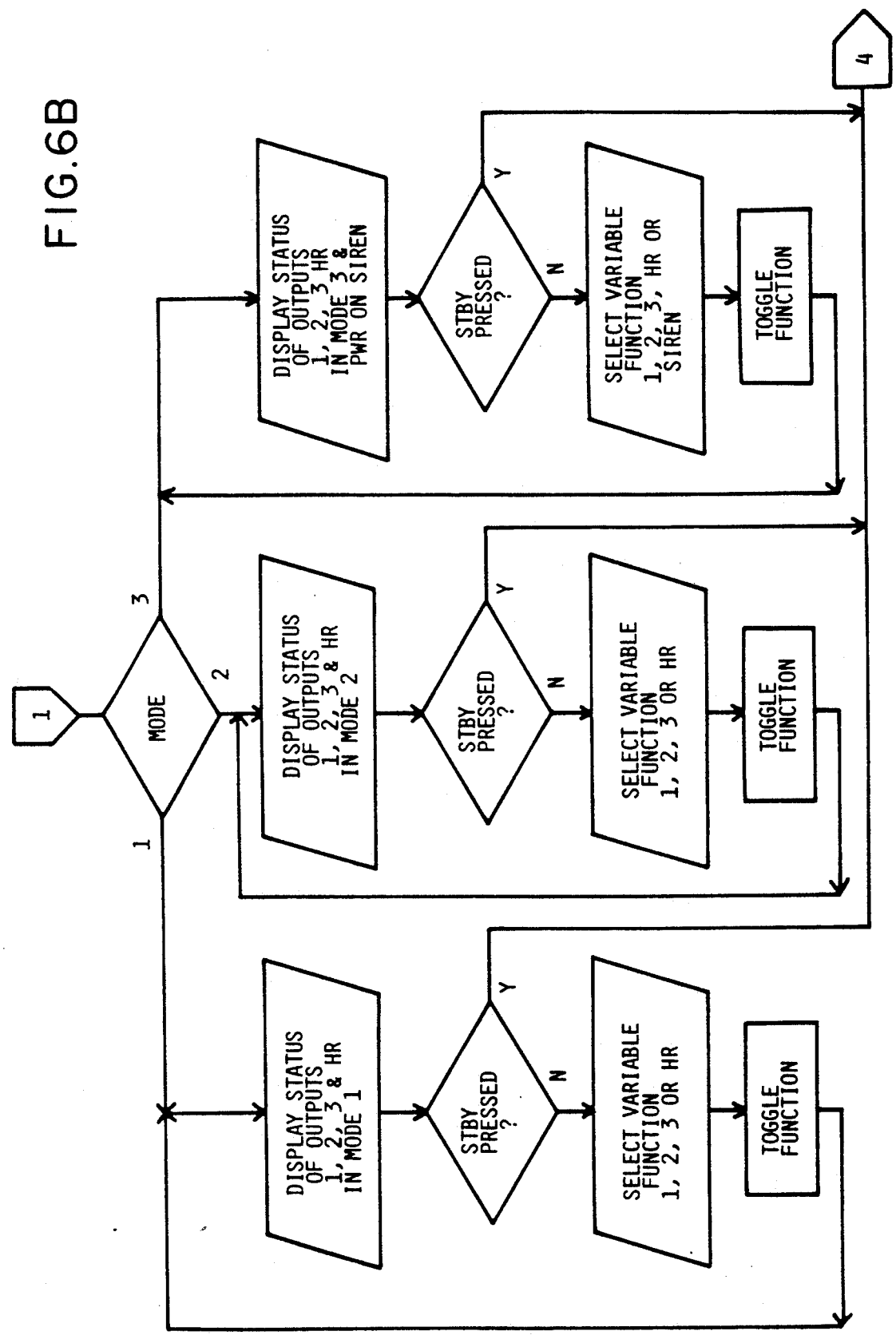

PROGRAMMABLE EMERGENCY SIGNALLING SYSTEM FOR A VEHICLE

TECHNICAL FIELD OF THE INVENTION

The invention relates to emergency signalling systems of the type used in conjunction with emergency vehicles such as police cars, fire engines, ambulances and the like to alert others to the approach of such vehicles.

BACKGROUND

Typically, emergency signalling systems include a plurality of signalling devices. For example, a system may include a siren/speaker and primary and secondary visual indicators such as rotating and flashing lights and auxiliary lights such as take-down lights, alley lights and headlight flashers. Different combinations of these devices are simultaneously operated in order to create signalling schemes of different types. Each type is usually designed for use in a particular category of emergency situations. For example, when a vehicle incorporating the system is stopped on the side of a road in order to help a disabled vehicle, operation of only the flashing lights may be appropriate. When pursuing a vehicle, maximum signalling is required and the primary visual indicators (rotators) and a siren may be added to the flashing lights. A non-pursuit-type emergency may call for the primary visual indicators and the flashing lights, but no siren.

So the operator of the emergency vehicle does not have to configure his/her own emergency signalling each time the system is used, each system is typically designed to operate in one of a plurality of selectable "operating modes." Using the example of the previous paragraph, a first operating mode may operate the system with flashing lights only. A second operating mode may operate the flashing lights and the rotating lights. A third run mode may operate all of the flashing lights, rotating lights and the siren/speaker.

Designating the functions of each operating mode, however, restricts the versatility of the system and prevents an operator from tailoring the various operating modes to the needs of his/her particular application and environment. In order to provide some versatility to the system, it is known to provide dip switches on the circuit boards of the system that allow selected signalling features to be enabled for each operating mode. Unfortunately, the dip switches are not easily accessible and require a service technician to partially disassemble an installed system if the operating modes are to be changed. Moreover, they are expensive and require considerable space. In order to provide any significant amount of system versatility, a large number of the switches would be required, thereby making such a system bulky and expensive.

SUMMARY OF THE INVENTION

It is a primary object of the invention to provide an emergency signalling system whose different operating modes can be tailored to the needs of a user without requiring disassembly of the system.

It is another object of the invention to provide an emergency signalling system installed in a vehicle and having an operating mode whose features can be changed quickly and easily and without disassembly.

It is another particular object of the invention to provide an emergency signalling system in a vehicle that can be changed from one mode to another by the operator of the vehicle without requiring him/her to remove a hand from the steering wheel or to change eye focus from the traffic conditions to the interior of the vehicle.

To achieve the foregoing objects, there is provided an emergency signalling system whose various operating modes can be configured or modified after the system has been installed in a vehicle by way of keystrokes to a keypad. The system includes a microprocessor that is alternatively operable in a program mode, an idle mode (power applied, but not operating) or one of several programmable operating modes. An algorithm is provided for generating a plurality of alternative tones by a speaker of the system. Preferably, the keypad is mounted to the dashboard of the vehicle and incorporated as part of a control head for the system. Programming of the system is accomplished by way of keystrokes to the keypad. In the preferred embodiments illustrated herein, the keypad provides operator input signals for both the program mode and the operating modes. In an alternative embodiment, the keypad for programming the signalling system may be separate from the keypad for controlling the system in its operating modes. Such a separate programming keyboard may be detachable from the system after programming is completed. For example, a laptop personal computer (PC) may be connected to a serial port provided on the control head of the system in order for authorized personnel to program the system by way of keystrokes to the keypad of the PC.

In the preferred embodiment of the invention, the program mode provides for the selection of a desired one of the alternative tones to be automatically selected for use in one of the operating modes when the system is turned on. After the system is turned on and in the operating mode with the preselected tone, a different tone can be generated by way of a keystroke to the appropriate key. In the program mode, a simple sequence of keystrokes to the keypad selects the desired tone. During power up of the system, a first keystroke or set of keystrokes places the microprocessor in the program mode. A second keystroke or set of keystrokes selects the desired one of the alternative tones to be included in one of the operating modes upon power up of the system. Moreover, the program mode also provides for selectively enabling/disabling the alternative tones in order to control their availability in the operating modes.

For at least one of the operating modes, the system in accordance with the invention also preferably provides for programming the particular emergency lights activated in the mode. In this regard, the emergency lights may be divided into different groups—e.g., rotators, flashing lights and other lights such as take-down and alley lights. Selected ones or combinations of these groups may be programmed to be activated in at least one of the operating modes by way of keystrokes to the keypad when the microprocessor of the system is in its program mode.

Auxiliary functions incorporated into the system may also be programmed by the microprocessor in its program mode by way of keystrokes to the keypad. In the preferred embodiment, these keystrokes selectively enable each function to alternatively operate as an on-/off function, a momentary-on function (on only while a key is pressed) or a timeout function when the microprocessor is in one of its operating modes. The system architecture provides for the auxiliary functions to be available in each of the operating modes. Depending upon the type of light bar used in the system, the take-down alley and other similar lights are usually part of the auxiliary functions rather than part of the primary/secondary lights that are freely programmable to be enabled or disabled in each of the operating modes.

It will be appreciated from the following detailed description that the precise programming restrictions for each operating mode with respect to the emergency lights, siren and auxiliary functions is a matter of overall system design preferences rather than a necessity of the invention. For example, instead of the auxiliary functions being enabled in each of the three possible operating modes, the programming mode may provide for full flexibility of the auxiliary functions so that in addition to programming whether each operates as an on/off function, a momentary-on or timeout function, it can also be programmed to be totally disabled in any particular operating mode. In this regard, the programming of the power-up tone for the speaker is limited to a third operating mode in the preferred embodiment. In the first two operating modes, no siren tone can be programmed. Other system designs in keeping with the invention, however, may allow for the programming of a siren tone in more than just the third operating mode.

The system of the invention also provides a switch mounted to the floorboard area of the vehicle for transferring the system from one operating mode to another. Specifically, in the preferred embodiment, activation of the floor switch transfers the system from its present operating mode to the third operating mode, which is the "pursuit" mode for the system. In the pursuit mode, the system provides maximum visual and audible signalling. In an emergency situation, the foot switch allows the operator of the vehicle to activate the pursuit mode without taking a hand away from the steering wheel and without changing the focus of his attention. These characteristics are important advantages in a situation that typically is dangerous and requires total concentration by the vehicle operator to the events creating the emergency condition.

In order to further aid the vehicle operator in maintaining his/her attention to the emergency conditions, the preferred embodiment provides for the programming of a feature allowing activation of a siren tone by way of the standard horn ring of the vehicle. Specifically, conventional emergency signalling systems are known which include a feature wherein the standard horn ring may momentarily provide a siren tone or change of tone to the speaker of the signalling system. In conventional systems, however, the feature cannot be selectively enabled. In keeping with the system of the invention, the horn ring feature is programmable when the microprocessor of the system is in its program mode. Like the other programming features, programming of the horn ring feature is accomplished by way of keystrokes to the keypad.

Other objects and advantages will become apparent upon reference to the following detailed description when taken in conjunction with the drawings.

BRIEF DESCRIPTION OF THE DRAWINGS

FIG. 1 is an elevated perspective view of an emergency vehicle incorporating a signalling system according to a first embodiment of the invention, where the standard vehicle construction is shown in broken lines in order to highlight the system;

FIGS. 6A-6D are a flow diagram of a program executed by the signalling system in order to implement a program mode of operation for selecting the signalling features to be operated by the system in each of its operating modes;

Figure 2A:
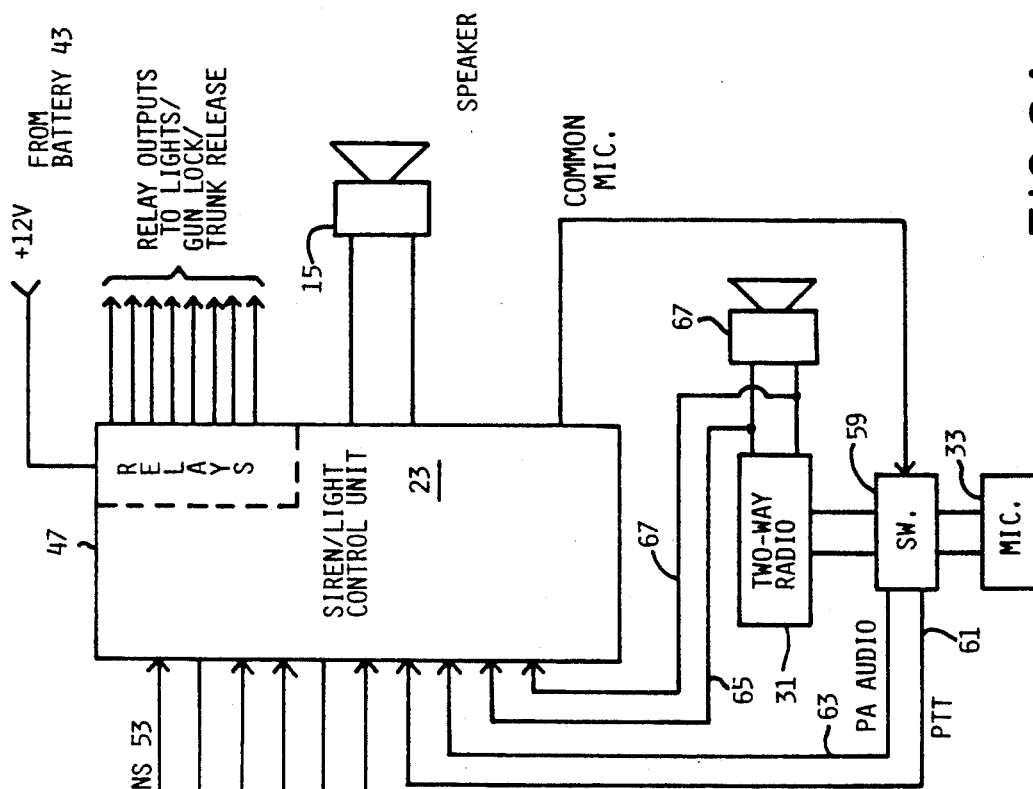
FIG. 2A is a schematic diagram of the signalling system of FIG. 1, including a speaker and emergency lights that are programmable by way of a control head preferably mounted at a location which is convenient to the driver of the vehicle as shown in FIG. 1.

While the invention will be described in connection with a preferred embodiment and one alternative embodiment, there is no intent to limit it to those embodiments. On the contrary, the intent is to cover all alternatives, modifications, and equivalents falling within the spirit and scope of the invention as defined by the appended claims.

DETAILED DESCRIPTION OF THE PREFERRED EMBODIMENT

Turning to the drawings and referring first to FIG. 1, a signalling system according to a preferred embodiment of the invention is installed in an exemplary emergency vehicle 11 shown in broken lines. The system includes a conventional light bar 13 that incorporates a speaker 15 and a plurality of lights. An example of a light bar that may be used in the system is a STREETHAWK ® light bar manufactured by Federal Signal Corporation of University Park, Ill. In such a light bar, the lights are typically arranged in three groups—i.e., flashing lights, rotator lights and other lights such as take-down and alley lights. In the illustrated light bar, two pairs of three (3) lights are arranged on both sides of the centrally located speaker 15. Although actual light bar configurations of the system including flashing lights, rotators and beacons may be different than that illustrated, for convenience of reference and illustration, the inner light 17 or 17' of each pair is considered herein to be a rotator, the central light 19 or 19' is considered to be a flasher and the outer light 2 or 21' is considered to be a beacon.

It will be appreciated by those familiar with signalling systems and light bars in particular that there exists many different types of lights for light bars and many different configurations. As will become apparent hereinafter, the identification of particular types of lights (i.e., flashing lights, rotators and beacons) for the light bar 13 of FIG. 1 is illustrative only and intended merely to aid in explaining how a light bar comprising groups of lights of different types can be used in the system of the invention. The identification of particular lighting functions in different modes of system operation is not intended to limit the scope of the invention to systems incorporating particular types of lights or particular arrangements of them.

Control of the groups of lights 17-21, 17'-21' and the speaker 15 comprising the light bar 13 is provided by a control unit 23 and control head 25. The control head 25 is mounted in the interior area of the vehicle 11 and preferable on the dashboard/instrument panel area 27 just to the right of the steering wheel 29 for easy access by the operator of the vehicle. Typically associated with the control head 25 is a two-way radio 31. As is well known in these types of signalling systems, the control unit 23 may provide for rebroadcasting of the radio signal over the speaker 15 and for a microphone 33 of the two-way radio to function as a microphone for a public address (PA) function implemented by way of the speaker. Activation of either of these features is accomplished by way of keystrokes to a keypad 35 incorporated in the control head 25.

Although the control unit 23 is shown as being mounted in the trunk area of the vehicle 11, it may be mounted elsewhere, depending upon the precise design of the vehicle and the number of other accessories included in the vehicle. For example, the control unit 23 may be mounted under the dashboard area 27. As will be discussed more fully hereinafter, the system of the invention includes a floor switch 37 that is activated by the left foot of an operator and a switch 39 activated by a horn ring 41 of the steering wheel 29. Signals from these switches are received by the control unit, and it responds by controlling the operation of the light bar 13 and siren/speaker 15 in a predetermined manner.

In an alternative version of the signalling system, a control head for the two-way radio 31 also serves as the control head for the signalling system. This alternative embodiment of the invention will be discussed in greater detail in connection with FIG. 5.

Figure 2B:
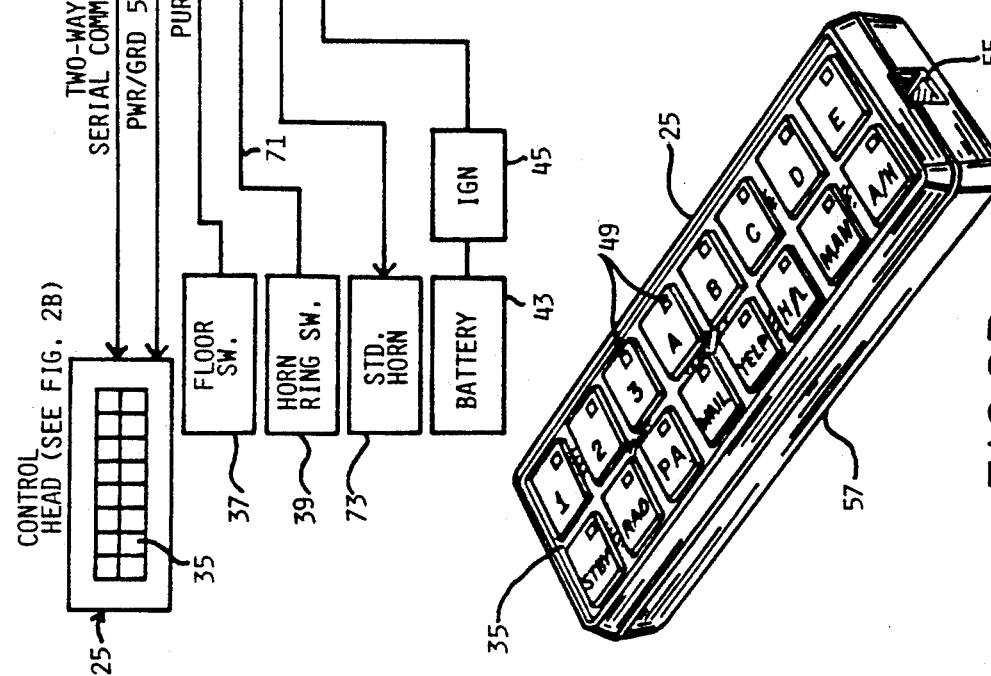
FIG. 2B is a perspective view of the control head of the signalling system including a keypad for programming and operating the signalling system in accordance with the invention.

Referring to FIGS. 2A and 2B, the electronics of the control unit 23 of FIG. 1 receives power from a battery 43 of the vehicle by way of an ignition circuit 45 in a conventional manner. Because of the power requirements of the lights 17-21, 17'-21' of the light bar 13 of FIG. 1, they receive power from the battery 43 by way of a separate circuit that includes relays 47, which form part of the control unit 23.

In accordance with the invention, the control unit 23 is programmable by way of the keypad 35 of the control head 25 to provide a mechanism for modifying operation of the system. In the illustrated embodiment, the control unit 23 operates the light bar in three alternative operating modes and a standby mode (i.e., system power applied, but not operating). By way of keystrokes to the keypad 35, the control unit 23 may be placed into a program mode wherein the signalling characteristics of each operating mode can be modified and tailored as desired without necessitating direct access to the circuitry of the control unit. In an installed system, each of the operating modes can be modified simply by first entering the control unit 23 into its program mode by way of keystrokes to the keypad 35 and then entering the appropriate programming command again by way of keystrokes to the keypad. Auxiliary features are also programmable by way of the keypad 35 as will be explained hereinafter.

Before describing the programming operation of the system, it is necessary to understand the operation of the system in its operating modes, assuming a particular configuration for each of the operating modes and other programmable features. For ease of understanding, the following description of the operation of the various operating modes and auxiliary functions is undertaken using the frame of reference of an operator. In other words, the operation will be described with respect to system responses to keystrokes to the keypad 35.

Also, it is useful to define the phrase "operating modes", which is used throughout this specification. Operating modes as used hereinafter is intended to define the plurality of signalling configurations that can be executed by the signalling system of the invention. Each operating mode executes one of the signalling configurations. Alternatively, each of the different operating modes may be referred to as a "signalling configuration", and they may be collectively defined as providing a single "operating mode" of the system. In the claims, this latter terminology has been used, even though the former is used extensively in the specification.

SYSTEM OPERATION

A. Start Up

Upon application of power by way of the battery 43 and ignition 45, the control unit 23 assumes a idle mode condition, meaning the system is not operating the lights and speaker.

A keystroke to one of the keys "1", "2" or "3" of the keypad 35 transfers the system from its idle mode to one of the operating modes. In an operating mode, the system may activate either the lights or the speaker or both. Also, a keystroke to the "RAD" key will transfer the system to a radio rebroadcast mode, and a keystroke to the "PA" key will transfer the system to a public address mode. A second keystroke to any of these keys will return the system to its idle mode. Alternatively, a keystroke to the "STBY" key will return the siren/speaker to a standby mode, meaning no tone will be generated in mode 3.

So that the operator is able to determine the present mode of the system, each of the keys of the keypad 35 is associated with an LED 49. As will become apparent hereinafter, the activation of each function in response to a keystroke is indicated by a flashing condition of the associated LED 49. For example, when system power is applied, the system initializes itself in the idle mode condition and all of the LEDs for operating modes 1, 2 and 3 are off. Either the LED 49 of the "STBY" key will be flashing or one of the LEDs of the "WAIL", "YELP" and "H/L" keys will flash. If the LED 49 of the "WAIL", "YELP" or "H/L" key is flashing, the siren tone generated in operating mode 3 of system operation will be a wail, yelp or high/low sound, respectively.

Power to the control head 25 is provided by way of a power and ground connection (PWR/GRD) 51 derived from the control unit 23. Communications between the control head 25 and the control unit 23 is by way of hardwired serial communications lines 53, one for transmitting and a second for receiving. The serial communications lines 53 and the power lines 51 can be implemented by way of a conventional line for a telephone handset. As suggested by the recessed area 55 on the housing 57 of the control unit 25, the connector for the serial communications lines 53 may be a conventional telephone snap-fit connector (not shown).

B. Operating Modes 1, 2 and 3

A keystroke to any one of the keys "1", "2" and "3" will place the system in one of its signalling operating modes. Each of the operating modes is intended for particular types of emergency situations. Typically, the operating modes are configured to provide a range of signalling intensity. For example, operating mode 1 is activated by a keystroke to key "1" and may provide low intensity signalling such as flashes only and no siren. Operating mode 2 is activated by a keystroke to key "2" and may activate a more intense signalling configuration such as the simultaneous operation of the flashing lights and rotators. Operating mode 3 is activated by a keystroke to key "3" and may activate the most intense signalling configuration, one that is usually used for pursuing a vehicle and similar extreme emergency situations. In operating mode 3, the system may be configured to simultaneously operate the flashing lights 17, 17', the rotators 19, 19, the beacons 21, 21' and the speaker 15. As indicated in connection with the explanation of the start up of the system, the siren tone generated in operating mode 3 may be either a wail, yelp or high/low sound. As an additional alternative, no siren tone may be generated in operating mode 3. In such a case, the LED 49 of the "STBY" key will flash.

In keeping with the invention, the siren tone selected for generation in operating mode 3 when system power is first applied is selected in a programming mode as explained hereinafter. If one of the wail, yelp or high/low tones is selected, the operator will be prompted upon power up that one of these tones has been selected when the system was programmed by way of the flashing LED 49 associated with the appropriate one of the keys "WAIL", "YELP" or "H/L". If none of the LEDs of these keys is flashing upon power up of the system, no tone has been preselected for generation in operating mode 3. In such a case, the LED 49 of the "STBY" key will flash. Assuming at least of one of the tones was enabled in the program mode (as explained hereinafter), the operator of the vehicle can add a tone to operating mode 3 by simply pressing the appropriate one of the keys "WAIL", "YELP" or "H/L."

C. Auxiliary Functions

Keys "A", "B", "C", "D" and "E" of the keypad 35 control auxiliary functions that preferably may be activated in mode 0 or any of the operating modes and also in the idle mode. Examples of auxiliary functions for these keys are as follows: "A"—gun lock release (not shown); "B"—trunk release (not shown); "C"—left alley light 21; "D"—right alley light 21'; and "E"-takedown light (part of 21 and 21'). A keystroke to any of the keys "A"-"E" will activate the associated auxiliary function either in a timeout mode (e.g., eight seconds), an on/off mode or a momentary-on mode (on only while key is pressed), depending on the programming for each function. In order for a keystroke to the "A" key to release the gun lock, the system provides a safety feature by requiring a keystroke to the "STBY" key after a keystroke to the "A" key within a predetermined time period (eight seconds) before enabling the function.

In the illustrated embodiment, a single microphone 33 is used by both the two-way radio 31 and the signalling system. In order to provide for the public address function of the signalling system, a switch 59 alternatively interfaces the microphone 33 to either the two-way radio 31 or the signalling system. The switch 59 is controlled by a control line "COMMON MIC" from the control unit 23. Specifically, a keystroke to the key "PA" enables push-to-talk ("PTT") line 61 and the "PA AUDIO" line 63 so as to direct signals from the microphone 33 to the control unit 23 and causes the LED 49 of the "PA" key to flash. In turn, the control unit 23 directs the audio signal to the speaker 15. The public address function can be disabled by either a second keystroke to the "PA" key.

For the radio rebroadcast feature of the signalling system, the two signal wires 65 and 67 to the radio speaker 69 are tapped and directed to the control unit 23. The control unit 23 enables/disables the speaker 15 for rebroadcasting the audio signal of the two-way radio 31. The control unit 23 enables the rebroadcast function in response to a keystroke to the "RAD" key. The operator of the vehicle 11 is aware that the function is enabled by way of the flashing LED associated with the "RAD" key. A second keystroke to the "RAD" key or a keystroke to the "STBY" key disables the rebroadcast function.

In the signalling system, pressing the horn ring 41 may function to enable a siren tone for either momentarily, a predetermined time period (e.g., eight (8) seconds) or until the horn ring is pressed again. When the horn ring 41 is pressed, the associated switch 39 is closed, and a signal is passed to line 71 and the control unit 23. If the horn ring/siren function is enabled during programming of the system, the signal from the switch 39 is not passed on to the standard horn 73 of the vehicle. Instead, the control unit 23 delivers a predetermined tone (peak-and-hold, wail, yelp, high/low or air horn) to the speaker/siren. In the preferred embodiment, each of the operating modes can be programmed to include the horn ring/siren function.

In an example of a possible system configuration, the horn ring/siren function may be enabled in each of the operating modes configured as previously described (i.e., siren only in mode 3). Pressing the horn ring 41 when the system is in operating modes 1 or 2 results in a peak-and-hold tone generated by the speaker 15 for as long as the horn ring is pressed. In mode 3, the siren may be activated to generate a wail, yelp or high/low tone. Activation of the horn ring/siren function in mode 3 will change the tone generated by the speaker 15 from the tone normally generated to another tone. For example, if no tone is programmed for mode 3 (the LED of the "STBY" key is flashing), pressing the horn ring 41 will generate the peak-and-hold tone for as long as the horn ring is pressed. If the wail tone is programmed for mode 3 (the LED 49 of the "WAIL" key is flashing), pressing the horn ring 41 will change the tone to a yelp tone. In the programming mode, the yelp tone can be selected to be timed out after the horn ring 41 is pressed or to be maintained until the horn ring is pressed again. If the yelp tone is programmed for operating mode 3 (the LED 49 of the "YELP" key is flashing), pressing the horn ring 41 will change the tone to a wail tone until the horn ring is pressed again. Finally, if the high/low tone is programmed for mode 3 (the LED 49 of the "H/L" key is flashing), pressing the horn ring 41 will momentarily change the tone to an air horn tone.

A keystroke to the "MAN" key will cause the speaker 15 to generate a peak-and-hold tone for as long as the key is pressed. The tone will end as soon as the key is released. In mode 3, a keystroke to the "MAN" key will transfer the speaker 15 from one tone to another in the same pattern as does the horn ring/siren function. The "A/H" key causes the system to momentarily generate an air horn tone. As with the other keys, when either the "MAN" or "A/H" key is pressed, the associated LED is flashing. Preferably, the "MAN" key and the "A/H" key are functional in all of the operating modes (1, 2, 3) and also in the idle mode.

In keeping with the invention, the floor switch 37 provides a signal to the control unit 23 for transferring the signalling system directly into operating mode 3, either from another operating mode or from the idle mode. By closing the floor switch 37 a second time, operation of the signalling system changes from mode 3 to the idle mode. The floor switch 37 is preferably mounted to the floor board area of the vehicle 11 as illustrated in FIG. 1 so the operator of the vehicle can quickly transfer the signalling system into operating mode 3 by a simple tap of his/her foot to the switch. By allowing the system to enter operating mode 3 directly by merely pressing the foot switch 37, the operator can maintain his/her attention on the emergency situation and also keep both hands on the steering wheel 29.

Figure 3:
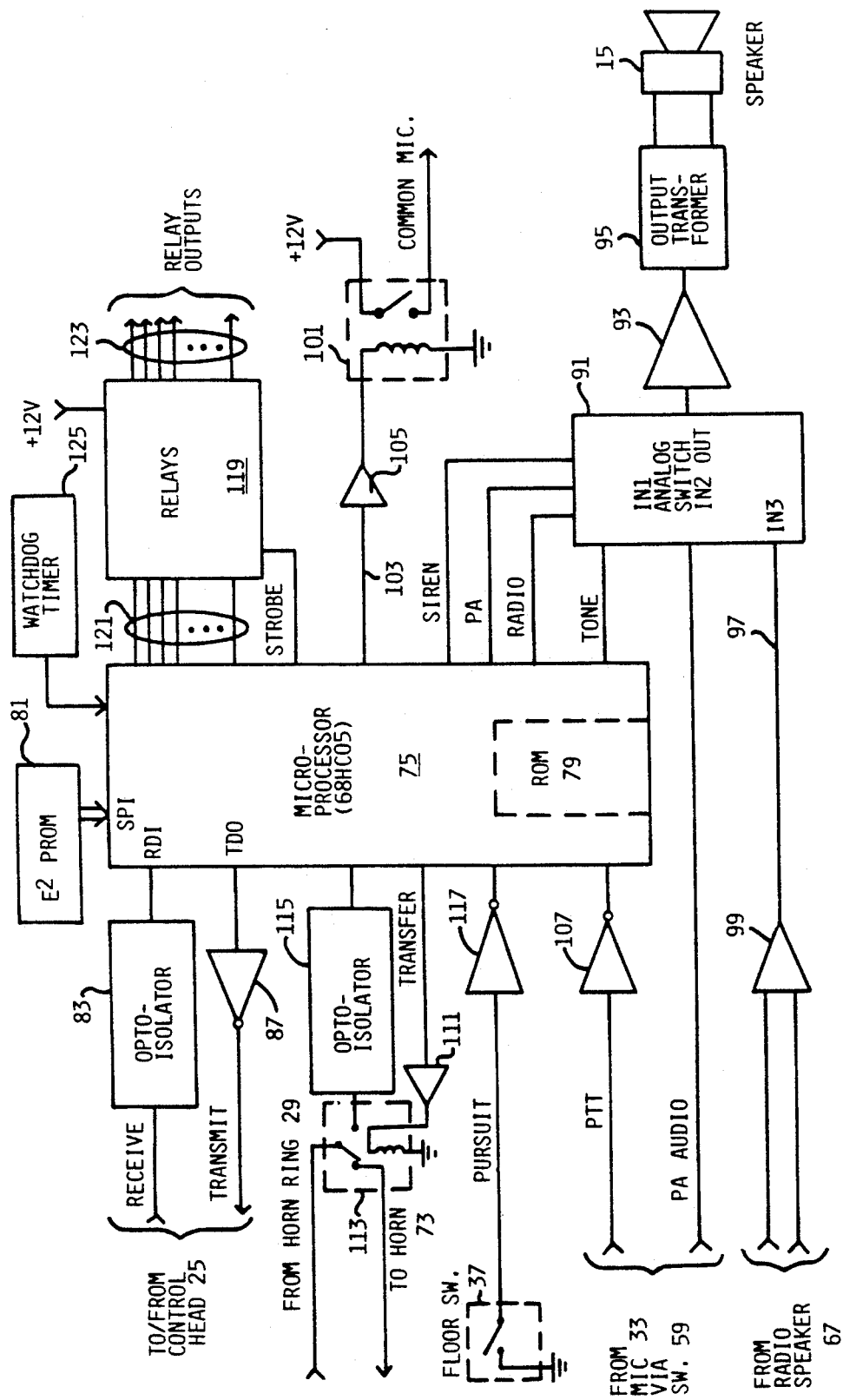
FIG. 3 is a schematic diagram of the control unit for the signalling system of the invention.

Each of the control circuit 23 and control head 25 of the signalling system includes a microprocessor, preferably the MC68HC05C4, manufactured by Motorola, Inc. of Austin, Tex. The microprocessor 75 of the control unit 23 is illustrated in FIG. 3. It and the microprocessor 77 of the control head 25 (FIG. 4) are in a conventional master/slave configuration, where the microprocessor 75 of the control unit 23 is nominally the master. The program executed by the control unit's microprocessor 75 is stored in a ROM 79 internal to the microprocessor 75. The programming of the signalling system is stored in a $E^2PROM$ 81 that is connected to the SPI input of the microprocessor in a well-known manner. A listing of the program stored in the ROM 79 according to the preferred embodiment of the invention appears at the end of this specification as Appendix A. On the receive input (RDI) of each microprocessor 75 and 77, an opto-isolator circuit 83 and 85, respectively, protects the receive inputs by isolating them from the noise of the power and ground of the system. The transmit output (TDO) of each microprocessor 75 and 77 is associated with a buffer/inverting amplifier 87 and 89, respectively.

One of three sources of audio signals may be provided to the speaker 15 via an analog switch 91 in response to control signals from the microprocessor 75. The first source is one of the tone signals (i.e., peak-and-hold, yelp, wail, high/low, air horn) generated in the preferred embodiment by the microprocessor 75 when the system is in operating mode 3 or when the appropriate one of the auxiliary functions is selected as previously explained. The signals for each of the tones are generated by a software subroutine stored with the main program in ROM 79 and executed by the microprocessor 75. The second source of audio signals for the speaker 15 is the microphone 33 for execution of the PA function. The third source is the output of the two-way radio 31 for execution of the radio rebroadcast function. The tone, PA and radio audio signals are received by the analog switch 91 at labeled inputs "IN1", "IN2" and "IN3", respectively. The analog switch 91 is a commercially available device such as MC14066B switch/multiplexer, manufactured by Motorola of Phoenix, Ariz.

Which one of the three sources of audio signals is presented to the speaker 15 is determined by which of the three control lines "SIREN", "PA" or "RADIO" is made active by the microprocessor 75. In response to an active control line, one of the audio signals is passed from the inputs of the analog switch 91 to its output labeled "OUT." For example, in response to a command from the foot switch 37 or the control head 25 to enter operating mode 3, the microprocessor 75 activates the "SIREN" control line in order to allow the analog switch 91 to pass the signal on the "TONE" line to the speaker 15 via a buffer amplifier 93 and an output transformer 95. For siren tones generated in auxiliary functions, the microprocessor 75 responds the same as in mode 3 and activates the "SIREN" control line, allowing the "TONE" signal to pass to the speaker 15.

A keystroke to the "RAD" key causes the microprocessor 75 to activate the "RADIO" control line, which causes the analog switch 91 to pass the radio signal 97 at the "IN3" input. A buffer amplifier 99 of conventional design is used to convert the audio signal from the two-way radio 31 to a one-wire signal referenced to a system ground for control by the analog switch 91.

For the public address function, the "PA" key is first pressed. The microprocessor 75 responds to the signal from the control head 25 on the receive side of the two-way communications path 53 by enabling the "COMMON MIC" line. The "COMMON MIC" line is enabled by energizing a relay 101 by way of an output signal 103 from the microprocessor 75. The low power output signal 103 is passed through a buffer/amplifier 105 to provide it with sufficient power to energize the relay 101.

With the "COMMON MIC" line enabled, the audio of the microphone 33 is directed to the "IN2" input of the analog switch 91. The push-to-talk signal is directed to an input to the microprocessor 75 via an inverting buffer/amplifier 107. In response to the keystroke to the "PA" key, enabling the public address functions, closure of the push-to-talk (PTT) switch 109 of the microphone 33 will cause the microprocessor 75 to activate the "PA" control line, which in turn will allow any signal on the "AUDIO" line to pass through the analog switch 91 to the speaker 15.

To enable the horn ring/siren function in any of the operating modes, a "TRANSFER" line from the microprocessor 75 is activated. The signal on the "TRANSFER" line is boosted by way of a buffer/amplifier 111 so that it is capable of energizing relay 113. Energized relay 113 redirects the signal from the horn ring 41 to the microprocessor 75 via an opto-isolator 115. In its unenergized state, the signal from the horn ring 41 and horn ring switch 39 is directed to the standard horn 73 of the vehicle 11.

The signal from the floor switch 37 is delivered to an input of the microprocessor 75 via an inverting buffer/amplifier 117. In response to the signal, the system is placed in mode 3, the "SIREN" control line is activated and a tone generated on the "TONE" line by the microprocessor 75 is passed through the analog switch 91 to the speaker 15.

The bank of relays 47 of the control unit 23 is responsive to control signals generated on control lines 121 by the microprocessor 75 in response to keystrokes to the keypad 35 of the control head 25 and closure of the floor switch 37. Power to the relays 47 is provided directly from the battery 43 of the vehicle 11 in order to provide the needed power to the devices attached to the outputs 123 of the relays. The bank of relays 47 includes a latch and driver for each relay. The control signals are strobed into the latch by way of a "STROBE" signal 125 from the microprocessor 75.

In the preferred embodiment, the outputs 123 of the relays 47 provide selective power to the lights 17-21 and 17'-21' of the light bar 13. The outputs may also control conventional gun lock and/or trunk release mechanisms. The control lines 121 are under program control and each of the control lines can be programmable in the program mode. Each control line is associated with a power circuit controlled by one of the relays 47. One of the control lines 121 for example, may energize one of the relays 47 that completes the power circuit for the flashing lights 17 and 17'. Another one of the control lines 121 may energize one of the relays 47 that completes the power circuit for the rotators 19 and 19'. Another one of the control lines 121 may energize one of the relays 47 that completes the power circuit for the lights 21 and 21'. In the programming mode, the flashing lights 17 and 17' and rotators 19 and 19' can be disabled or enabled for each one of the operating modes. The lights 21 and 21' are considered auxiliary lights. They are enabled for all modes of operation and are energized by keystrokes to one of the auxiliary keys as discussed earlier.

In a well-known manner, a watchdog timer 125 is connected to the microprocessor 75 for detecting malfunctions in the system program.

Figure 4:
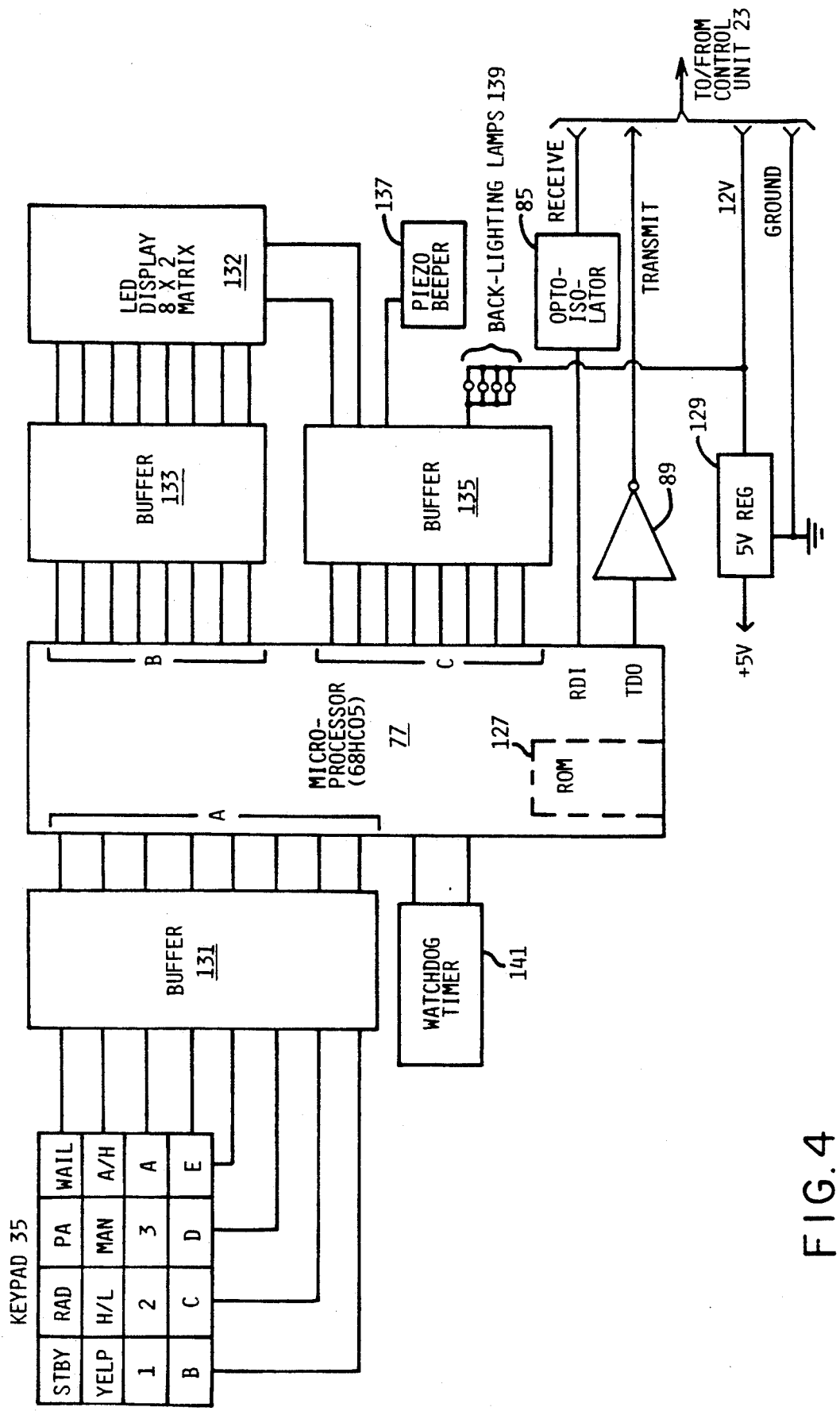
FIG. 4 is a schematic diagram of the circuitry comprising the control head of the signalling system.

The slave microprocessor 77 of the control head 25 executes a program stored in a ROM 127 internal to the microprocessor as shown in FIG. 4. A listing of the source code for the program according to a preferred embodiment appears at the end of this specification as Appendix B. A regulator circuit 129 receives power from the control unit 23 and converts it to a regulated five (5) volts to power the microprocessor 77 and associated circuitry in the control head 25. Input ports "A" to the microprocessor 77 receive keystroke signals from the keypad 35. The keypad 35 is laid out as a four-by-four matrix that is buffered by a conventional buffer 131 such as a 74LS240 manufactured by Texas Instruments, Dallas, Tex.

The microprocessor 77 identifies keystrokes to the keypad 35 and transmits the information to the microprocessor 75 from its TDO output. Also, the LEDs 49 of the keypad 35 are controlled by the microprocessors 75 and 77 in response to keystrokes as described earlier. The LEDs are configured in an eight-by-two matrix 132 and connected to output ports "B" of the microprocessor 77 by way of a conventional buffer 133. A third conventional buffer 135 receives outputs from output ports "C" of the microprocessor 77. This buffer provides the two control lines for the columns of the LED matrix 132. A piezoelectric beeper 137 is selectively energized by the microprocessor 77 by way of the buffer 135 in response to a keystroke to a key of the keypad. Finally, in order for the keypad and keys to be visible at night, a gang of back-lighting lamps 139 are powered by the microprocessor 77 by way of the buffer 135. Like the microprocessor 75 of the control unit 23, the microprocessor 77 includes a watchdog timer 141.

Figure 5:
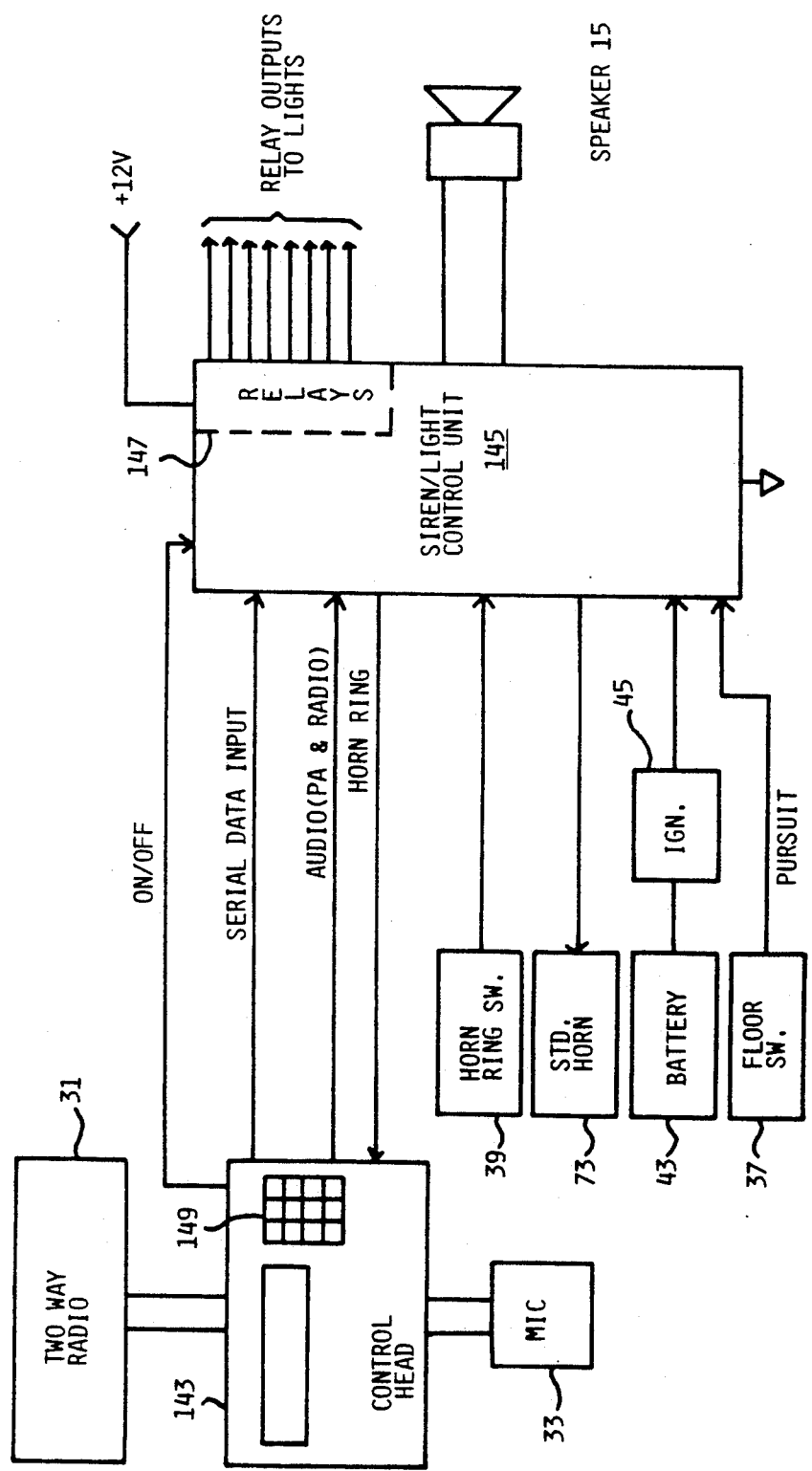
FIG. 5 is a schematic diagram of an alternative embodiment of the signalling system in accordance with the invention wherein the programming of the system is accomplished in a control head for a two-way radio mounted in the passenger compartment of the vehicle.

In an alternative embodiment of the invention, the control head of the signalling system is incorporated in the control head 143 of the two-way radio 31 as illustrated in FIG. 5. As this embodiment illustrates, the invention can be implemented in multi-purpose system that integrates the signalling system for the vehicle 11. In systems such as these, keystrokes to a single keypad may provide operator commands for both the signalling system and other vehicle systems such as the two-way radio 31. In the illustrated embodiment of FIG. 5, keystrokes to a keypad 149 provides operator control for both the two-way radio 31 and the signalling system. In order to program the signalling system, the keypad 149 functions essentially the same as the keypad 35 of the embodiment illustrated in FIGS. 1-4. Alternatively, programming of the signalling system may be accomplished by a detachable keyboard that communicates with the system by way of a serial port. The detachable keyboard may be a laptop personal computer (PC) capable of placing the signalling system into its programming mode and providing signals at the serial port generated by keystrokes to the keypad of the PC for programming the system.

Although the architecture of the system of FIG. 5 may take various specific forms, depending on system design requirements, the illustrated architecture shows the microprocessor of the control unit 145 configured in a master/slave relationship with the microprocessor of the control head 143. Unlike the embodiment of FIGS. 1-4, the microprocessor of the control unit 145 in FIG. 5 is the slave microprocessor in that the software for the program and operating modes is executed by the microprocessor of the control head 143. Commands generated during the execution of this software are communicated to the slave microprocessor of the control unit 145 by way of a "SERIAL DATA INPUT" line from the control head 143 of the two-way radio 31 to the control unit 145. The control unit 145 and its microprocessor respond to the commands from the control head by activating one or more of the relays 147 and/or the speaker 15 in the same manner as previously described in connection with the embodiment of FIGS. 1-4. In a manner similar to the embodiment of FIGS. 1-4, keystrokes to a keypad 149 set the signalling system in either its program mode or one of its operating modes. The keypad 149 also controls the operation of the two-way radio 31 and the microphone 33. An example of a radio control head 143 suitable for implementing the system of FIG. 5 is a model no. S825 radio control head, manufactured by General Electric Co. of Lynchburg, Va.

Audio signals from the microphone 33 (PA function) or the radio 31 (rebroadcast function) are provided to the control unit 145 by way of the "AUDIO" line. In response to data from the control head 143, audio signals are selectively passed to the speaker 15 to provide the same type of functioning for the signalling system as described in connection with the embodiment of FIGS. 1-4.

If the horn ring/siren function has been enabled, closure of the horn ring switch 39 is indicated to the control head 143 on the line "HORN RING." In response to a "HORN RING" signal, command signals are provided to the slave microprocessor of the control unit 145 by way of the SERIAL DATA INPUT line in order to momentarily activate the siren/speaker 15. As in the embodiment of FIGS. 1-4, the standard horn 73 is activated when the horn ring/siren function is disabled. The function is enabled or disabled by the microprocessor of the control unit 145 in response to commands from the control head 143.

Power is applied to the electronics of the control unit 37 by way of the battery 43 and ignition 45. Battery voltage is applied to the lights and auxiliary functions by way of separate circuit as in the embodiment of FIGS. 1–4. Finally, a power "ON/OFF" signal is derived from the control head 143 for turning the control unit 145 on and off with the control head.

Before turning to a discussion of the flow diagrams of FIGS. 6A–6D, 7A–7C and 8, it should be noted that these diagrams are in reference to the embodiment of FIGS. 1–4. These flow diagrams are also illustrative of the software required for the embodiment of FIG. 5. The specific programming of each of the two microprocessors in a system such as that of FIG. 5 may be different from that of Appendixes A and B, as will be appreciated by those familiar with programming microprocessor-based systems. Also, if the keyboard of a PC is used to program the system, a three microprocessor configuration is created, thereby necessitating distribution of the programming two in the embodiments of FIGS. 1–4 and 5.

PROGRAMMING

Referring to the flow diagram of FIGS. 6A–6D, the signalling system enters a programming mode when the "STBY" key is pressed as power is applied to the system as indicated by steps 151, 153 and 155. The system indicates to the operator that it is in the programming mode by flashing the LEDs 49 of the keypad 35 at a flashing rate much greater than that used in the operating modes. In step 157, the system initiates a timer within the microprocessor 75 in order to provide a timeout period for the programming mode after the programming has been completed. In step 159, the system exits the programming mode if the timer has expired and enters a idle mode (i.e., power on but not functioning). Otherwise, the system proceeds to step 161. In this step, if a keystroke has not been detected, the system returns to step 159 and again checks the timer and continues in this loop until the timer has expired or until a keystroke is detected.

If a keystroke is detected before the timer has expired, the system moves to step 163 in order to determine if one of the siren keys has been pressed. If there has been a keystroke to one of the siren keys, the system moves to the steps of FIG. 6D. If the keystroke is not identified with a siren key, then the system next determines if the keystroke is associated with one of the auxiliary functions at step 165. If the keystroke is to one of the auxiliary keys, the system moves to the steps of FIG. 6C. Finally, if the keystroke was to neither the siren nor the auxiliary function, the system determines if the keystroke was to one of the operating mode keys "1", "2" or "3" in step 167. If the keystroke was to a key that is not programmable (e.g., the "PA" or "RAD" key), the system returns to step 159 and determines whether the timer has expired.

If one of the mode keys "1", "2" or "3" has been pressed, the system branches in step 168 to one of three loops each comprising a series of steps in FIG. 6B for programming the selected operating mode 1, 2 or 3, respectively. For purposes of illustration, assume that the operator has pressed mode key "1" in the embodiment of the invention illustrated in FIGS. 2A and 3. In response to the keystroke to the mode "1" key, the microprocessor 77 of the control head 25 generates a data character and transmits it to the control unit 23 by way of the two-way communications line 53. In response to receiving the data character, the microprocessor 75 of the control unit 23 instructs the microprocessor 77 of the control head 35 to display the present programming condition of the mode. In the preferred embodiment, three relay circuits control the lights of the light bar 13 (e.g., one for flashing lights, one for rotators and one for beacons). If all of the relays are to be activated in mode 1, the microprocessor 75 will instruct the microprocessor 77 to flash all three of the LEDs 49 of the keys "1", "2" and "3".

Also in accordance with the preferred embodiment, the horn ring/siren feature can be enabled or disabled by the operator in the programming mode. If the horn ring/siren feature is selected for operating mode 1, the microprocessor 75 will indicate this to the operator by instructing the microprocessor 77 of the control head 35 to flash the LED 49 of the "MAN" key.

If the present programming of mode 1 is satisfactory, the operator simply presses the "STBY" key in step 171 and the system returns to step 157 and the timer will timeout and the system will transfer to the idle mode if no other programmable key is pressed.

After the initial keystroke to the "1" key, the program moves to step 169 where the status of each of the relays 47 for operating mode 1 is indicated by the LEDs 49 for each of the keys "1", "2" and "3". If the operator wishes to change the features of operating mode 1, a keystroke to one of the keys "1", "2", "3" or "MAN" will toggle the associated function from on to off or from off to on in steps 173 and 175. Using the previous example, if each of the keys "1", "2", "3" and "MAN" are flashing their respective LEDs 49, all three of the relay circuits for the lights of the light bar 13 are enabled for operating in mode 1 and the horn ring/siren feature is also enabled. Keystrokes to keys "2" and "3" will toggle the status of the associated relays of the relay bank 47 (i.e., from enabled to disabled) so that only the one of the three relays represented by key "1" will be enabled in operating mode 1. A second keystroke to one of the keys "2" or "3" will again toggle the status of the associated relay of the relay bank 47, returning it to its original status. Once the operator is satisfied with the programmed status of operating mode 1, a keystroke to the "STBY" key as detected in step 171 will exit the programming loop for mode 1 and return the system to step 157 in FIG. 6A as previously explained.

In the preferred embodiment, the programming of operating mode 2 is identical to the programming of operating mode 1 since the same optional features are available for each of these operating modes. However, operating mode 3 includes the option of selecting a siren tone to be initialized by the system upon system power up. In this regard, after the system has been powered up, it sets to a predetermined siren tone for generation in operating mode 3 as determined in the programming mode, the operator can override this initial selection by a simple keystroke to any of the available siren tones of yelp, high/low or wail.

Referring to the steps 177–183 for the programming of mode 2, in the preferred embodiment, each of the three relays of the relay bank 119 can be enabled for activation in operating mode 2, just like mode 1. Also like operating mode 1, the horn ring/siren feature can be selectively enabled for operating mode 2. Because the steps of the programming for the operating mode 2 are the same as those for mode 1 that have previously been explained in detail, the steps of 177, 179, 181 and 183 for programming operating mode 2 will not be repeated herein.

The programming of operating mode 3 in steps 185-191 is similar to the programming of modes 1 and 2. In step 185, the system responds to a keystroke to the "3" key by indicating which relays are presently programmed for mode 3, which tone if any is programmed to be initialized upon power up and whether the horn ring/siren function is enabled. The programmed status of operating mode 3 is indicated by the LEDs 49 of the associated keys "1", "2", "3" and "MAN" and one of the keys "WAIL", "YELP", "H/L" or "STBY". The first group of keys "1", "2" and "3" indicates which ones of the relays of the relay bank 47 will be activated by the system in operating mode 3. For the programming of the lights of the light bar 13 in mode 3, the steps are identical to those for programming modes 1 and 2. Also, programming the horn ring/siren function is the same in mode 3 as it is for programming in modes 1 and 2. A keystroke to the "MAN" key will toggle the horn ring/siren function from on to off or from off to on, depending on its initial state before the keystroke to the "MAN" key. Unlike the programming of modes 1 and 2, however, the programming of mode 3 provides for an initial siren tone to be set for generation in mode 3. This programmed siren tone is used by the system to initialize the status of operating mode 3 upon power up. After power up, a different siren tone or no tone at all can be selected by the operator for operation in mode 3 by a simple keystroke to the appropriate key, thereby overriding the tone selected in the programming mode.

Figure 6A:
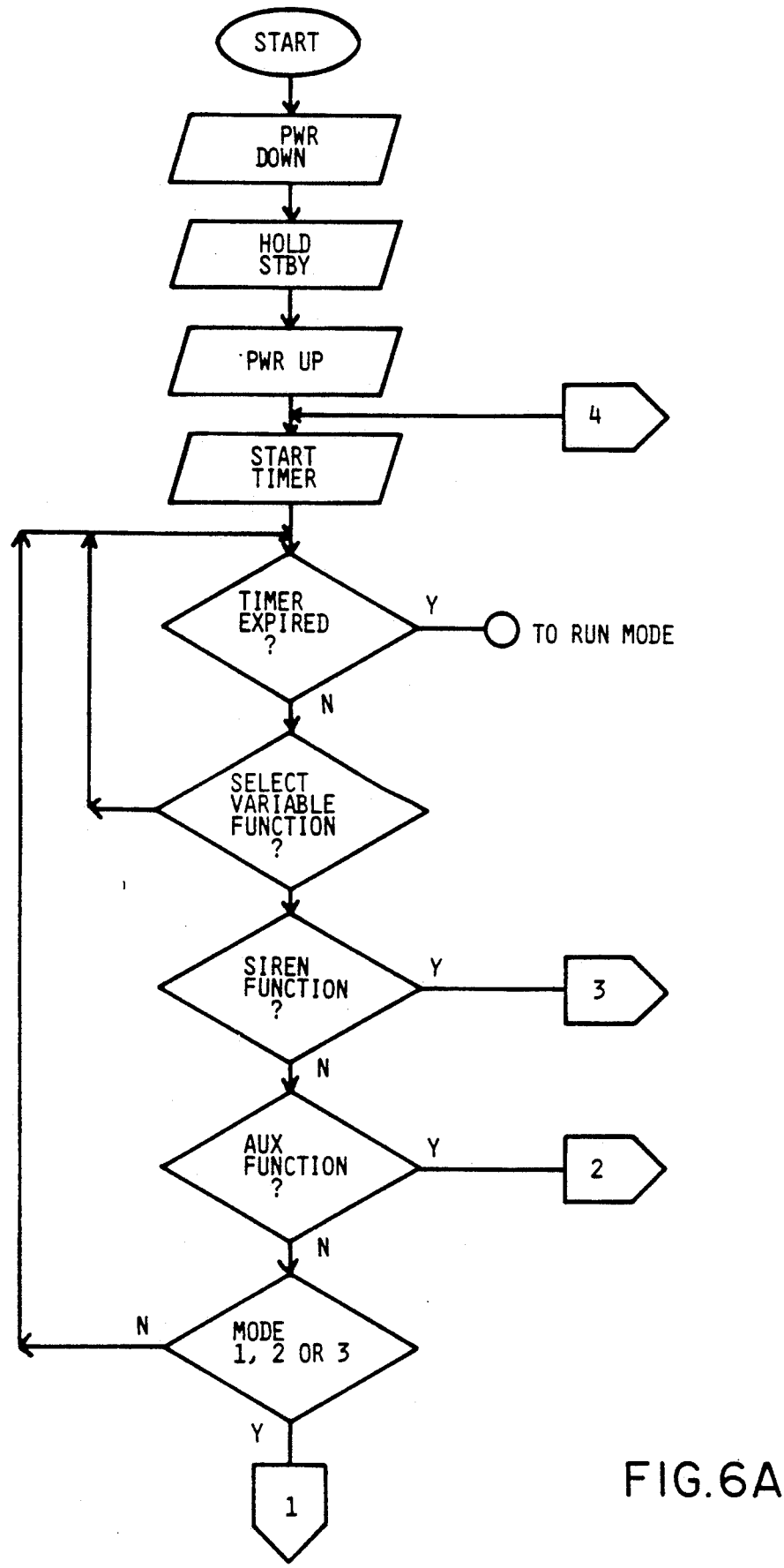
Figure 6C:
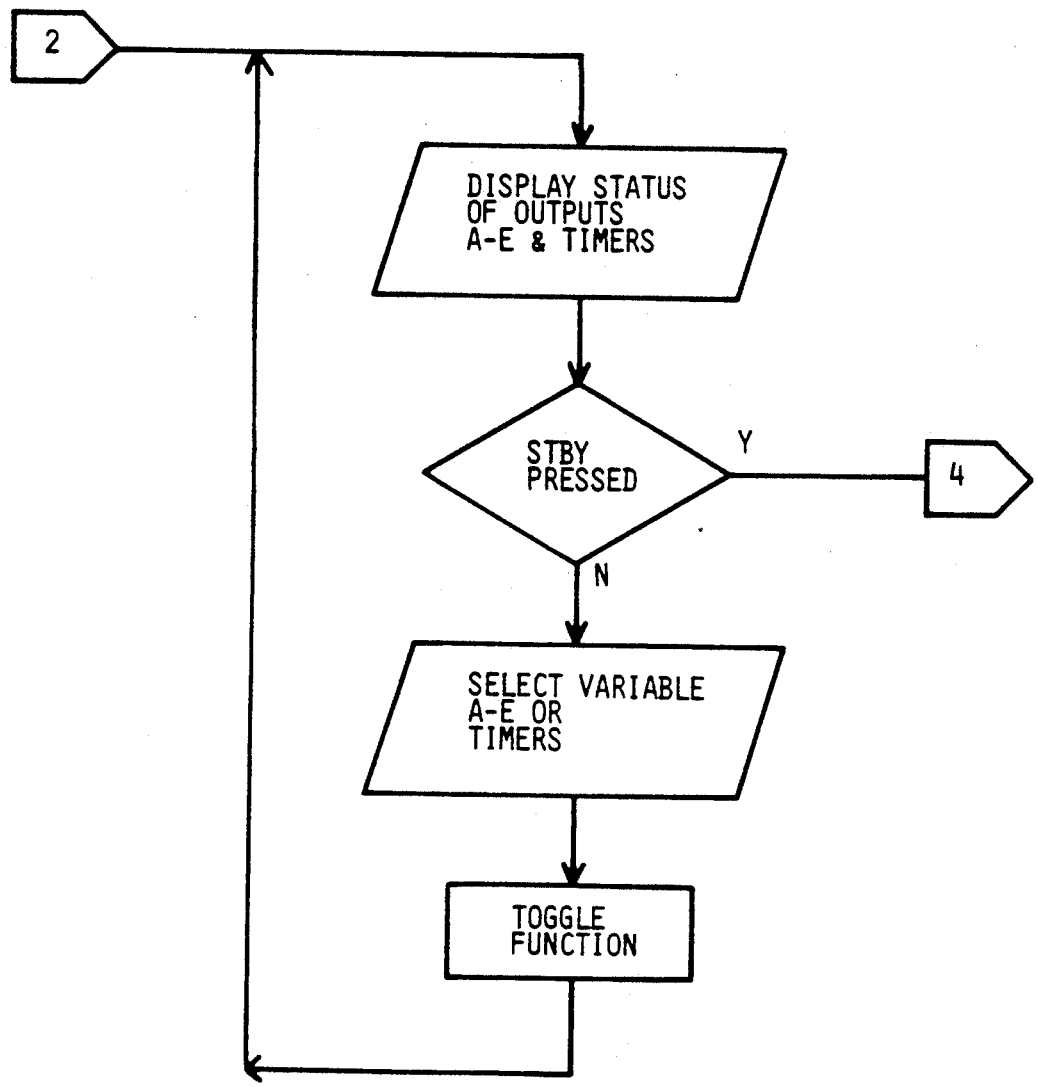

If a keystroke to one of the auxiliary keys "A"-"E" is detected in step 165 while in the programming mode, the system program executes the steps of FIG. 6C. In response to a keystroke to one of the auxiliary keys, the microprocessor 75 communicates the present status of all the auxiliary features to the microprocessor 77 of the keypad 35 in step 193. The microprocessor 77 displays the status by activating the appropriate ones of the LEDs 49 of the group of keys "A"-"E". If the operator is satisfied with the present programming of the auxiliary features, a keystroke to the "STBY" key in step 195 will exit the system from programming of the auxiliary functions back to the main programming loop of steps 157-167 of FIG. 6A. If the operator wishes to modify the operation of the auxiliary features, a keystroke to any one of the keys "A"-"E" will toggle the function as indicated by steps 197 and 199.

In accordance with the preferred embodiment, each of the auxiliary functions is controlled by one of the auxiliary keys "A"-"E" and the key immediately below that auxiliary key on the keypad 35—i.e., "WAIL", "YELP", "H/L", "MAN" or "A/H". In the preferred embodiment, each of the auxiliary keys toggles the associated LED 49 between an off condition and a flashing on condition. In an off condition, the auxiliary function is programmed as a momentary on activation, meaning that the function is activated only as long as the key is pressed. If the auxiliary key is toggled so that the associated LED 49 is in a flashing on condition, the auxiliary feature is programmed to provide an on/off activation, meaning that each keystroke toggles the feature either from on to off or from off to on when the system is in one of its operating modes or in its idle mode.

A third alternative response for a keystroke to one of the auxiliary keys can be programmed by first toggling the auxiliary key in the programming mode to a state in which the associated LED 49 is flashing. With the LED 49 of the auxiliary key flashing, a keystroke to the siren tone key directly below the auxiliary key will result in programming the auxiliary function as a timeout feature, meaning that a keystroke to the auxiliary key in one of the operating modes or idle mode will activate the function for a predetermined time period. For example, in the programming mode, a keystroke to the auxiliary key "B", toggles the function into an on/off condition, indicated by the flashing LED 49. In order to convert the feature to a timeout feature, a second keystroke to the "YELP" key causes the microprocessors 75 and 77 to activate the LED 49 of the "YELP" key. With the LEDs 49 of both the keys "B" and "YELP" flashing, the programmer knows that the timeout feature has been selected for the auxiliary function activated by a keystroke to the "B" when the system is in one of its operating modes or its idle mode.

Each of the auxiliary keys "A"-"E" can be programmed in the same manner as the foregoing example given with respect to auxiliary key "B". In the preferred embodiment, however, the programming of the auxiliary key "A" as a timeout feature causes the system to implement a security lockout of the feature that can only be overcome by pressing the "STBY" key within a predetermined time period after the keystroke to the "A" key.

After the operator has selected the desired programming for each of the auxiliary keys, a keystroke to the "STBY" key in step 195 will return the system to the main programming loop of steps 157-167 in FIG. 6A. With the microprocessor 75 executing the main programming loop, if there is not a keystroke to one of the programmable functions within the period of the timer, the program mode is terminated and the system transfers to its idle mode.

Figure 6D:
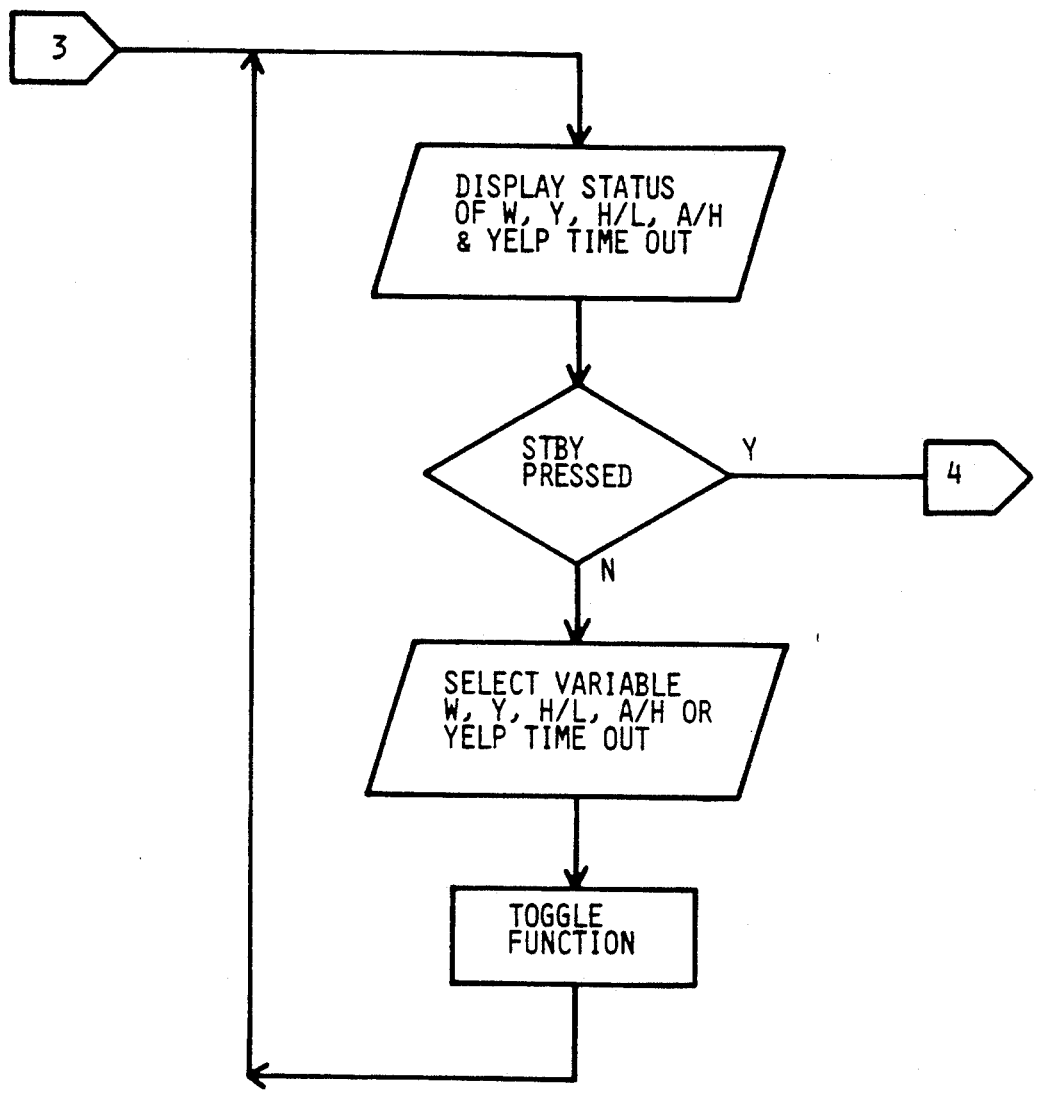

In order to program the siren tones available in the operating modes, a keystroke to one of the siren tone keys ("WAIL", "YELP", "H/L", "MAN" or "A/H") while the system is in the main programming loop will cause the programming mode to transfer from step 163 to the programming steps of FIG. 6D. After the initial keystroke to one of the tone keys, the microprocessors 75 and 77 display the present programmed status of the siren tones at step 201. Any of the tones, wail, yelp, high/low and air horn may be disabled by a simple keystroke to the associated siren tone key. For example, if the initial programming indicates that the high/low siren tone is available in the operating mode (i.e., a flashing LED 49 of the "H/L" key), a keystroke to the "H/L" key will toggle the function in accordance with steps 205 and 207 in FIG. 6D so that the high/low siren tone will be disabled and not available in any of the operating modes. Each of the other tones can be similarly disabled or enabled by a keystroke to the associated key, which toggles the tone between enabled and disabled conditions.

In accordance with the preferred embodiment, the yelp tone can be programmed as a timeout tone for the horn ring/siren function in addition to being programmed to be either enabled or disabled for the operating modes. Specifically, a keystroke to the "YELP" key causing the system to activate the associated LED 49 will enable the yelp tone for selection in one of the operating modes. By a second keystroke to the "B" key, the horn ring/siren function is provided with the feature of a timed-out yelp tone when the horn ring 41 is pressed while the system is generating a wail tone. In such a situation, pressing the horn ring 41 will cause the system to transfer to a yelp tone for a predetermined time period and then automatically return to the wail tone. If the "B" key is not pressed while programming the yelp tone, pressing the horn ring 41 in any of the operating modes will transfer the tone from wail to yelp (assuming the horn ring/siren function has been enabled in the programming mode), and the siren will continue to generate a yelp tone until the horn ring is again pressed to toggle the siren back to a wail tone. After the tones have been programmed, a keystroke to the "STBY" key returns the program to the main programming loop in step 203 where it may time out, exit the programming mode and enter the idle mode.

Figure 7A:
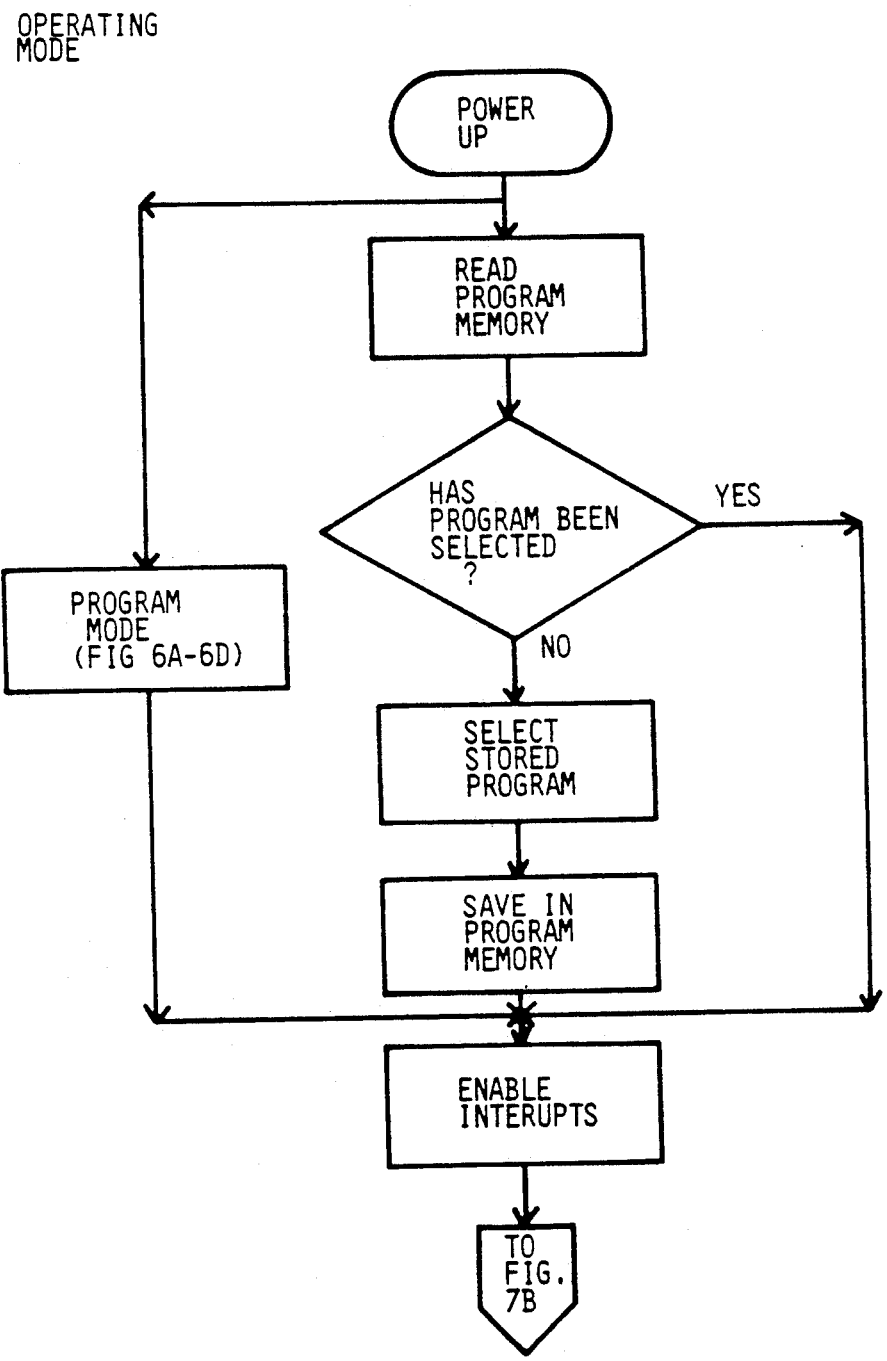
FIGS. 7A-7C are a flow diagram of a program executed by the signalling system in order to implement operation of the system after signalling features to be operated in the run mode have been selected in the program mode.

After the system has been programmed in accordance with the flow diagram of FIGS. 6A-6D, the system may be either turned off and the program will be stored in the E$^2$PROM or the system can transfer to step 209 in the operating mode as indicated in FIG. 7A. If the programming mode is not selected upon power up of the system in step 208, the system will enter into the operating mode by first reading the program from the E$^2$PROM in step 209. If the system has not been previously programmed, no information has been stored in the E$^2$PROM. If the system has not been previously programmed as determined in step 211, it branches from step 211 to steps 213 and 215, where a standardized program held in the ROM 79 is transferred to the E$^2$PROM. If the system has been previously programmed, it skips steps 213 and 215 and goes directly to step 217 where the system interrupts are enabled.

Figure 7B:
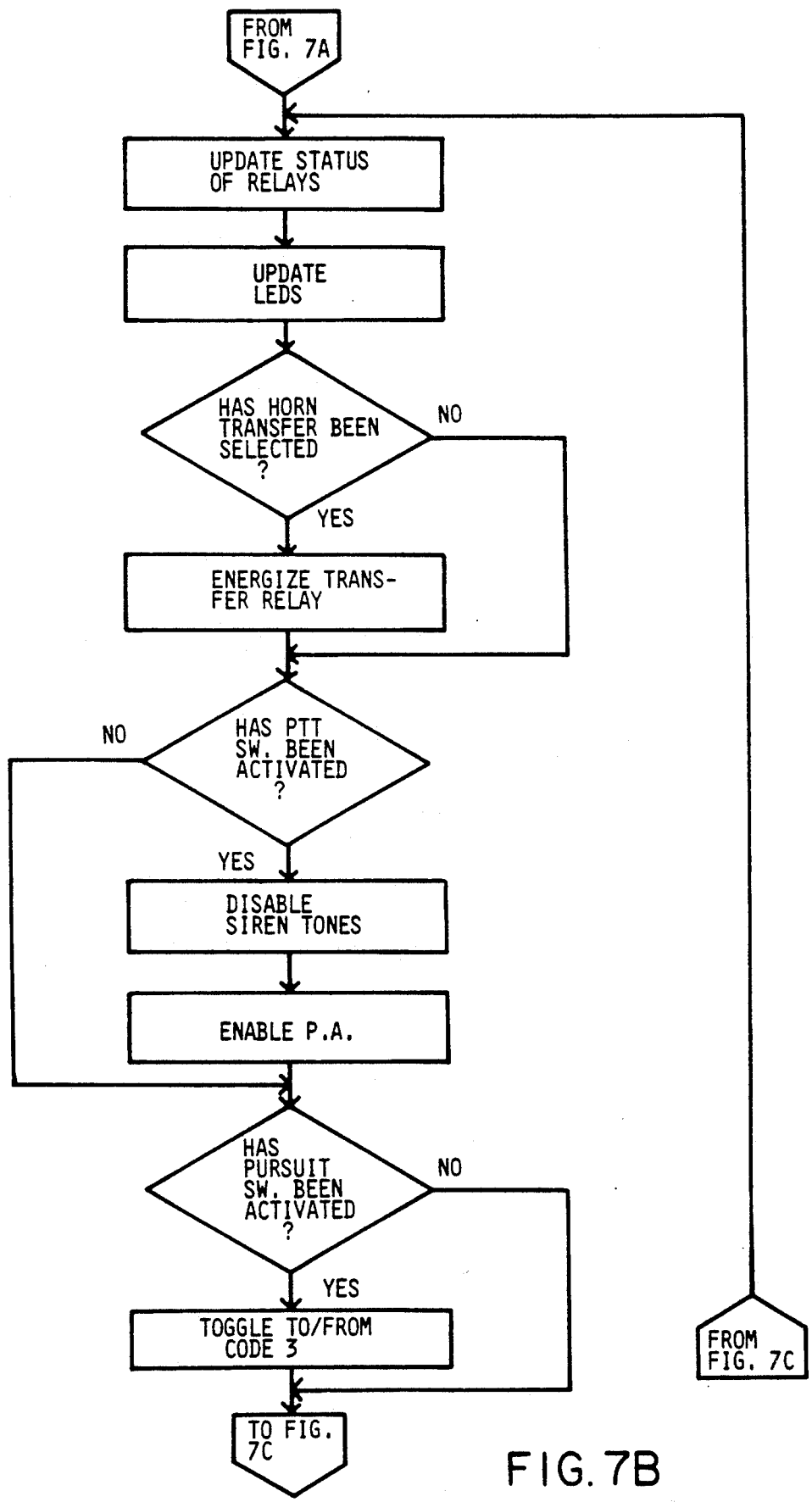
Figure 7C:
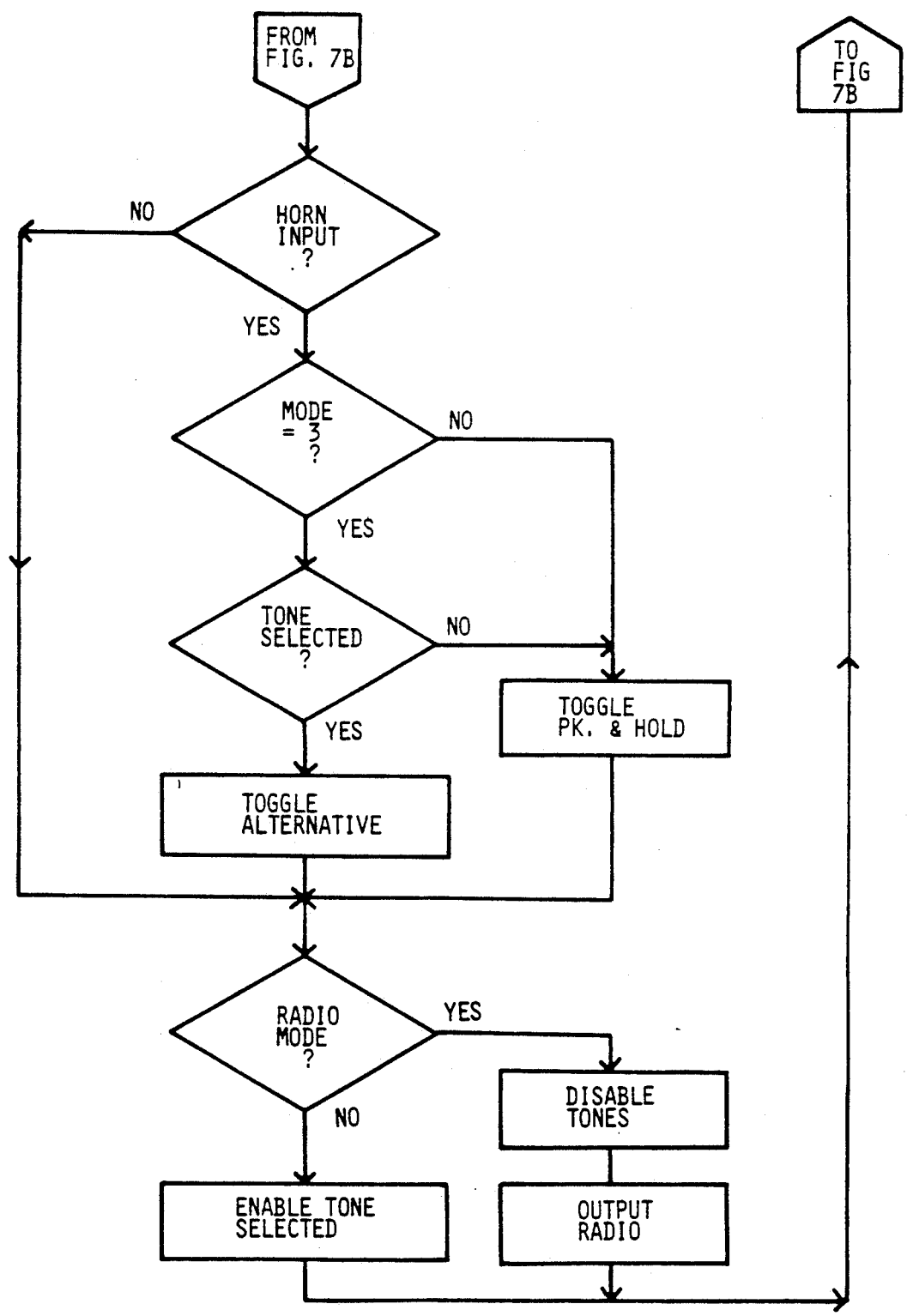

Referring to FIGS. 7B and 7C, the system executes the loop of FIGS. 7B-7C and maintains itself in a idle mode while in the loop until a keystroke is detected or the floor switch 37 is activated. If the system detects a keystroke or a signal from the floor switch 37, it updates the status of the relays 47 in accordance with the keystroke and the program in the E$^2$PROM and the microprocessor 75 tells the microprocessor 77 to update the status of the LEDs 49 of the keypad 35 so as to reflect the present status of the system operation. (See Interrupt Routine of FIG. 8). In step 223, the system determines if the horn ring/siren feature has been selected for the present mode. As indicated in connection with the description of the programming mode, the horn ring/siren feature can be selected for any of the operating modes 1, 2 and 3. If the system is in one of the modes that includes the horn ring/siren feature, the system branches to step 225 where it energizes the transfer relay 113. Otherwise, step 225 is skipped.

At step 227, the system determines whether the push-to-talk (PTT) switch of the microphone 33 has been activated. In the illustrated embodiment of the invention, a common MIC is utilized for the two-way radio 31 and for the public address (PA) function of the signalling system. When the two-way radio 31 and the signalling system utilize a common MIC, a PTT signal is only received by the signalling system if the "PA" key has been pressed on the control head 25. If the signalling system has its own microphone, however, the PTT signal will be sensed by the system regardless of the state of the "PA" key. In any event, if the PTT switch has been activated and it is sensed by the signalling system, the system responds by disabling any tones to the speaker 15 and enabling the speaker to receive audio signals from the microphone by way of the analog switch 91 in accordance with steps 229 and 231.

In keeping with the invention, if the pursuit or floor switch 37 has been activated in step 233, the microprocessor 75 responds by transferring the system into or out of mode 3 in step 235.

If the horn transfer feature has been selected for the present mode, the relay 113 has been energized in step 225. With the relay 113 energized, the microprocessor may receive a horn input signal at step 237 (FIG. 7C). If a horn input signal is received, the system branches to steps 239-245. In step 239, it first determines if the system is presently in operating mode 3. If the system is in mode 1 or 2, step 243 enables a peak-and-hold siren tone. Specifically, the peak-and-hold siren tone is only activated as long as the horn ring 41 is pressed. If the system is determined to be in mode 3 in step 239 and already generating a tone as determined in step 241, the system transfers the tone to an alternative tone in step 245, depending on the tone being generated for mode 3. For example, if the wail tone is provided to the speaker 15 in mode 3 and the horn ring 21 is pressed, the system will change the tone to a yelp tone. In accordance with the programming, the yelp tone will be maintained in step 245 until either a second horn input signal or until a timeout has occurred. If no tone is being provided to the speaker 15 in mode 3, the system branches from step 241 to step 243 where the peak-and-hold tone is activated as previously discussed.

In step 247, the system determines if the "RAD" key has been pressed, placing the system in a radio rebroadcast mode. If the radio rebroadcast mode has been selected, any tone signals being generated are disabled at step 249 by way of the analog switch 91 and the output from the two-way radio 31 is delivered to the speaker 15 in step 251.

If the radio rebroadcast mode has not been selected in step 247, the system branches to step 248 in order to determine its present operating mode. If the system is in mode 3, any tone selected for the siren/speaker in mode 3 (either by way of the programming mode or by keystrokes to the tone keys while in the idle or operating modes) is activated in step 252. From either steps 251 or 252, the system program returns to the beginning of the main program loop at step 219 in FIG. 7B.

Figure 8:
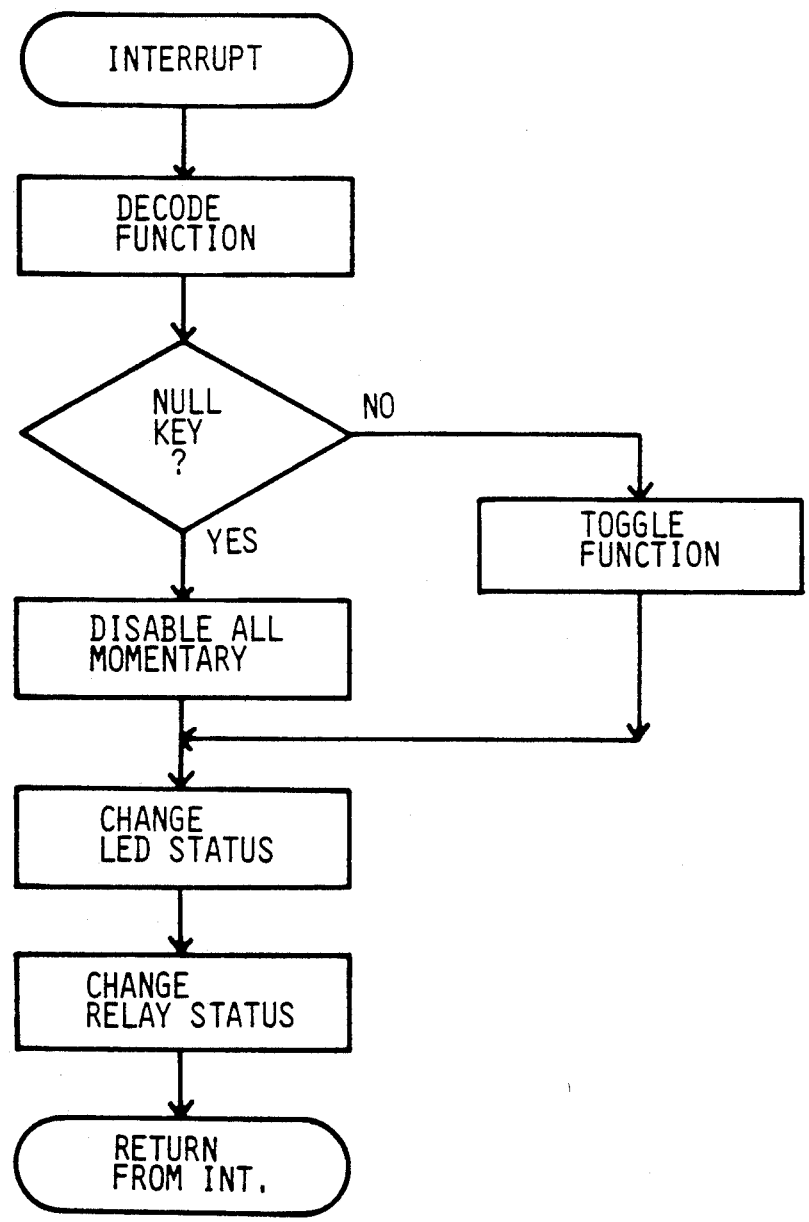
FIG. 8 is a flow diagram of an interrupt routine executed by the control unit in response to keystrokes to the keypad of the control head for changing the functioning of the signalling system during its normal operation.

In order to update system status in response to keystrokes to the keypad 35 when the system is in its operating modes, an interrupt routine is executed by the microprocessor 75 as indicated in FIG. 8. In response to a keystroke to the keypad 35, the microprocessor 77 generates a character that is transmitted to the control unit 23 and microprocessor 75 by way of the two-way serial communications lines 53 (FIG. 2A). The microprocessor 75 decodes the character at step 253 and determines if the character identifies a keystroke to one of the keys of the keypad 35 or a "NULL" key in step 255, meaning the release of a key. If the character is not a "NULL" key, the system branches to step 257 where it toggles the appropriate function identified by the keystroke (i.e., turns the associated LED 49 off or turns it on as a flasher) either immediately or after a timeout period as determined in the programming mode. If the character is a "NULL" key, the system disables the function in step 259 if it has been programmed as a momentary on function or, as in the case of the air horn and "MAN" horn in the preferred embodiment, is operable only as a momentary on function. In order to update the keypad 35, the microprocessor 75 commands the microprocessor 77 to update the status of the LEDs 49 in step 261 in accordance with any changes made in either steps 257 or 259. From step 261, the system updates the status of the relays in step 263 and then returns to the main loop of the operating program.

As used in the claims set forth hereinafter, the phrase "set of keystrokes" means one or more keystrokes to the keys of keypad 35.

From the foregoing, it will be appreciated that a programmable emergency signalling system has been provided that utilizes a plurality of signalling features for activation in a operating mode such that the characteristics of each of the operating modes can be programmed by way of keystrokes to the keypad 35 when the system is in its programming mode. Programming of the signalling system can be done from the keypad 35 without necessitating any disassembly of the system. Also, the floor switch 37 allows the operator of the system to directly transfer it into a pursuit mode.

APPENDIX A

```
American Automation Cross-Assembler 6805 9.07.17
Assembly date: 17 Apr 1990
Assembly time: 12:59:59
Options in effect:expand format list macro errorfile uppercase
```

```
0001   ************************************************************
0002   *   Program Name:      MAIN0100                                *
0003   *   Programmer:        WARD GIEFFERS / GEORGE BERANEK / KENT KEKEIS  *
0004   *   Initial Start Date: 5/10/89                                *
0005   *   Most Recent Date:   3/29/90                                *
0006   *                                                              *
0007   *   System:             6805-C8                                *
0008   *   Assembler:          EZASM                                  *
0009   *                                                              *
0010   *   PGM Description:    THIS PROGRAM CONTROLS THE OPERATION OF THE  *
0011   *                       SMART SIREN MAIN UNIT. SEE MAIN.PSU FOR A   *
0012   *                       DESCRIPTION OF OPERATION.              *
0013   *                                                              *
0014   *   Version Information:                                       *
0015   *                                                              *
0016   *   Version   What Changed from Previous      Who Changed   Date   *
0017   *                                                              *
0018   *   N/A       Initial Version                 WJG                  *
0019   *   N/A       ADAPTED FOR AS6805C4 AMERICAN   GB            5/10/90 *
0020   *             AUTOMATION ASSEMBLER                                 *
0021   *   N/A       CHECKSUM ADDED FOR RAM AND EEPROM  GB         6/01/89 *
0022   *   N/A       NEW YELP & EXTENDED WAIL ADDED  WJG/GB        6/12/89 *
0023   *   N/A       NOP's & JMP INITM's ADDED       GB            6/13/89 *
0024   *   N/A       Siren Tones Modified to meet    GB            6/21/89 *
0025   *             anecholic chamber specs.                             *
0026   *   N/A       Shotgun Timer Interlock Sequence GB           6/22/89 *
0027   *             Modified.                                            *
0028   *   N/A       Mode2 ==> Mode3 Man ==> Wail    GB            6/23/89 *
0029   *             Problem Sol.                                         *
0030   *   N/A       Pursuit Switch Debounce on      GB            6/30/89 *
0031   *             Open added.                                          *
0032   *   N/A       NOPs and Jumps to INITM added   GB            7/20/89 *
0033   *             to MAINLP.                                           *
0034   *   N/A       Siren Output Bit now Always     GB            7/26/89 *
0035   *             Stops on High.                                       *
0036   *   48        Siren Output Bit is Input when  GB            7/28/89 *
0037   *             not in use.                                          *
0038   *   0100      Name changed from MAIN48.S to   KENT          3/29/90 *
0039   *             MAIN0100.S to conform to new                         *
0040   *             naming convention.                                   *
0041   ************************************************************
```

```
0044                    RADIX    10
0046
0047            ************************************************************
0048            *                        EQUATES                            *
0049            ************************************************************
0050
0051   00001FF4         USRVEC   EQU    $1FF4           ;START USER VECTOR TABLE
0052   00001FDF         OPTION   EQU    $1FDF           ;MC68HC705C8 OPTION REGISTER
0053
0054   00000004         DDRA     EQU    04              ;DATA DIRECTION REGS
0055   00000005         DDRB     EQU    05
0056   00000006         DDRC     EQU    06
0057                    ******************* TIMER VARIABLES ********************
0058   00000012         TCR      EQU    $12             ;TIMER CONTROL REGISTER
0059   00000013         TSR      EQU    $13             ;TIMER STATUS REGISTER
0060   00000016         OCH      EQU    $16             ;OUTPUT COMPARE REG-HI
0061   00000017         OCL      EQU    $17             ;OUTPUT COMPARE REG-LOW
0062   00000018         TMRH     EQU    $18             ;TIMER COUNTER-HI BYTE
0063   00000019         TMRL     EQU    $19             ;TIMER COUNTER-LOW BYTE
0064   00000005         TOF      EQU    $05             ;TIMER OVERFLOW FLAG
0065   00000006         OCF      EQU    $06             ;TIMER OUTPUT COMPARE FLAG
0066   00000006         OCIE     EQU    $06             ;TIMER OUTPUT COMPARE INTERUPT ENABLE
0067   00000005         TOIE     EQU    $05             ;TIMER OVFL INTERRUPT ENABLE
0068                    ******************* SERIAL PORT VARIABLES ********************
0069   0000000D         BAUDR    EQU    $0D             ;SCI BAUD RATE REG
0070   0000000E         SCCR1    EQU    $0E             ;SCI CONTROL REG #1
0071   0000000F         SCCR2    EQU    $0F             ;SCI CONTROL REG #2
0072   00000001         RWU      EQU    $01             ;SCI RCV WAKE UP BIT
0073   00000010         SCSR     EQU    $10             ;SCI STATUS REG
0074   00000005         RIE      EQU    $05             ;SCI RCV INTERRUPT ENABLE
0075   00000002         RE       EQU    $02             ;SCI RCV ENABLE
0076   00000003         TE       EQU    $03             ;SCI XMIT ENABLE
0077   00000007         TDRE     EQU    $07             ;SCI XMIT DATA REG EMPTY
0078   00000003         WAKE     EQU    $03             ;SCI ADDR BIT WAKE MODE
0079   00000005         RDRF     EQU    05              ;SCI RCV DATA REG FULL FLAG
0080   00000011         SCDAT    EQU    $11             ;SCI SEND/RCV DATA REG
0081                    ******************* EEPROM PORT VARIABLES ********************
0082   0000000A         SPCR     EQU    $0A             ;SPI CONTROL REGISTER
0083   0000000B         SPSR     EQU    $0B             ;SPI STATUS REG
0084   0000000C         SPDR     EQU    $0C             ;SPI DATA REG
0085   00000007         SPIF     EQU    $07             ;SPI DATA TRANSFER COMPLETE
0086
0087   00000000         AMP      EQU    $00             ;PORTA=AMPLIFIER INTERFACE PORT
0088
0089   00000007         RADSEL   EQU    7               ;RADIO SELECT BIT            (PORTA)
0090   00000006         PAEN     EQU    6               ;PTT ENABLE FOR MUX             "
0091   00000005         CMRLY    EQU    5               ;COMMON MIC RELAY CONTROL BIT   "
0092   00000004         TONEN    EQU    4               ;SIREN TONE ENABLE              "
0093   00000003         XFR      EQU    3               ;HORN RING XFR RELAY CONTROL BIT "
0094   00000002         TAP      EQU    2               ;INPUT BIT FROM TAPII DETECTOR  "
0095   00000001         PTT      EQU    1               ;INPUT FROM PTT SW DETECTOR     "
0096   00000000         TONE     EQU    0               ;SIREN TONE TO PWR AMP          "
0097
0098   00000001         RELAY    EQU    $01             ;PORTB=RELAY CIRCUIT INTERFACE PORT
0099
0100   00000007         OUTETM   EQU    7               ;TIMER ENABLE BIT FOR OUTE
0101   00000006         OUTDTM   EQU    6               ;   "    "    "    OUTD
```

```
0102    00000005        OUTCTM  EQU     5       ;   "    "    "       OUTC
0103    00000004        OUTBTM  EQU     4       ;   "    "    "       OUTB
0104    00000003        OUTATM  EQU     3       ;   "    "    "       OUTA
0105    00000002        YELTM   EQU     2       ;   "    "    "FOR YELP TIME OUT
0106    00000001        HLTM    EQU     1       ;   "    "    "       HI-LOW TONE
0107    00000000        STBTM   EQU     0       ;   "    "    "       STBY TIMER
0108
0109    00000007        OUTE    EQU     7       ;RELAY OUTPUT E            (PORT B)
0110    00000006        OUTD    EQU     6       ;RELAY OUTPUT D                "
0111    00000005        OUTC    EQU     5       ;RELAY OUTPUT C                "
0112    00000004        OUTB    EQU     4       ;RELAY OUTPUT B                "
0113    00000003        OUTA    EQU     3       ;RELAY OUTPUT A                "
0114    00000002        OUT3    EQU     2       ;RELAY OUTPUT #3               "
0115    00000001        OUT2    EQU     1       ;RELAY OUTPUT #2               "
0116    00000000        OUT1    EQU     0       ;RELAY OUTPUT #1               "
0117
0118    00000000        STBYUP  EQU     0       ;PWR UP BIT FOR STBY
0119    00000003        WAUP    EQU     3       ;PWR UP BIT FOR WAIL
0120    00000004        YELUP   EQU     4       ;PWR UP BIT FOR YELP
0121    00000005        HLUP    EQU     5       ;PWR UP BIT FOR HILO
0122
0123    00000000        STB     EQU     0       ;SIREN MODE=STANDBY
0124    00000001        RA      EQU     1       ;            =RADIO
0125    00000002        WA      EQU     2       ;            =WAIL
0126    00000003        YE      EQU     3       ;            =YELP
0127    00000004        HL      EQU     4       ;            =HI/LO
0128    00000005        AHORN   EQU     5       ;            =AIR HORN
0129    00000006        PEAK    EQU     6       ;            =PEAK&HOLD
0130    00000007        SP1     EQU     7       ;            =SPECIAL
0131
0132    00000002        AUXPORT EQU     $02     ;PORTC=MISC CONTROL BITS OF PORTC
0133
0134    00000007        LATCHEN EQU     7       ;LATCH ENABLE TO RELAY CKT BD  (PORT C)
0135    00000006        EECS    EQU     6       ;EEPROM CHIP SELECT              "
0136    00000005        AMPEN   EQU     5       ;AMPLIFIER ENABLE(RELAY K1)      "
0137    00000004        BIAS    EQU     4       ;BIAS AMPLIFIER FOR AUDIO        "
0138    00000000        PURS    EQU     0       ;PURSUIT SWITCH INPUT            "
0139
0140    00000003        PORTD   EQU     $03     ;PORTD, EXCEPT SCI etc
0141
0142    00000007        CHKBIT  EQU     $07     ;RELAY BOARD PRESENT SIGNAL    (PORT D)
0143
0144                    ****** MISC BITS OF WORD "FLAG" FOR USE AS SOFTWARE FLAGS ******
0145
0146    00000000        SEGEND  EQU     0       ;END OF TONE SEGMENT FLAG
0147    00000001        TAPFLG  EQU     1       ;FLAG FOR 1ST PASS THRU TAPIN
0148    00000002        TONEFLG EQU     2       ;FLAG FOR 1ST PASS THRU STONE&AHTONE
0149    00000003        PSTFLG  EQU     3       ;FLAG FOR 1ST PASS THRU PURSUE
0150    00000004        AHFLG   EQU     4       ;FLAG FOR EACH ALT PASSES THRU AHTONE
0151    00000005        PTTFLG  EQU     5       ;FLAG FOR 1st PASS THRU PTTCHK
0152    00000007        CKSFLG  EQU     7       ;FLAG FOR CHECKSUM ERROR
0153
0155                    **************************************************************
0156                    *               DEFINE ROM CONSTANTS                          *
0157                    **************************************************************
0158
0159 R 0020         R           SECTION ROM_CONSTANTS,$0020
```

```
0160 R 0020                              ORG     $20
0161        00000030        VERSION      EQU     48              ;VERSION NUMBER
0162 R 0020 30                           BYTE    VERSION
0163
0164                        ****************************************************************
0165                        *           RAM MEMORY ALLOCATIONS                              *
0166                        ****************************************************************
0168 R 0050            R             SECTION RAM_VARIABLES,$0050
0169 R 0050                          ORG     $0050
0170 R 0050 0020         RMCOPY    DS      32            ;32 BYTES FOR COPY OF EEPROM
0171        00000050     VERSN     EQU     RMCOPY        ;HOLDS VERSION # OF SOFTWARE
0172        00000051     ALTEN     EQU     RMCOPY+1      ;DEFINE ALTERNATE ACTION OUTPUTS
0173        00000052     OUTEN1    EQU     RMCOPY+2      ;DEFINE OUTPUTS ACTIVE IN MODE 1
0174        00000053     OUTEN2    EQU     RMCOPY+3      ;"      "       "       "    2
0175        00000054     OUTEN3    EQU     RMCOPY+4      ;"      "       "       "    3
0176        00000055     TAPEN     EQU     RMCOPY+5      ;ENABLE TAPII IN MODES 0,1,2,3
0177        00000056     PWRUP     EQU     RMCOPY+6      ;SIREN SELECTED ON POWER UP
0178        00000057     TMRSEL    EQU     RMCOPY+7      ;DEFINES TIMER OUTPUTS A THRU E
0179        00000058     SIRENS    EQU     RMCOPY+8      ;DEFINES WHAT TONES ARE ENABLED/DISABLED
0180        00000059     YELTMOUT  EQU     RMCOPY+9      ;BIT 4 ENABLES YELP TIMEOUT AFTER TAPII
0181        0000006F     CHCKSUM   EQU     RMCOPY+31     ;STORAGE OF CHECKSUM
0182 R 0070 0001         PRMPTR    DS      1             ;POINTER INTO EEPROM(16 REGS OF 16 BITS)
0183 R 0071 0001         DCNTR     DS      1             ;COUNTER FOR EEPROM DELAY
0184
0185 R 0072 0001         FLAG      DS      1             ;MISC SOFTWARE FLAGS
0186 R 0073 0001         SIREN     DS      1             ;INDICATES MODE OF SIREN SYSTEM
0187 R 0074 0001         MODE      DS      1             ;INDICATES MODE OF LIGHT CONTROL
0188 R 0075 0001         RSTAT     DS      1             ;RELAY OUTPUT STATUS
0189 R 0076 0001         PMODE     DS      1             ;INDICATES MODE BEING PROGRAMMED
0190
0191 R 0077 0001         CNTEN     DS      1             ;ENABLE BITS FOR SOFTWARE CNTRS & TMRS
0192 R 0078 0001         CNTR0     DS      1
0193 R 0079 0001         LPCNT1    DS      1             ;LOOP CNTR #1 FOR TIMERS BASED ON LOOP CNT
0194 R 007A 0001         LPCNT2    DS      1             ;"       "  #2  "     "      "    "   "
0195 R 007B 0001         LPCNT3    DS      1             ;"       "  #3  "     "      "    "   "
0196 R 007C 0001         LPCNT4    DS      1             ;"       "  #4  "     "      "    "   "
0197 R 007D 0001         LPCNT5    DS      1             ;"       "  #5  "     "      "    "   "
0198 R 007E 0001         LPCNT6    DS      1             ;"       "  #6  "     "      "    "   "
0199
0200 R 007F 0001         TMREN     DS      1             ;ENABLE STBTMR,HLTMR,YELTMR & TIMER A-E
0201 R 0080 0001         STBTMR    DS      1             ;STARTS TIMING AFTER STBY PUSHBUTTON
0202 R 0081 0001         TMRA      DS      1             ;TIMER FOR OUTA
0203 R 0082 0001         TMRB      DS      1             ;      "    "  B
0204 R 0083 0001         TMRC      DS      1             ;      "    "  C
0205 R 0084 0001         TMRD      DS      1             ;      "    "  D
0206 R 0085 0001         TMRE      DS      1             ;      "    "  E
0207 R 0086 0001         YELTHR    DS      1             ;      "    YELP TIME OUT
0208 R 0087 0001         HLTMR     DS      1             ;      "    FOR HL TONE
0209 R 0088 0001         AUXSTAT   DS      1             ;AUXPORT STATUS
0210
0211 R 0089 0001         TEMPX     DS      1             ;TEMP STORAGE FOR X REG
0212 R 008A 0001         LEDX      DS      1             ;TEMP STORAGE FOR LED STATUS
0213 R 008B 0001         DISPLA    DS      1             ;STATUS OF FIRST 8 LEDs(SIREN)
0214 R 008C 0001         DISPLB    DS      1             ;      "    SECOND 8 LEDs(LIGHTS)
0215 R 008D 0001         SREGA     DS      1             ;SHIFT REGISTER A-GENERAL USE
0216 R 008E 0001         SREGB     DS      1             ;      "    "   B
0217 R 008F 0001         SREGC     DS      1             ;      "    "   C
0218
```

```
0219 R 0090 0001        OFFSETH  DS    1              ;OFFSET HIGH BYTE
0220 R 0091 0001        OFFSETL  DS    1              ;OFFSET LOW BYTE
0221 R 0092 0001        OCLTEMP  DS    1              ;TEMP STORAGE FOR OCL BYTE
0222 R 0093 0001        SEGPNTR  DS    1              ;POINTS TO LIST OF SEGMENT SIZES
0223 R 0094 0001        SEGCNT   DS    1              ;COUNTER FOR # OF SEGMENTS
0224 R 0095 0001        CYCLCNT  DS    1              ;COUNTER FOR #CYCLES PER SEGMENT
0225 R 0096 0001        INDEX    DS    1              ;TONE TABLE START ADDR FOR X REG
0226 R 0097 0001        SINDEX   DS    1              ;TEMPORARY INDEX STORAGE
0227
0229                    ************************************************************
0230                    *     INITM: SETS THE DDR FOR EACH PORT AND SETS INITIAL    *
0231                    *     VALUES IN EACH DATA REGISTER.                         *
0232                    *         PA0-7=AMP(AMPLIFIER INTERFACE)                    *
0233                    *         PB0-7=RELAY(RELAY CIRCUIT INTERFACE)              *
0234                    *         PC0-7=MISC BITS IN PORTC(EEPROM,RELAY CKT LE)     *
0235                    *         PD0-7=SCI, RELAY CKT SENSOR                       *
0236                    ************************************************************
0237
0238 I 0100           I          SECTION  INITM,$100
0239 I 0100                      ORG      $100
0240
0241 I 0100 A6F8        INITM:   LDA   #%11111000     ;was %11111001    {COLD START}
0242 I 0102 B704                 STA   DDRA           ;SET PORTA DDR
0243 I 0104 A6FF                 LDA   #%11111111
0244 I 0106 B705                 STA   DDRB           ;SET PORTB DDR
0245 I 0108 A6F2                 LDA   #%11110010     ;was %11111110
0246 I 010A B706                 STA   DDRC           ;SET PORTC DDR
0247 I 010C A653                 LDA   #%01010011
0248 I 010E B70A                 STA   SPCR           ;ENABLE SPI AS MASTER, CLK/32 etc
0249 I 0110 3F02                 CLR   AUXPORT
0250 I 0112 A633                 LDA   #$33           ;SET BAUD RATE=1200 BPS
0251 I 0114 B70D                 STA   BAUDR
0252 I 0116 3F0E                 CLR   SCCR1
0253 I 0118 3F0F                 CLR   SCCR2
0254 I 011A 160E                 BSET  WAKE,SCCR1     ;SET SCI ADDR WAKE UP MODE
0255 I 011C 160F                 BSET  TE,SCCR2       ;ENABLE SCI XMIT
0256 I 011E 1A0F                 BSET  RIE,SCCR2      ;ENABLE RECEIVE INTERRUPTS
0257 I 0120 140F                 BSET  RE,SCCR2       ;ENABLE SCI RECEIVER(FROM HEAD)
0258 I 0122 1A12                 BSET  TOIE,TCR       ;ENABLE TIMER OVERFLOW INTERRUPTS
0260 I 0124 B650        RAMCHK:  LDA   VERSN
0261 I 0126 A130                 CMP   #VERSION
0262 I 0128 2609                 BNE   RESTART
0263 I 012A CD04E7               JSR   CSUM           ;CHECK FOR RAM CHECKSUM ERROR
0264 I 012D 0E7203               BRSET CKSFLG,FLAG,RESTART ;IF BAD BRANCH TO RESTART
0265 I 0130 CC0250               JMP   BDCHKX         ;ELSE ENABLE INTERRUPTS AND BRANCH TO MAIN
0267 I 0133 A6F8        RESTART: LDA   #$F8           ;SET PORTA DDR {WARM START} {STARTS MAIN}
0268 I 0135 B704                 STA   DDRA
0269 I 0137 A6FF                 LDA   #$FF           ;SET PORTB DDR
0270 I 0139 B705                 STA   DDRB
0271 I 013B A6F2                 LDA   #$F2           ;SET PORTC DDR
0272 I 013D B706                 STA   DDRC
0273 I 013F 3F02                 CLR   AUXPORT
0274 I 0141 A633                 LDA   #$33           ;SET BAUD RATE=1200 BPS
0275 I 0143 B70D                 STA   BAUDR
0276 I 0145 3F0E                 CLR   SCCR1
0277 I 0147 3F0F                 CLR   SCCR2
0278 I 0149 160E                 BSET  WAKE,SCCR1     ;SET SCI ADDR WAKE UP MODE
```

```
0279 I 014B 160F          BSET    TE,SCCR2            ;ENABLE SCI XMIT
0280 I 014D 1A0F          BSET    RIE,SCCR2           ;ENABLE RECEIVE INTERRUPTS
0281 I 014F 140F          BSET    RE,SCCR2            ;ENABLE SCI RECEIVER(FROM HEAD)
0282 I 0151 A653          LDA     #$53
0283 I 0153 870A          STA     SPCR                ;ENABLE SPI AS MASTER, CLK/32 etc
0284 I 0155 1A12          BSET    TOIE,TCR            ;ENABLE TIMER OVERFLOW INTERRUPTS
0285 I 0157 3F00          CLR     AMP                 ;SET AMP INTERFACE TO STBY MODE {Old Restart Point}
0286 I 0159 3F01          CLR     RELAY               ;SET RELAY INTERFACE TO MOD0
0287 I 015B 1E02          BSET    LATCHEN,AUXPORT     ;LATCH DATA TO RELAY INTERFACE
0288 I 015D 1F02          BCLR    LATCHEN,AUXPORT
0289 I 015F 4F            CLRA
0290 I 0160 B774          STA     MODE                ;CLEAR MODE
0291 I 0162 B776          STA     PMODE               ;CLEAR PROGRAM MODE
0292 I 0164 B773          STA     SIREN               ;CLEAR SIREN
0293 I 0166 8751          STA     ALTEN               ;SET ALL OUTPUTS=MOM
0294 I 0168 B78B          STA     DISPLA              ;CLR LED DISPLAY
0295 I 016A B78C          STA     DISPLB              ;"    "    "
0296 I 016C B78D          STA     SREGA               ;CLR SHIFT REGISTER A
0297 I 016E B78E          STA     SREGB               ;"    "    "    B
0298 I 0170 B78F          STA     SREGC               ;"    "    "    C
0299 I 0172 B772          STA     FLAG                ;CLEAR ALL FLAGS
0300 I 0174 B775          STA     RSTAT               ;CLEAR RELAY STATUS
0301 I 0176 B777          STA     CNTEN               ;DISABLE ALL SOFTWARE COUNTERS
0302 I 0178 877F          STA     TMREN               ;DISABLE ALL TIMERS
0303 I 017A B780          STA     STBTMR              ;CLEAR ALL TIMERS
0304 I 017C B781          STA     TMRA
0305 I 017E B782          STA     TMRB
0306 I 0180 B783          STA     TMRC
0307 I 0182 B784          STA     TMRD
0308 I 0184 B785          STA     TMRE
0309 I 0186 B786          STA     YELTMR
0310 I 0188 B787          STA     HLTMR               ;CLEAR HI/LO TIMER
0311 I 018A B702          STA     AUXPORT             ;CLEAR AUXPORT(C)
0312 I 018C B788          STA     AUXSTAT             ;CLEAR STATUS OF AUXPORT
0313 I 018E B757          STA     TMRSEL
0314 I 0190 B758          STA     SIRENS
0315 I 0192 B756          STA     PWRUP
0316 I 0194 B759          STA     YELTMOUT
0317 I 0196 B779          STA     LPCNT1
0318 I 0198 B77A          STA     LPCNT2
0319 I 019A B77B          STA     LPCNT3
0320 I 019C B77C          STA     LPCNT4
0321 I 019E A601          LDA     #$01
0322 I 01A0 B790          STA     OFFSETH             ;INIT TIMER OFFSETH TO 700 HZ
0323 I 01A2 A666          LDA     #$66
0324 I 01A4 B791          STA     OFFSETL             ;INIT TIMER OFFSETL TO 700 HZ
0326
0327                      ************************************************************
0328                      *                              RDPROM6.SRC WJG 11-9-88      *
0329                      *   RDPROM READS 16, 16 BIT WORDS FROM THE EEPROM AND SAVES *
0330                      *   THEM IN RAM STARTING @ RMCOPY. USES SPI, XREG, PRMPTR AS*
0331                      *   POINTER INTO EEPROM. PORT C, BIT 6 AS EEPROM CS.        *
0332                      *   ACC & X REG ARE LOST.                                   *
0333                      ************************************************************
0334
0335 I 01A6 5F    RDPROM: CLRX                        ;INIT RDPROM
0336 I 01A7 3F70          CLR     PRMPTR
```

```
0337 I 01A9 B60B              LDA     SPSR
0338 I 01AB B60C              LDA     SPDR            ;CLEAR SPIF
0339 I 01AD A601     RDPROM1: LDA     #$01
0340 I 01AF CD0627            JSR     PRMSND          ;SEND START BIT
0341 I 01B2 B670              LDA     PRMPTR          ;GET PROM REG#
0342 I 01B4 AA80              ORA     #$80            ;ORA W/READ INSTR
0343 I 01B6 CD0627            JSR     PRMSND          ;SEND READ INSTRUCTION
0344 I 01B9 CD0627            JSR     PRMSND          ;DUMMY WRITE TO START CLOCK
0345 I 01BC B60C              LDA     SPDR            ;READ INPUT DATA
0346 I 01BE B78D              STA     SREGA           ;SAVE IN SREG A
0347 I 01C0 CD0627            JSR     PRMSND          ;START CLK AGAIN
0348 I 01C3 B60C              LDA     SPDR            ;READ SECOND BYTE
0349 I 01C5 B78E              STA     SREGB           ;SAVE IN SREG B
0350 I 01C7 CD0627            JSR     PRMSND          ;START CLK AGAIN
0351 I 01CA B60C              LDA     SPDR            ;READ 3RD BYTE
0352 I 01CC B78F              STA     SREGC           ;SAVE IN SREG C
0353 I 01CE 1D02              BCLR    EECS,AUXPORT    ;TURN OFF CS FOR >1US
0354 I 01D0 1C02              BSET    EECS,AUXPORT
0355 I 01D2 388F              LSL     SREGC
0356 I 01D4 398E              ROL     SREGB
0357 I 01D6 398D              ROL     SREGA
0358 I 01D8 B68D              LDA     SREGA
0359 I 01DA E750              STA     RMCOPY,X
0360 I 01DC 5C                INCX
0361 I 01DD B68E              LDA     SREGB
0362 I 01DF E750              STA     RMCOPY,X
0363 I 01E1 5C                INCX
0364 I 01E2 3C70              INC     PRMPTR
0365 I 01E4 A320              CPX     #$20
0366 I 01E6 25C5              BLO     RDPROM1
0367 I 01E8 1D02     RDPROMX: BCLR    EECS,AUXPORT
0368
0370 I 01EA B650     VERCHK:  LDA     VERSN           ;COMPARE CONTENTS OF VERSN W/VERSION #
0371 I 01EC A130              CMP     #VERSION        ; IF NOT SAME,THEN LOAD STANDARD PROGRAM
0372 I 01EE 2606              BNE     DEFAULT
0373 I 01F0 CD04E7            JSR     CSUM            ;CHECK FOR EEPROM CHECKSUM ERROR
0374 I 01F3 0F7231            BRCLR   CKSFLG,FLAG,STBYCHK ;IF GOOD BRANCH TO STBYCHK
0375 I 01F6 A630     DEFAULT: LDA     #VERSION        ;   STORE CURRENT VERSION #
0376 I 01F8 B750              STA     VERSN
0377 I 01FA A601              LDA     #$01            ;   SET OUT1 ON IN MODE 1
0378 I 01FC B752              STA     OUTEN1
0379 I 01FE A603              LDA     #$03            ;   SET OUT 1&2 ON IN MODE 2
0380 I 0200 B753              STA     OUTEN2
0381 I 0202 A607              LDA     #$07            ;   SET OUT 1,2 & 3 ON IN MODE 3
0382 I 0204 B754              STA     OUTEN3
0383 I 0206 A608              LDA     #$08            ;   SET PWR UP=WAIL
0384 I 0208 B756              STA     PWRUP
0385 I 020A A606              LDA     #$06            ;   SET HR XFR FOR MODES 2 & 3
0386 I 020C B755              STA     TAPEN
0387 I 020E A67F              LDA     #$7F            ;   SET OUTE=MOMENTARY
0388 I 0210 B751              STA     ALTEN
0389 I 0212 A608              LDA     #$08            ;   SET OUTA=TIMER
0390 I 0214 B757              STA     THRSEL
0391 I 0216 A6B8              LDA     #$B8            ;   ALL TONES ENABLED
0392 I 0218 B758              STA     SIRENS
0393 I 021A A610              LDA     #$10            ;   YELP TIME ENABLED
0394 I 021C B759              STA     YELTMOUT        ;   CORRECT CHECKSUM HERE WOULD BE $#90
```

```
0395 I 021E CD04E7                JSR     CSUM            ; GET VALID CHECKSUM
0396 I 0221 CD05DB                JSR     WRPROM          ; SAVE STD PROGRAM
0397 I 0224 CC01A6                JMP     RDPROM          ; CHECK IT
0398
0399 I 0227 1F72        STBYCHK:  BCLR    CKSFLG,FLAG     ; CLEAR CHECKSUM ERROR FLAG
0400 I 0229 015603                BRCLR   STBYUP,PWRUP,WACHK
0401 I 022C CD064C                JSR     STBY
0402 I 022F 075603      WACHK:    BRCLR   WAUP,PWRUP,YECHK
0403 I 0232 CD068C                JSR     WAIL
0404 I 0235 095603      YECHK:    BRCLR   YELUP,PWRUP,HLCHK
0405 I 0238 CD06A7                JSR     YELP
0406 I 023B 0B5603      HLCHK:    BRCLR   HLUP,PWRUP,PWRCHKX
0407 I 023E CD06C8                JSR     HILO
0408 I 0241 9D          PWRCHKX:  NOP                     ;   END PWRCHK
0409 I 0242 0E0305      BDCHK:    BRSET   CHKBIT,PORTD,BDCHK1 ; SET FOR NORMAL POLARITY, CLR FOR REV
0410 I 0245 CD0737                JSR     MOD0            ;IF RELAY BD PRESENT, THEN SET MODE=0
0411 I 0248 2006                  BRA     BDCHKX
0412 I 024A CD0760      BDCHK1:   JSR     MOD3            ;ELSE,SET MODE=3
0413 I 024D CD064C                JSR     STBY            ;  SET SIREN=STBY
0414 I 0250 9A          BDCHKX:   CLI                     ;ENABLE INTERRUPTS
0415
0417                   ************************************************************
0418                   *   MAIN.LP:UPDATES RELAY STATUS,AMPLIFIER STATUS,  2-27-89 *
0419                   *   CHECKS FOR TAPII,PTT AND HORN RING INPUTS & TURNS       *
0420                   *   OFF ALL OUTPUTS PROGRAMMED FOR MOMENTARY IF NO KEY      *
0421                   *   IS DEPRESSED.                                           *
0422                   *   ALL OTHER FUNCTIONS ARE INTERRUPTS OR SUBROUTINES       *
0423                   ************************************************************
0424
0425 I 0251 0E7622      MAINLP:   BRSET   7,PMODE,CONTINUE
0426 I 0254 A6F9                  LDA     #$F9            ;SET PORTA DDR
0427 I 0256 8704                  STA     DDRA
0428 I 0258 A6FF                  LDA     #$FF            ;SET PORTB DDR
0429 I 025A 8705                  STA     DDRB
0430 I 025C A6F2                  LDA     #$F2            ;SET PORTC DDR
0431 I 025E 8706                  STA     DDRC
0432 I 0260 A633                  LDA     #$33            ;SET BAUD RATE=1200 BPS
0433 I 0262 B70D                  STA     BAUDR
0434 I 0264 B650                  LDA     VERSN           ;IF RAM IS VALID, THEN
0435 I 0266 A130                  CMP     #VERSION        ;    BRANCH TO CONTINUE
0436 I 0268 2703                  BEQ     CONTCSUM        ; ELSE,RESTART
0437 I 026A CC0133                JMP     RESTART
0438 I 026D CD04E7      CONTCSUM: JSR     CSUM            ;CHECK FOR RAM CHECKSUM ERROR
0439 I 0270 0F7203                BRCLR   CKSFLG,FLAG,CONTINUE ;IF BAD BRANCH TO RESTART
0440 I 0273 CC0133                JMP     RESTART
0441 I 0276 B675        CONTINUE: LDA     RSTAT           ;DO UNTIL INTERRUPTED
0442 I 0278 B701                  STA     RELAY           ;    UPDATE RELAY CIRCUITS
0443 I 027A 1E02                  BSET    LATCHEN,AUXPORT
0444 I 027C 1F02                  BCLR    LATCHEN,AUXPORT
0445 I 027E B602        WATCHDG:  LDA     AUXPORT         ;TOGGLE OUTPUT TO RESET WATCHDOG
0446 I 0280 A802                  EOR     #$02
0447 I 0282 B702                  STA     AUXPORT
0448 I 0284 2006                  BRA     UPDATE
0449 I 0286 9D9D9D                DB      3 DUP ($9D)
0450 I 0289 CC0100                JMP     INITM
0451
```

```
0452                 ****************************************************************
0453                 *                                           UPDATE:7-20-88       *
0454                 *   UPDATE STATUS OF ALL 16 LEDs IN HEAD, 1 LED PER PASS         *
0455                 *   GET STATUS FROM LED0: THRU LEDF:                             *
0456                 *   SEND BYTE OUT SCI RS-232 SERIAL PORT                         *
0457                 *   BYTE INDICATES ON/OFF STATUS OF LED, SLO OR FAST FLASH       *
0458                 ****************************************************************
0459
0460 I 028C BE8A     UPDATE:  LDX    LEDX               ;GET PRESENT VALUE OF X
0461 I 028E A310              CPX    #$10               ;IF X>15, THEN
0462 I 0290 250E              BLO    UPDAT1             ;    CLEAR PRESENT VALUE OF X
0463 I 0292 170F              BCLR   TE,SCCR2           ;    DISABLE TRANSMITTER
0464 I 0294 3F8A              CLR    LEDX               ;    ENABLE TRANSMITTER
0465 I 0296 B68B              LDA    DISPLA             ;    GET PRESENT LED STATUS BYTES
0466 I 0298 B78D              STA    SREGA              ;ROTATE RIGHT TO CARRY BIT
0467 I 029A B68C              LDA    DISPLB             ;IF CARRY SET, THEN
0468 I 029C B78E              STA    SREGB              ;    SET BIT4 OF LEDX
0469 I 029E 160F              BSET   TE,SCCR2
0470 I 02A0 0F1015   UPDAT1:  BRCLR  TDRE,SCSR,UPDATX
0471 I 02A3 98                CLC
0472 I 02A4 368E              ROR    SREGB              ;ELSE, CLEAR BIT 4 OF LEDX
0473 I 02A6 368D              ROR    SREGA
0474 I 02A8 2404              BCC    UPDAT2
0475 I 02AA 188A              BSET   4,LEDX
0476 I 02AC 2002              BRA    UPDAT3
0477 I 02AE 198A     UPDAT2:  BCLR   4,LEDX
0478 I 02B0 B68A     UPDAT3:  LDA    LEDX
0479 I 02B2 B711              STA    SCDAT
0480 I 02B4 198A              BCLR   4,LEDX
0481 I 02B6 3C8A              INC    LEDX
0482 I 02B8 9D       UPDATX:  NOP                       ;END  UPDATE
0483 I 02B9 0E7695            BRSET  7,PMODE,MAINLP
0484 I 02BC 2006              BRA    PURSUE
0485 I 02BE 9D9D9D            DB     3 DUP ($9D)
0486 I 02C1 CC0100            JMP    INITM
0487
0488                 ****************************************************************
0489                 *                                           30-Jun-89 WJG  6B   *
0490                 *                                                                *
0491                 *   PURSUE:TOGGLE IN/OUT OF MODE 3 IF INPUT FROM PURS SWITCH     *
0492                 *                                                                *
0493                 ****************************************************************
0494
0495 I 02C4 010216   PURSUE:  BRCLR  PURS,AUXPORT,PURSU1  ;IF INPUT FROM PURS,THEN
0496 I 02C7 06722B            BRSET  PSTFLG,FLAG,PURSUX   ;   IF PSTFLG CLEAR,THEN
0497 I 02CA 3C79              INC    LPCNT1               ;DEBOUNCE CLOSURE BY NOT COUNTING
0498 I 02CC 2627              BNE    PURSUX               ;PURSUIT SWITCH AS VALID CLOSURE
0499 I 02CE 3C7A              INC    LPCNT2               ;UNTIL IT HAS BEEN HELD
0500 I 02D0 A602              LDA    #$02                 ;THROUGH $200 MAINLP CYCLES
0501 I 02D2 B17A              CMP    LPCNT2               ;WITHOUT ANY RELEASES.
0502 I 02D4 261F              BNE    PURSUX
0503 I 02D6 CD0760            JSR    MOD3
0504 I 02D9 1672              BSET   PSTFLG,FLAG
0505 I 02DB 2018              BRA    PURSUX
0506 I 02DD B679     PURSU1:  LDA    LPCNT1               ;DEBOUNCE RELEASE BY NOT COUNTING
0507 I 02DF 2704              BEQ    PURSU2               ;PURSUE SWITCH AS VALID RELEASE
0508 I 02E1 3A79              DEC    LPCNT1               ;UNTIL IT HAS BEEN HELD THROUGH
```

```
0509 I 02E3 2010                 BRA    PURSUX         ;AS MANY MAINLP CYCLES AS IT WAS
0510 I 02E5 B67A       PURSU2:   LDA    LPCNT2         ;CLOASED PRIOR TO ACKNOWLEDGEMENT
0511 I 02E7 2706                 BEQ    PURSU3         ;OF VALID CLOSURE.
0512 I 02E9 3A79                 DEC    LPCNT1
0513 I 02EB 3A7A                 DEC    LPCNT2
0514 I 02ED 2006                 BRA    PURSUX
0515 I 02EF 1772       PURSU3:   BCLR   PSTFLG,FLAG    ;ELSE, CLEAR FLAG
0516 I 02F1 3F79                 CLR    LPCNT1
0517 I 02F3 3F7A                 CLR    LPCNT2
0518 I 02F5 2006       PURSUX:   BRA    HRING          ;END PURSUE
0519 I 02F7 9D9D9D               DB     3 DUP ($9D)
0520 I 02FA CC0100               JMP    INITM
0521
0522                   ***************************************************************
0523                   *                                                    5-25-88  *
0524                   *   ENERGIZE HORN RING XFR RELAY IF MODE SO PROGRAMMED        *
0525                   *                                                             *
0526                   ***************************************************************
0527
0528 I 02FD B674       HRING:    LDA    MODE           ;IF MODE PRGRMD FOR TAPII, THEN
0529 I 02FF B455                 AND    TAPEN          ;  ENERGIZE HORN XFR RELAY
0530 I 0301 2704                 BEQ    HRING1         ;  ELSE, DE-ENERGIZE XFR RELAY
0531 I 0303 1600                 BSET   XFR,AMP
0532 I 0305 2002                 BRA    HRING2
0533 I 0307 1700       HRING1:   BCLR   XFR,AMP
0534 I 0309 2006       HRING2:   BRA    TAPIN          ;END HRING
0535 I 030B 9D9D9D               DB     3 DUP ($9D)
0536 I 030E CC0100               JMP    INITM
0537
0538                   ***************************************************************
0539                   *                    TAPIN 3-27-89 WJG                         *
0540                   *       TAPIN CHKS FOR INPUT FROM TAPII                        *
0541                   ***************************************************************
0542
0543 I 0311 040016     TAPIN:    BRSET  TAP,AMP,TAPIN1 ;IF INPUT FROM TAP, THEN
0544 I 0314 027224               BRSET  TAPFLG,FLAG,TAPINX ; IF TAPFLG CLEAR, THEN
0545 I 0317 3C7B                 INC    LPCNT3
0546 I 0319 2620                 BNE    TAPINX
0547 I 031B 3C7C                 INC    LPCNT4
0548 I 031D A602                 LDA    #$02
0549 I 031F B17C                 CMP    LPCNT4
0550 I 0321 2618                 BNE    TAPINX
0551 I 0323 CD06E0               JSR    TAPII
0552 I 0326 1272                 BSET   TAPFLG,FLAG
0553 I 0328 2011                 BRA    TAPINX
0554 I 032A 03720C     TAPIN1:   BRCLR  TAPFLG,FLAG,TAPIN2 ;IF NO INPUT FROM TAP,THEN
0555 I 032D 1D73                 BCLR   PEAK,SIREN     ;  IF TAPFLG SET, THEN
0556 I 032F 1B73                 BCLR   AHORN,SIREN    ;    CLEAR AHORN&PEAK
0557 I 0331 1F8B                 BCLR   7,DISPLA      ;    CLEAR DISPLAY
0558 I 0333 1D8B                 BCLR   6,DISPLA
0559 I 0335 3F7B                 CLR    LPCNT3
0560 I 0337 3F7C                 CLR    LPCNT4
0561 I 0339 1372       TAPIN2:   BCLR   TAPFLG,FLAG    ;ELSE, CLEAR TAPFLG
0562 I 033B 2006       TAPINX:   BRA    RADCHK         ;END TAPIN
0563 I 033D 9D9D9D               DB     3 DUP ($9D)
0564 I 0340 CC0100               JMP    INITM
0565
```

```
0566                    ******************************************************
0567                    *       ENABLE AMP FOR RADIO MODE          1-6-89 WJG  *
0568                    ******************************************************
0569
0570 I 0343 03730C      RADCHK:  BRCLR   RA,SIREN,PTTCHK
0571 I 0346 1E00                 BSET    RADSEL,AMP
0572 I 0348 1D00                 BCLR    PAEN,AMP
0573 I 034A 2030                 BRA     VOICE
0574 I 034C 9D9D9D               DB      3 DUP ($9D)
0575 I 034F CC0100               JMP     INITM
0576
0577                    ******************************************************
0578                    *       CHECK FOR INPUT FROM PTT SW        1-4-89     *
0579                    ******************************************************
0580
0581 I 0352 030017      PTTCHK:  BRCLR   PTT,AMP,PTTCHK2       ;CHECK FOR PTT INPUT
0582 I 0355 0A7212               BRSET   PTTFLG,FLAG,PTTCHK1
0583 I 0358 3C7D                 INC     LPCNT5
0584 I 035A 2618                 BNE     PTTCHKX
0585 I 035C 3C7E                 INC     LPCNT6
0586 I 035E A602                 LDA     #$02
0587 I 0360 B17E                 CMP     LPCNT6
0588 I 0362 2610                 BNE     PTTCHKX
0589 I 0364 1C00                 BSET    PAEN,AMP
0590 I 0366 1F00                 BCLR    RADSEL,AMP
0591 I 0368 1A72                 BSET    PTTFLG,FLAG
0592 I 036A 2010      PTTCHK1:   BRA     VOICE
0593 I 036C 1B72      PTTCHK2:   BCLR    PTTFLG,FLAG
0594 I 036E 1D00                 BCLR    PAEN,AMP
0595 I 0370 3F7D                 CLR     LPCNT5
0596 I 0372 3F7E                 CLR     LPCNT6
0597 I 0374 2013      PTTCHKX:   BRA     AHCHK
0598 I 0376 9D9D9D               DB      3 DUP ($9D)
0599 I 0379 CC0100               JMP     INITM
0600
0601                    ******************************************************
0602                    *                                                     *
0603                    *    VOICE:SETS MUX AND AMP FOR VOICE, ENABLES AMP  1-4-89  *
0604                    *                                                     *
0605                    ******************************************************
0606
0607 I 037C 1A02        VOICE:   BSET    AMPEN,AUXPORT
0608 I 037E 1802                 BSET    BIAS,AUXPORT
0609 I 0380 CC03E0               JMP     NOTONE
0610 I 0383 9D9D9D               DB      3 DUP ($9D)
0611 I 0386 CC0100               JMP     INITM
0612
0613                    ******************************************************
0614                    *                                                     *
0615                    *       AHCHK                              1-4-89     *
0616                    *                                                     *
0617                    ******************************************************
0618
0619 I 0389 0B730F      AHCHK:   BRCLR   AHORN,SIREN,PKCHK
0620 I 038C CD0506               JSR     DOTONE
0621 I 038F CD059F               JSR     AHTONE
0622 I 0392 CC03FA               JMP     BDISPLY
```

BEST AVAILABLE COPY

```
0623 I 0395 9D9D9D                DB      3 DUP ($9D)
0624 I 0398 CC0100                JMP     INITM
0625
0626                      *************************************************
0627                      *    PKCHK                      1-4-89           *
0628                      *************************************************
0629
0630 I 039B 0D730F        PKCHK:  BRCLR   PEAK,SIREN,TONCHK
0631 I 039E CD0506                JSR     DOTONE
0632 I 03A1 CD0515                JSR     STONE
0633 I 03A4 CC03FA                JMP     BDISPLY
0634 I 03A7 9D9D9D                DB      3 DUP ($9D)
0635 I 03AA CC0100                JMP     INITM
0636
0637                      *************************************************
0638                      *                                                *
0639                      *    TONCHK:                    1-4-89           *
0640                      *                                                *
0641                      *************************************************
0642
0643 I 03AD 05742E        TONCHK: BRCLR   2,MODE,NOAMP      ; IF WAIL THEN
0644 I 03B0 057308                BRCLR   WA,SIREN,TCHK1
0645 I 03B3 CD0506                JSR     DOTONE
0646 I 03B6 CD0515                JSR     STONE
0647 I 03B9 203F                  BRA     BDISPLY
0648 I 03BB 077308        TCHK1:  BRCLR   YE,SIREN,TCHK2    ; IF YELP THEN
0649 I 03BE CD0506                JSR     DOTONE
0650 I 03C1 CD056A                JSR     YTONE
0651 I 03C4 2034                  BRA     BDISPLY
0652 I 03C6 09730A        TCHK2:  BRCLR   HL,SIREN,TCHK3
0653 I 03C9 CD0506                JSR     DOTONE
0654 I 03CC 127F                  BSET    HLTM,TMREN
0655 I 03CE CD05C7                JSR     HLTONE
0656 I 03D1 2027                  BRA     BDISPLY
0657 I 03D3 0F7308        TCHK3:  BRCLR   SP1,SIREN,NOAMP
0658 I 03D6 CD0506                JSR     DOTONE
0659 I 03D9 CD05C6                JSR     SP1TONE
0660 I 03DC 201C                  BRA     BDISPLY
0661 I 03DE 1802          NOAMP:  BCLR    AMPEN,AUXPORT
0662 I 03E0 1572          NOTONE: BCLR    TONEFLG,FLAG
0663 I 03E2 1100                  BCLR    TONE,AMP          ; Added to zero Siren Output
0664 I 03E4 1000                  BSET    TONE,AMP          ; Added to zero Siren Output
0665 I 03E6 1104                  BCLR    0,DDRA
0666 I 03E8 1000                  BSET    TONE,AMP          ; Added to zero Siren Output
0667 I 03EA 1900                  BCLR    TONEN,AMP
0668 I 03EC 1D12                  BCLR    OCIE,TCR
0669 I 03EE 137F                  BCLR    HLTM,TMREN
0670 I 03F0 3F87                  CLR     HLTMR
0671 I 03F2 2006                  BRA     BDISPLY
0672 I 03F4 9D9D9D                DB      3 DUP ($9D)
0673 I 03F7 CC0100                JMP     INITM
0674
0675                      *************************************************
0676                      *                                BDISPLY WJG 10-11-88 *
0677                      *  BDISPLY SETS DISPLB=RELAY STATUS(A-E), AND MODE   *
0678                      *************************************************
0679
```

```
0680 I 03FA 8675           BDISPLY: LDA    RSTAT           ;SET DISPLB=MODES 1-3, OUTA-E
0681 I 03FC A4F8                    AND    #$F8
0682 I 03FE BA74                    ORA    MODE
0683 I 0400 B78C                    STA    DISPLB
0684 I 0402 2006                    BRA    THRCHKS                         BEST AVAILABLE COPY
0685 I 0404 9D9D9D                  DB     3 DUP ($9D)
0686 I 0407 CC0100                  JMP    INITM
0687
0688                      ************************************************************
0689                      *                                              1-25-89       *
0690                      *   THRCHK:CHECKS BIT 6 OF TIMERS A-E,CLEARS CORRESPONDING   *
0691                      *   THREN BIT IF SET                                         *
0692                      ************************************************************
0693
0694 I 040A 0D8006         THRCHKS: BRCLR  6,STBTMR,THRCHKA ; was 4 for STBTMR
0695 I 040D 1775                    BCLR   OUTA,RSTAT
0696 I 040F 117F                    BCLR   STB,THREN
0697 I 0411 3F80                    CLR    STBTMR
0698 I 0413 0D8104         THRCHKA: BRCLR  6,THRA,THRCHKB   ; was 6 for Shotgun Timer
0699 I 0416 177F                    BCLR   OUTATH,THREN
0700 I 0418 3F81                    CLR    THRA
0701 I 041A 0D8206         THRCHKB: BRCLR  6,THRB,THRCHKC
0702 I 041D 1975                    BCLR   OUTB,RSTAT
0703 I 041F 197F                    BCLR   OUTBTH,THREN
0704 I 0421 3F82                    CLR    THRB
0705 I 0423 0D8306         THRCHKC: BRCLR  6,THRC,THRCHKD
0706 I 0426 1875                    BCLR   OUTC,RSTAT
0707 I 0428 187F                    BCLR   OUTCTH,THREN
0708 I 042A 3F83                    CLR    THRC
0709 I 042C 0D8406         THRCHKD: BRCLR  6,THRD,THRCHKE
0710 I 042F 1D75                    BCLR   OUTD,RSTAT
0711 I 0431 1D7F                    BCLR   OUTDTH,THREN
0712 I 0433 3F84                    CLR    THRD
0713 I 0435 0D8506         THRCHKE: BRCLR  6,THRE,YELCHK
0714 I 0438 1F75                    BCLR   OUTETH,RSTAT
0715 I 043A 1F7F                    BCLR   OUTE,THREN
0716 I 043C 3F85                    CLR    THRE
0717 I 043E 077309         YELCHK:  BRCLR  YE,SIREN,YELCHK1
0718 I 0441 057406                  BRCLR  2,MODE,YELCHK1
0719 I 0444 0D8607                  BRCLR  6,YELTHR,THRCHKX
0720 I 0447 CD06E0                  JSR    TAPII
0721 I 044A 3F86          YELCHK1:  CLR    YELTHR
0722 I 044C 157F                    BCLR   YELTH,THREN
0723
0724 I 044E CC0251         THRCHKX: JMP    MAINLP           ;      END THRCHK   {END OF MAIN!}
0725 I 0451 9D9D9D                  DB     3 DUP ($9D)
0726 I 0454 CC0100                  JMP    INITM
0727
0729                      ************************************************************
0730                      *    JUMP TABLE FOR INPUT COMMAND INTERPRETATION             *
0731                      ************************************************************
0732
0733 I 0457 CC0649         JMPTAB:  JMP    STBY0            ; was STBY changed for Shotgun Interlock
0734 I 045A CC066E         JMP1:    JMP    RAD
0735 I 045D CC067E         JMP2:    JMP    PA
0736 I 0460 CC068C         JMP3:    JMP    WAIL
0737 I 0463 CC06A7         JMP4:    JMP    YELP
```

BEST AVAILABLE COPY

```
0738 I 0466 CC06C8          JMP5:    JMP     HILO
0739 I 0469 CC06E0          JMP6:    JMP     TAPII
0740 I 046C CC072D          JMP7:    JMP     AH
0741 I 046F CC0740          JMP8:    JMP     MOD1
0742 I 0472 CC0750          JMP9:    JMP     MOD2
0743 I 0475 CC0760          JMPA:    JMP     MOD3
0744 I 0478 CC0774          JMPB:    JMP     PBA
0745 I 047B CC0788          JMPC:    JMP     PBB
0746 I 047E CC079E          JMPD:    JMP     PBC
0747 I 0481 CC07B4          JMPE:    JMP     PBD
0748 I 0484 CC07CA          JMPF:    JMP     PBE
0749 I 0487 8181818181818181         DB      48 DUP ($81)
             8181818181818181
             8181818181818181
             8181818181818181
             8181818181818181
             8181818181818181
0750
0751                        ***************************************************
0752                        *   THESE JUMPS ARE TAKEN WHILE IN PRGRM MODE, ie., *
0753                        *   KEYCODE=LOWER CASE, BIT D5=1                    *
0754                        ***************************************************
0755
0756 I 04B7 CC07E0          JMPP0:   JMP     PSTBY
0757 I 04BA CC07EE          JMPP1:   JMP     PRAD
0758 I 04BD CC07F4          JMPP2:   JMP     PPA
0759 I 04C0 CC07FA          JMPP3:   JMP     PWAIL
0760 I 04C3 CC082A          JMPP4:   JMP     PYELP
0761 I 04C6 CC085A          JMPP5:   JMP     PHILO
0762 I 04C9 CC088A          JMPP6:   JMP     PMAN
0763 I 04CC CC088A          JMPP7:   JMP     PAH
0764 I 04CF CC08DD          JMPP8:   JMP     PMOD1
0765 I 04D2 CC0914          JMPP9:   JMP     PMOD2
0766 I 04D5 CC0948          JMPPA:   JMP     PMOD3
0767 I 04D8 CC0994          JMPPB:   JMP     PPBA
0768 I 04DB CC098E          JMPPC:   JMP     PPBB
0769 I 04DE CC09FA          JMPPD:   JMP     PPBC
0770 I 04E1 CC0A24          JMPPE:   JMP     PPBD
0771 I 04E4 CC0A4E          JMPPF:   JMP     PPBE
0772
0774                        ***************************************************
0775                        *                                                   *
0776                        *   THIS AREA FOR SUBROUTINES                       *
0777                        *                                                   *
0778                        ***************************************************
0779
0780                        ***************************************************
0781                        *                              GB 31-MAY-1989      *
0782                        * SUBROUTINE CSUM: TO CALCULATE AND VERIFY CORRECT CHECKSUM OF *
0783                        *                   RAM AND EEPROM                  *
0784                        ***************************************************
0785
0786         000004E7       CSUM:    EQU     *              ; Compute a Checksum On:
0787 I 04E7 1F72                     BCLR    CKSFLG,FLAG    ; {SEI}
0788 I 04E9 B650                     LDA     RMCOPY         ; VERSN
0789 I 04EB BB51                     ADD     RMCOPY+1       ; ALTEN
0790 I 04ED BB52                     ADD     RMCOPY+2       ; OUTEN1
```

```
0791 I 04EF BB53                 ADD     RMCOPY+3        ; OUTEN2
0792 I 04F1 BB54                 ADD     RMCOPY+4        ; OUTEN3
0793 I 04F3 BB55                 ADD     RMCOPY+5        ; TAPEN
0794 I 04F5 BB56                 ADD     RMCOPY+6        ; PWRUP
0795 I 04F7 BB57                 ADD     RMCOPY+7        ; THRSEL
0796 I 04F9 BB58                 ADD     RMCOPY+8        ; SIRENS &
0797 I 04FB BB59                 ADD     RMCOPY+9        ; YELTMOUT
0798 I 04FD B16F                 CMP     RMCOPY+31       ; and Compare with previous CHCKSUM
0799 I 04FF 2704                 BEQ     CSUMX           ; If Incorrect Then
0800 I 0501 B76F                 STA     CHCKSUM         ; Save Corrected CHCKSUM
0801 I 0503 1E72                 BSET    CKSFLG,FLAG     ; Set the Ckecksum Error Flag
0802 I 0505 81         CSUMX:    RTS                     ; {CLI}
0803
0805                             ****************************************************************
0806                             *                                                              *
0807                             *   DOTONE:SETS MUX AND AMP FOR TONES  1-6-89    WJG           *
0808                             *                                                              *
0809                             ****************************************************************
0810
0811 I 0506 1800       DOTONE:   BSET    TONEN,AMP
0812 I 0508 1F00                 BCLR    RADSEL,AMP
0813 I 050A 1D00                 BCLR    PAEN,AMP
0814 I 050C 1902                 BCLR    BIAS,AUXPORT
0815 I 050E 1A02                 BSET    AMPEN,AUXPORT
0816 I 0510 1C12                 BSET    OCIE,TCR
0817 I 0512 1004                 BSET    0,DDRA
0818 I 0514 81                   RTS
0819
0820                             ****************************************************************
0821                             *       STONE (SirenTONE)          1-20-89                     *
0822                             ****************************************************************
0823
0824 I 0515 047206     STONE:    BRSET   TONEFLG,FLAG,STON1  ;IF SEGEND FLAG SET, THEN
0825 I 0518 1172                 BCLR    SEGEND,FLAG
0826 I 051A 1472                 BSET    TONEFLG,FLAG
0827 I 051C 202F                 BRA     STON6
0828 I 051E 017248    STON1:    BRCLR   SEGEND,FLAG,STONX
0829 I 0521 BE93                 LDX     SEGPNTR
0830 I 0523 3A94                 DEC     SEGCNT          ;DEC SEGCNT
0831 I 0525 2607                 BNE     STON2           ;IF SEGCNT=0, THEN
0832 I 0527 5C                   INCX                    ;     INCX(TO NEW SEGCNT)
0833 I 0528 D60C00               LDA     TABLE,X
0834 I 052B B794                 STA     SEGCNT          ;     GET NEW SEGCNT     IF CYCLCNT=255, THEN
0835 I 052D 5C                   INCX                    ;     INCX(TO CYCLCNT)     BRANCH TO STON7
0836 I 052E D60C00    STON2:    LDA     TABLE,X         ;GET NEW CYCLCNT   IF SEGSIZE=-., THEN
0837 I 0531 271A                 BEQ     STON6           ;IF CYCLCNT=0, THEN        BRANCH TO STONE2
0838 I 0533 2A0E                 BPL     STON4           ;     BRANCH TO STON6  ELSE, BRANCH TO STON5
0839 I 0535 A1FF                 CMP     #255            ;     IF CYCLCNT=+, THEN
0840 I 0537 2602                 BNE     STON3           ;     BRANCH TO STON4
0841 I 0539 2023                 BRA     STON7
0842 I 053B 3C91      STON3:    INC     OFFSETL         ;DECREASE FREQ
0843 I 053D 261F                 BNE     STON7
0844 I 053F 3C90                 INC     OFFSETH
0845 I 0541 2018                 BRA     STON7           ;BRANCH TO STON5
0846 I 0543 B691      STON4:    LDA     OFFSETL         ;INCREASE FREQ
0847 I 0545 2602                 BNE     STON5
0848 I 0547 3A90                 DEC     OFFSETH
```

```
0849 I 0549 3A91            STON5:  DEC    OFFSETL
0850 I 054B 2011                    BRA    STON7           ;BRANCH TO STON5
0851 I 054D BE96            STON6:  LDX    INDEX           ;START OVER
0852 I 054F 5C                      INCX                   ;INCX(TO SEGCNT)
0853 I 0550 A601                    LDA    #$01            ;SET OFFSET=$166
0854 I 0552 B790                    STA    OFFSETH
0855 I 0554 A666                    LDA    #$66            ;WAS #$66
0856 I 0556 B791                    STA    OFFSETL
0857 I 0558 D60C00                  LDA    TABLE,X         ;GET INIT SEGCNT
0858 I 055B B794                    STA    SEGCNT
0859 I 055D 5A                      DECX                   ;SET X TO CYCLCNT
0860 I 055E D60C00          STON7:  LDA    TABLE,X         ;SET CYCLCNT=SEGSIZE
0861 I 0561 A47F                    AND    #$7F            ;SET BIT 7=0
0862 I 0563 B795                    STA    CYCLCNT
0863 I 0565 BF93                    STX    SEGPNTR         ;INCREMENT SEGPNTR
0864 I 0567 1172                    BCLR   SEGEND,FLAG     ;CLEAR SEGEND FLAG
0865 I 0569 81              STONX:  RTS                    ;RETURN TO MAIN LOOP
0866
0867                        ******************************************************
0868                        *   YTONE:                   5-9-89                   *
0869                        ******************************************************
0870
0871 I 056A 017231          YTONE:  BRCLR  SEGEND,FLAG,YTONX
0872 I 056D 047202                  BRSET  TONEFLG,FLAG,YTON1
0873 I 0570 2018                    BRA    YTON2
0874 I 0572 BE93            YTON1:  LDX    SEGPNTR
0875 I 0574 D60C00                  LDA    TABLE,X         ; Fetch from YTABLE
0876 I 0577 2711                    BEQ    YTON2           ; IF $00 do default 700Hz tone
0877 I 0579 B795                    STA    CYCLCNT         ; Decremented by THRINT
0878 I 057B 5C                      INCX
0879 I 057C D60C00                  LDA    TABLE,X         ; Fetch next from YTABLE
0880 I 057F B790                    STA    OFFSETH         ; High Byte of Tone's period = 1/f
0881 I 0581 5C                      INCX
0882 I 0582 D60C00                  LDA    TABLE,X         ; Fetch next from YTABLE
0883 I 0585 B791                    STA    OFFSETL         ; Low  Byte of Tone's period = 1/f
0884 I 0587 5C                      INCX
0885 I 0588 2010                    BRA    YTON3
0886 I 058A BE96            YTON2:  LDX    INDEX
0887 I 058C A602                    LDA    #$02            ; Default Tone's duration ($FF)
0888 I 058E B795                    STA    CYCLCNT
0889 I 0590 A601                    LDA    #$01            ; OFFSET = $0166 = 700Hz
0890 I 0592 B790                    STA    OFFSETH
0891 I 0594 A651                    LDA    #$51            ; was #$79, was #$66
0892 I 0596 B791                    STA    OFFSETL
0893 I 0598 1472                    BSET   TONEFLG, FLAG   ; Set if Cyclecount .NE. 0
0894 I 059A BF93            YTON3:  STX    SEGPNTR
0895 I 059C 1172                    BCLR   SEGEND,FLAG
0896 I 059E 81              YTONX:  RTS
0897
0898                        ******************************************************
0899                        *   AHTONE:                  1-12-89                  *
0900                        ******************************************************
0901
0902 I 059F 017223          AHTONE: BRCLR  SEGEND,FLAG,AHTONX
0903 I 05A2 097210                  BRCLR  AHFLG,FLAG,AHTON1
0904 I 05A5 A601                    LDA    #$01
0905 I 05A7 B790                    STA    OFFSETH
```

```
0906 I 05A9 A666              LDA    #$66
0907 I 05AB B791              STA    OFFSETL
0908 I 05AD A609              LDA    #$09
0909 I 05AF B795              STA    CYCLCNT
0910 I 05B1 1972              BCLR   AHFLG,FLAG
0911 I 05B3 200E              BRA    AHTON2
0912 I 05B5 A600      AHTON1: LDA    #$00
0913 I 05B7 B790              STA    OFFSETH
0914 I 05B9 A6AF              LDA    #$AF
0915 I 05BB B791              STA    OFFSETL
0916 I 05BD A604              LDA    #$04
0917 I 05BF B795              STA    CYCLCNT
0918 I 05C1 1872              BSET   AHFLG,FLAG
0919 I 05C3 1172      AHTON2: BCLR   SEGEND,FLAG
0920 I 05C5 81        AHTONX: RTS                      ; {RTS}
0921
0922                  ***************************************************
0923                  *    SP1TONE:              1-5-89                 *
0924                  ***************************************************
0925
0926 I 05C6 81        SP1TONE: RTS
0927
0928                  ***************************************************
0929                  *    HLTONE:               1-12-89 WJG             *
0930                  ***************************************************
0931
0932 I 05C7 05870A    HLTONE: BRCLR  2,HLTMR,HL1
0933 I 05CA A601              LDA    #$01
0934 I 05CC B790              STA    OFFSETH
0935 I 05CE A639              LDA    #$39
0936 I 05D0 B791              STA    OFFSETL
0937 I 05D2 2006              BRA    HLX
0938 I 05D4 3F90      HL1:    CLR    OFFSETH
0939 I 05D6 A6FA              LDA    #$FA
0940 I 05D8 B791              STA    OFFSETL
0941 I 05DA 81        HLX:    RTS
0942
0944                  ***************************************************
0945                  *                          WRPROM6.SRC WJG 11-9-88 *
0946                  *  WRPROM ERASES EEPROM & WRITES 16, 16 BIT WORDS INTO *
0947                  *  EEPROM FROM RMCOPY.                             *
0948                  ***************************************************
0949
0950 I 05DB 5F        WRPROM: CLRX
0951 I 05DC A601              LDA    #$01
0952 I 05DE CD0627            JSR    PRMSND           ;SEND START BIT
0953 I 05E1 A63F              LDA    #$3F
0954 I 05E3 CD0627            JSR    PRMSND           ;SEND EWEN
0955 I 05E6 1D02              BCLR   EECS,AUXPORT     ;TURN OFF CS FOR >1US
0956 I 05E8 A601              LDA    #$01             ;SEND START BIT
0957 I 05EA CD0627            JSR    PRMSND
0958 I 05ED A62F              LDA    #$2F
0959 I 05EF CD0627            JSR    PRMSND           ;SEND ERAL
0960 I 05F2 1D02              BCLR   EECS,AUXPORT     ;TURN OFF CS FOR>30MS
0961 I 05F4 CD0635            JSR    PRMDLY
0962 I 05F7 A601      WRPROM1: LDA   #$01
0963 I 05F9 CD0627            JSR    PRMSND           ;SEND START BIT
```

```
0964 I 05FC B670              LDA      PRMPTR           ;GET REG #
0965 I 05FE AA40              ORA      #$40             ;OR W/REG WRITE INSTR
0966 I 0600 CD0627            JSR      PRMSND           ;SEND REG WRITE INSTR
0967 I 0603 E650              LDA      RMCOPY,X         ;GET 1ST WORD
0968 I 0605 CD0627            JSR      PRMSND           ;SEND 1ST WORD
0969 I 0608 5C                INCX
0970 I 0609 E650              LDA      RMCOPY,X         ;GET 2ND WORD
0971 I 060B CD0627            JSR      PRMSND           ;SEND 2ND WORD
0972 I 060E 1D02              BCLR     EECS,AUXPORT     ;TURN OFF CS FOR >30MS
0973 I 0610 5C                INCX
0974 I 0611 CD0635            JSR      PRMDLY
0975 I 0614 3C70              INC      PRMPTR
0976 I 0616 A320              CPX      #$20
0977 I 0618 25DD              BLO      WRPROM1
0978 I 061A A601              LDA      #$01
0979 I 061C CD0627            JSR      PRMSND           ;SEND START BIT
0980 I 061F A60F              LDA      #$0F
0981 I 0621 CD0627            JSR      PRMSND           ;SEND EWDS
0982 I 0624 1D02              BCLR     EECS,AUXPORT
0983 I 0626 81                RTS
0984 I 0627 1C02     PRMSND:  BSET     EECS,AUXPORT
0985 I 0629 B70C     PRMSND1: STA      SPDR
0986 I 062B 0F08FB            BRCLR    SPIF,SPSR,PRMSND1
0987 I 062E B602              LDA      AUXPORT          ;WAIT TILL DONE & TOGGLE WATCHDOG
0988 I 0630 A802              EOR      #$02
0989 I 0632 B702              STA      AUXPORT
0990 I 0634 81                RTS
0991 I 0635 A61F     PRMDLY:  LDA      #$1F             ;DELAY FOR EEPROM CS
0992 I 0637 B771              STA      DCNTR
0993 I 0639 4A      PRMDLY1:  DECA
0994 I 063A 26FD              BNE      PRMDLY1
0995 I 063C B602              LDA      AUXPORT          ;TOGGLE WATCHDOG DURING DELAY
0996 I 063E A802              EOR      #$02
0997 I 0640 B702              STA      AUXPORT
0998 I 0642 A6FF              LDA      #$FF
0999 I 0644 3A71              DEC      DCNTR
1000 I 0646 26F1              BNE      PRMDLY1
1001 I 0648 81                RTS
1002
1004                 ****************************************************
1005                 *  THE FOLLOWING SUBROUTINES ARE EXECUTED IN RESPONSE TO    *
1006                 *  COMMAND INPUTS FROM THE CONTROL HEAD KEYBOARD-SEE JMPTAB: *
1007                 *  STBYO & SHOTGUN SECTIONS ADDED          GB 32-Jun-89    *
1008                 ****************************************************
1009
1010 I 0649 067F1B   STBYO:   BRSET    OUTA,THREN,SHOTGUN
1011 I 064C 0F7608   STBY:    BRCLR    7,PMODE,STB1
1012 I 064F CD04E7            JSR      CSUM             ;CALCULATE NEW CHECKSUM
1013 I 0652 1F72              BCLR     CKSFLG,FLAG      ;CLEAR CHECKSUM ERROR FLAG
1014 I 0654 CD05DB            JSR      WRPROM           ;STORE IT AND NEW PROG. INFO. IN EEPROM
1015 I 0657 3F73    STB1:     CLR      SIREN            ;CLR SIREN
1016 I 0659 3F76              CLR      PMODE            ;CLR PROGRAM MODE(SET TO RUN MODE)
1017 I 065B 1073              BSET     STB,SIREN        ;SET SIREN=STBY
1018                 *        BSET     STB,THREN
1019 I 065D B68B              LDA      DISPLA
1020 I 065F A404              AND      #$04
1021 I 0661 AA01              ORA      #$01
```

```
1022 I 0663 B78B                STA     DISPLA
1023 I 0665 2006                BRA     STBYX
1024 I 0667 107F        SHOTGUN: BSET   STB,THREN       ;ACTIVATE SHOTGUN TIMER
1025 I 0669 1675                BSET    OUTA,RSTAT      ;RELEASE SHOTGUN
1026 I 066B 177F                BCLR    OUTA,THREN      ;DISARM SHOTGUN INTERLOCK
1027 I 066D 81          STBYX:  RTS
1028
1029       0000066E      RAD:   EQU     *               ;IF SIREN NOT=RADIO, THEN
1030 I 066E 0273DB              BRSET   RA,SIREN,STBY   ;    CLR SIREN
1031 I 0671 3F73                CLR     SIREN           ;    SET SIREN=RADIO
1032 I 0673 1273                BSET    RA,SIREN
1033 I 0675 B68B                LDA     DISPLA
1034 I 0677 A404                AND     #$04
1035 I 0679 AA02                ORA     #$02
1036 I 067B 878B                STA     DISPLA
1037 I 067D 81                  RTS                     ;ELSE, BRANCH TO STANDBY
1038
1039       0000067E      PA:    EQU     *               ;IF MIC RELAY NOT ENERGIZED, THEN
1040 I 067E 0A0006              BRSET   CMRLY,AMP,PA1   ;    ENERGIZE COMMON MIC RELAY
1041 I 0681 1A00                BSET    CMRLY,AMP       ;ELSE, CLR MIC RELAY
1042 I 0683 148B                BSET    2,DISPLA
1043 I 0685 2004                BRA     PA2
1044 I 0687 1B00        PA1:    BCLR    CMRLY,AMP
1045 I 0689 158B                BCLR    2,DISPLA
1046 I 068B 81          PA2:    RTS
1047
1048       0000068C      WAIL:  EQU     *
1049 I 068C 075817              BRCLR   3,SIRENS,WAILX  ;IF SIREN NOT=WAIL, THEN
1050 I 068F 0473BA              BRSET   WA,SIREN,STBY   ;    CLR SIREN
1051 I 0692 3F73                CLR     SIREN           ;    SET SIREN=WAIL
1052 I 0694 1473                BSET    WA,SIREN
1053 I 0696 3F96                CLR     INDEX
1054 I 0698 3F97                CLR     SINDEX
1055 I 069A 1572                BCLR    TONEFLG,FLAG
1056 I 069C 3F94                CLR     SEGCNT          ;    CLR ALL TONE CNTRS
1057 I 069E B68B                LDA     DISPLA          ;    SET DISPLA=WAIL
1058 I 06A0 A404                AND     #$04
1059 I 06A2 AA08                ORA     #$08
1060 I 06A4 B78B                STA     DISPLA
1061 I 06A6 81          WAILX:  RTS                     ;ELSE, BRANCH TO STANDBY
1062
1063
1064       000006A7      YELP:  EQU     *
1065 I 06A7 09581D              BRCLR   4,SIRENS,YELPX  ;IF SIREN NOT=YELP, THEN
1066 I 06AA 06739F              BRSET   YE,SIREN,STBY   ;    CLR SIREN
1067 I 06AD 3F73                CLR     SIREN           ;    SET SIREN=YELP
1068 I 06AF 1673                BSET    YE,SIREN
1069 I 06B1 A622                LDA     #34
1070 I 06B3 B796                STA     INDEX           ;    SET INDEX=YTABLE
1071 I 06B5 B797                STA     SINDEX
1072 I 06B7 3F94                CLR     SEGCNT          ;    CLR ALL TONE CNTRS
1073 I 06B9 1572                BCLR    TONEFLG,FLAG
1074 I 06BB 3F93                CLR     SEGPNTR
1075 I 06BD 3F95                CLR     CYCLCNT
1076 I 06BF B68B                LDA     DISPLA          ;    SET DISPLA=YELP
1077 I 06C1 A404                AND     #$04
1078 I 06C3 AA10                ORA     #$10
```

```
1079 I 06C5 B788                STA     DISPLA
1080 I 06C7 81        YELPX:    RTS                     ;ELSE, BRANCH TO STANDBY
1081
1082      000006C8    HILO:     EQU     *
1083 I 06C8 085814              BRCLR   5,SIRENS,HILOX  ; IF SIREN NOT=HI/LO, THEN
1084 I 06CB 097303              BRCLR   HL,SIREN,HILO2
1085 I 06CE CC064C              JMP     STBY
1086 I 06D1 3F73     HILO2:     CLR     SIREN           ;    CLR SIREN
1087 I 06D3 1572                BCLR    TONEFLG,FLAG
1088 I 06D5 1873                BSET    HL,SIREN        ;    SET SIREN=HI/LO
1089 I 06D7 B688                LDA     DISPLA
1090 I 06D9 A404                AND     #$04
1091 I 06DB AA20                ORA     #$20
1092 I 06DD B788                STA     DISPLA
1093 I 06DF 81       HILOX:     RTS                     ;ELSE,BRANCH TO STBY
1094
1095      000006E0   TAPII:     EQU     *
1096 I 06E0 027347              BRSET   RA,SIREN,TAPX   ;IF SIREN NOT=RADIO, THEN
1097 I 06E3 05743C              BRCLR   2,MODE,TAP3
1098 I 06E6 B688                LDA     DISPLA
1099 I 06E8 A404                AND     #$04            ;   IF MODE=3, THEN
1100 I 06EA 057318              BRCLR   WA,SIREN,TAP1   ;      IF SIREN=WAIL, THEN
1101 I 06ED 09583A              BRCLR   4,SIRENS,TAPX
1102 I 06F0 1673                BSET    YE,SIREN        ;          SET SIREN=YELP
1103 I 06F2 AA10                ORA     #$10
1104 I 06F4 B788                STA     DISPLA
1105 I 06F6 1573                BCLR    WA,SIREN
1106 I 06F8 A622                LDA     #34
1107 I 06FA B796                STA     INDEX
1108 I 06FC B797                STA     SINDEX
1109 I 06FE 095929              BRCLR   04,YELTHOUT,TAPX
1110 I 0701 147F                BSET    YELTH,THREN
1111 I 0703 2025                BRA     TAPX
1112 I 0705 077311   TAP1:      BRCLR   YE,SIREN,TAP2   ;      IF SIREN=YELP, THEN
1113 I 0708 07581F              BRCLR   3,SIRENS,TAPX
1114 I 070B 1473                BSET    WA,SIREN        ;          SET SIREN=WAIL
1115 I 070D AA08                ORA     #$08
1116 I 070F B788                STA     DISPLA
1117 I 0711 1773                BCLR    YE,SIREN
1118 I 0713 3F96                CLR     INDEX
1119 I 0715 3F97                CLR     SINDEX
1120 I 0717 2011                BRA     TAPX
1121 I 0719 097306   TAP2:      BRCLR   HL,SIREN,TAP3   ;      IF SIREN=HI/LO, THEN
1122 I 071C 1A73                BSET    AHORN,SIREN     ;          SET SIREN=AIR HORN
1123 I 071E 1E8B                BSET    7,DISPLA
1124 I 0720 2008                BRA     TAPX
1125 I 0722 1C73    TAP3:       BSET    PEAK,SIREN      ;      ELSE, SET SIREN=PEAK
1126 I 0724 1C8B                BSET    6,DISPLA
1127 I 0726 A6A4                LDA     #164
1128 I 0728 B796                STA     INDEX
1129 I 072A 1572    TAPX:       BCLR    TONEFLG,FLAG
1130 I 072C 81                  RTS                     ;    ELSE, END TAPII
1131
1132      0000072D   AH:        EQU     *
1133 I 072D 0F5806              BRCLR   7,SIRENS,AHX
1134 I 0730 1A73                BSET    AHORN,SIREN     ;SET SIREN AIR HORN BIT
1135 I 0732 1E8B                BSET    7,DISPLA        ;SETDISPLA=AIR HORN
```

```
1136 I 0734 1572              BCLR    TONEFLG,FLAG
1137 I 0736 81        AHX:    RTS
1138
1139     00000737     MOD0:   EQU     *               ;SET MODE=0
1140 I 0737 3F74              CLR     MODE            ;MASK OUTPUTS A-E
1141 I 0739 B675              LDA     RSTAT           ;TURN OFF OUTPUTS 1,2 & 3
1142 I 073B A4F8              AND     #$F8
1143 I 073D B775              STA     RSTAT
1144 I 073F 81                RTS
1145
1146     00000740     MOD1:   EQU     *               ; IF MODE NOT=1, THEN
1147 I 0740 0074F4             BRSET   0,MODE,MOD0     ;   CLEAR MODE
1148 I 0743 3F74              CLR     MODE            ;   SET MODE=1
1149 I 0745 1074              BSET    0,MODE          ;   IF OUTPUTS A-E ON, THEN
1150 I 0747 B675              LDA     RSTAT           ;     LEAVE THEM ON
1151 I 0749 A4F8              AND     #$F8            ;   IF PROGRAMMED, THEN
1152 I 074B BA52              ORA     OUTEN1          ;     TURN ON OUTPUTS 1-E
1153 I 074D B775              STA     RSTAT
1154 I 074F 81                RTS                     ; ELSE, BRANCH TO MOD0
1155
1156     00000750     MOD2:   EQU     *               ; IF MODE NOT=2, THEN
1157 I 0750 0274E4             BRSET   1,MODE,MOD0     ;   CLEAR MODE
1158 I 0753 3F74              CLR     MODE            ;   SET MODE=2
1159 I 0755 1274              BSET    1,MODE          ;   IF OUTPUTS A-E ON, THEN
1160 I 0757 B675              LDA     RSTAT           ;     LEAVE THEM ON
1161 I 0759 A4F8              AND     #$F8            ;   IF PROGRAMMED, THEN
1162 I 075B BA53              ORA     OUTEN2          ;     TURN ON OUTPUTS 1-E
1163 I 075D B775              STA     RSTAT
1164 I 075F 81                RTS                     ; ELSE, BRANCH TO MOD0
1165
1166     00000760     MOD3:   EQU     *               ; IF MODE NOT=3, THEN
1167 I 0760 0474D4             BRSET   2,MODE,MOD0     ;   CLEAR MODE
1168 I 0763 3F74              CLR     MODE            ;   SET MODE=3
1169 I 0765 1474              BSET    2,MODE          ;   IF OUTPUTS A-E ON, THEN
1170 I 0767 B675              LDA     RSTAT           ;     LEAVE THEM ON
1171 I 0769 A4F8              AND     #$F8            ;   IF PROGRAMMED, THEN
1172 I 076B BA54              ORA     OUTEN3          ;     TURN ON OUTPUTS 1-E
1173 I 076D B775              STA     RSTAT
1174 I 076F B697              LDA     SINDEX
1175 I 0771 B796              STA     INDEX
1176 I 0773 81                RTS
1177
1178     00000774     PBA:    EQU     *
1179 I 0774 07510E             BRCLR   OUTA,ALTEN,PBA2 ; IF MOMENTARY, TURN IT ON
1180 I 0777 067507             BRSET   OUTA,RSTAT,PBA1 ; IF ON TURN IT OFF
1181 I 077A 075708             BRCLR   OUTA,TMRSEL,PBA2
1182 I 077D 167F              BSET    OUTA,TMREN      ; ELSE ARM THE SHOTGUN INTERLOCK TIMER ONLY
1183 I 077F 2006              BRA     PBA3            ; AND EXIT
1184 I 0781 1775      PBA1:   BCLR    OUTA,RSTAT      ; OFF
1185 I 0783 2002              BRA     PBA3
1186 I 0785 1675      PBA2:   BSET    OUTA,RSTAT      ; ON
1187 I 0787 81        PBA3:   RTS
1188
1189     00000788     PBB:    EQU     *               ; IF PROGRAMMED ALTERNATE, THEN
1190 I 0788 095110             BRCLR   OUTB,ALTEN,PBB2 ;   IF OUTPUTB=ON, THEN
1191 I 078B 087509             BRSET   OUTB,RSTAT,PBB1 ;     TURN IT OFF
1192 I 078E 1875              BSET    OUTB,RSTAT      ;   IF OUTPUTB=OFF, THEN
```

```
1193 I 0790 09570A              BRCLR   OUTB,THRSEL,PBB3
1194 I 0793 187F                BSET    OUTB,THREN
1195 I 0795 2006                BRA     PBB3            ;     TURN IT ON
1196 I 0797 1975        PBB1:   BCLR    OUTB,RSTAT      ; IF PROGRAMMED MOMENTARY, THEN
1197 I 0799 2002                BRA     PBB3            ;     TURN ON OUTPUTB
1198 I 079B 1875        PBB2:   BSET    OUTB,RSTAT
1199 I 079D 81          PBB3:   RTS
1200
1201      0000079E      PBC:    EQU     *               ; IF PROGRAMMED ALTERNATE, THEN
1202 I 079E 085110              BRCLR   OUTC,ALTEN,PBC2 ;   IF OUTPUTC=ON, THEN
1203 I 07A1 0A7509              BRSET   OUTC,RSTAT,PBC1 ;     TURN IT OFF
1204 I 07A4 1A75                BSET    OUTC,RSTAT      ;   IF OUTPUTC=OFF, THEN
1205 I 07A6 0B570A              BRCLR   OUTC,THRSEL,PBC3
1206 I 07A9 1A7F                BSET    OUTC,THREN
1207 I 07AB 2006                BRA     PBC3            ;     TURN IT ON
1208 I 07AD 1B75        PBC1:   BCLR    OUTC,RSTAT      ; IF PROGRAMMED MOMENTARY, THEN
1209 I 07AF 2002                BRA     PBC3            ;     TURN ON OUTPUTC
1210 I 07B1 1A75        PBC2:   BSET    OUTC,RSTAT
1211 I 07B3 81          PBC3:   RTS
1212
1213      000007B4      PBD:    EQU     *               ; IF PROGRAMMED ALTERNATE, THEN
1214 I 07B4 0D5110              BRCLR   OUTD,ALTEN,PBD2 ;   IF OUTPUTD=ON, THEN
1215 I 07B7 0C7509              BRSET   OUTD,RSTAT,PBD1 ;     TURN IT OFF
1216 I 07BA 1C75                BSET    OUTD,RSTAT      ;   IF OUTPUTD=OFF, THEN
1217 I 07BC 0D570A              BRCLR   OUTD,THRSEL,PBD3
1218 I 07BF 1C7F                BSET    OUTD,THREN
1219 I 07C1 2006                BRA     PBD3            ;     TURN IT ON
1220 I 07C3 1D75        PBD1:   BCLR    OUTD,RSTAT      ; IF PROGRAMMED MOMENTARY, THEN
1221 I 07C5 2002                BRA     PBD3            ;     TURN ON OUTPUTD
1222 I 07C7 1C75        PBD2:   BSET    OUTD,RSTAT
1223 I 07C9 81          PBD3:   RTS
1224
1225      000007CA      PBE:    EQU     *               ; ID PROGRAMMED ALTERNATE, THEN
1226 I 07CA 0F5110              BRCLR   OUTE,ALTEN,PBE2 ;   IF OUTPUTE =ON, THEN
1227 I 07CD 0E7509              BRSET   OUTE,RSTAT,PBE1 ;     TURN IT OFF
1228 I 07D0 1E75                BSET    OUTE,RSTAT      ;   IF OUTPUTE=MFF, THEN
1229 I 07D2 0F570A              BRCLR   OUTE,THRSEL,PBE3
1230 I 07D5 1E7F                BSET    OUTE,THREN
1231 I 07D7 2006                BRA     PBE3            ;     TURN IT ON
1232 I 07D9 1F75        PBE1:   BCLR    OUTE,RSTAT      ; IF PROGRAMMED MOMENTARY, THEN
1233 I 07DB 2002                BRA     PBE3            ;     TURN ON OUTPUTE
1234 I 07DD 1E75        PBE2:   BSET    OUTE,RSTAT
1235 I 07DF 81          PBE3:   RTS
1236
1238                    ;**********************************************************
1239                    *       THE FOLLOWING COMMANDS ARE ONLY EXECUTED IN PRGRM MODE    *
1240                    ;**********************************************************
1241
1242 I 07E0 3F76        PSTBY:  CLR     PMODE
1243 I 07E2 1E76                BSET    7,PMODE         ;SET PMODE=PROGRAM MODE
1244 I 07E4 3F8B                CLR     DISPLA
1245 I 07E6 3F8C                CLR     DISPLB          ;SET DISPLAY=STBY
1246 I 07E8 108B                BSET    STB,DISPLA
1247 I 07EA CD04E7              JSR     CSUM            ;UPDATE CHECKSUM
1248 I 07ED 81                  RTS
1249
1250 I 07EE CD04E7      PRAD:   JSR     CSUM            ;UPDATE CHECKSUM
```

```
1251 I 07F1 1F72              BCLR    CKSFLG,FLAG      ;CLEAR CHECKSUM ERROR FLAG
1252 I 07F3 81                RTS
1253
1254 I 07F4 CD04E7    PPA:    JSR     CSUM             ;UPDATE CHECKSUM
1255 I 07F7 1F72              BCLR    CKSFLG,FLAG      ;CLEAR CHECKSUM ERROR FLAG
1256 I 07F9 81                RTS
1257
1258 I 07FA B676     PWAIL:   LDA     PMODE
1259 I 07FC A180              CMP     #$80
1260 I 07FE 2603              BNE     PWAIL1
1261 I 0800 CC0A78             JMP     PTONEX
1262 I 0803 A184    PWAIL1:   CMP     #$84
1263 I 0805 2609              BNE     PWAIL2
1264 I 0807 B656              LDA     PWRUP
1265 I 0809 A408              AND     #$08
1266 I 080B A808              EOR     #$08
1267 I 080D CC0A8E            JMP     PWRX
1268 I 0810 A188    PWAIL2:   CMP     #$88
1269 I 0812 2607              BNE     PWAIL3
1270 I 0814 B657              LDA     TMRSEL
1271 I 0816 A808              EOR     #$08
1272 I 0818 CC0A82            JMP     PTMRX
1273 I 081B A190    PWAIL3:   CMP     #$90
1274 I 081D 2607              BNE     PWAILX
1275 I 081F B658              LDA     SIRENS
1276 I 0821 A808              EOR     #$08
1277 I 0823 CC0A86            JMP     PSIRX
1278 I 0826 CD04E7  PWAILX:   JSR     CSUM             ;UPDATE CHECKSUM
1279 I 0829 81                RTS
1280
1281 I 082A B676    PYELP:    LDA     PMODE
1282 I 082C A180              CMP     #$80
1283 I 082E 2603              BNE     PYELP1
1284 I 0830 CC0A78            JMP     PTONEX
1285 I 0833 A184    PYELP1:   CMP     #$84
1286 I 0835 2609              BNE     PYELP2
1287 I 0837 B656              LDA     PWRUP
1288 I 0839 A410              AND     #$10
1289 I 083B A810              EOR     #$10
1290 I 083D CC0A8E            JMP     PWRX
1291 I 0840 A188    PYELP2:   CMP     #$88
1292 I 0842 2607              BNE     PYELP3
1293 I 0844 B657              LDA     TMRSEL
1294 I 0846 A810              EOR     #$10
1295 I 0848 CC0A82            JMP     PTMRX
1296 I 084B A190    PYELP3:   CMP     #$90
1297 I 084D 2607              BNE     PYELPX
1298 I 084F B658              LDA     SIRENS
1299 I 0851 A810              EOR     #$10
1300 I 0853 CC0A86            JMP     PSIRX
1301 I 0856 CD04E7  PYELPX:   JSR     CSUM             ;UPDATE CHECKSUM
1302 I 0859 81                RTS
1303
1304 I 085A B676    PHILO:    LDA     PMODE
1305 I 085C A180              CMP     #$80
1306 I 085E 2603              BNE     PHILO1
1307 I 0860 CC0A78            JMP     PTONEX
```

BEST AVAILABLE COPY

```
1308 I 0863 A184          PHIL01:   CMP     #$84
1309 I 0865 2609                    BNE     PHIL02
1310 I 0867 B656                    LDA     PWRUP
1311 I 0869 A420                    AND     #$20
1312 I 086B A820                    EOR     #$20
1313 I 086D CC0A8E                  JMP     PWRX
1314 I 0870 A188          PHIL02:   CMP     #$88
1315 I 0872 2607                    BNE     PHIL03
1316 I 0874 B657                    LDA     THRSEL
1317 I 0876 A820                    EOR     #$20
1318 I 0878 CC0A82                  JMP     PTHRX
1319 I 087B A190          PHIL03:   CMP     #$90
1320 I 087D 2607                    BNE     PHILOX
1321 I 087F B658                    LDA     SIRENS
1322 I 0881 A820                    EOR     #$20
1323 I 0883 CC0A86                  JMP     PSIRX
1324 I 0886 CD04E7        PHILOX:   JSR     CSUM            ;UPDATE CHECKSUM
1325 I 0889 81                      RTS
1326
1327 I 088A B676          PHAN:     LDA     PMODE
1328 I 088C A180                    CMP     #$80
1329 I 088E 2603                    BNE     PHAN1
1330 I 0890 CC0A78                  JMP     PTONEX
1331 I 0893 A184          PHAN1:    CMP     #$84
1332 I 0895 2209                    BHI     PHAN2
1333 I 0897 A47F                    AND     #$7F
1334 I 0899 B855                    EOR     TAPEN
1335 I 089B B755                    STA     TAPEN
1336 I 089D CC0984                  JMP     PMODX1
1337 I 08A0 A188          PHAN2:    CMP     #$88
1338 I 08A2 2607                    BNE     PHAN3
1339 I 08A4 B657                    LDA     THRSEL
1340 I 08A6 A840                    EOR     #$40
1341 I 08A8 CC0A82                  JMP     PTHRX
1342 I 08AB A190          PHAN3:    CMP     #$90
1343 I 08AD 2607                    BNE     PHANX
1344 I 08AF B658                    LDA     SIRENS
1345 I 08B1 A840                    EOR     #$40
1346 I 08B3 CC0A86                  JMP     PSIRX
1347 I 08B6 CD04E7        PHANX:    JSR     CSUM            ;UPDATE CHECKSUM
1348 I 08B9 81                      RTS
1349
1350 I 088A B676          PAH:      LDA     PMODE
1351 I 088C A180                    CMP     #$80
1352 I 088E 2603                    BNE     PAH1
1353 I 08C0 CC0A78                  JMP     PTONEX
1354 I 08C3 A188          PAH1:     CMP     #$88
1355 I 08C5 2607                    BNE     PAH2
1356 I 08C7 B657                    LDA     THRSEL
1357 I 08C9 A880                    EOR     #$80
1358 I 08CB CC0A82                  JMP     PTHRX
1359 I 08CE A190          PAH2:     CMP     #$90
1360 I 08D0 2607                    BNE     PAHX
1361 I 08D2 B658                    LDA     SIRENS
1362 I 08D4 A880                    EOR     #$80
1363 I 08D6 CC0A86                  JMP     PSIRX
1364 I 08D9 CD04E7        PAHX:     JSR     CSUM            ;UPDATE CHECKSUM
```

```
1365 I 08DC 81                     RTS
1366
1367 I 08DD B676     PMOD1:   LDA    PMODE        ;IF PMODE=80, THEN
1368 I 08DF A180              CMP    #$80         ;   SET PMODE=OUTEN1
1369 I 08E1 2607              BNE    PMOD11       ;   SET DISPLB=OUTEN1
1370 I 08E3 1076              BSET   OUT1,PMODE   ;   BRANCH TO PMODX
1371 I 08E5 B652              LDA    OUTEN1       ;ELSE,BRANCH TO PMOD11
1372 I 08E7 CC0980             JMP    PMODX
1373 I 08EA A181     PMOD11:  CMP    #$81         ;IF PMODE=OUTEN1, THEN
1374 I 08EC 2609              BNE    PMOD12       ;   TOGGLE OUT1
1375 I 08EE B652              LDA    OUTEN1
1376 I 08F0 A801              EOR    #$01
1377 I 08F2 B752              STA    OUTEN1       ;   BRANCH TO PMODX
1378 I 08F4 CC0980             JMP    PMODX        ;ELSE, BRANCH TO PMOD12
1379 I 08F7 A182     PMOD12:  CMP    #$82         ;IF PMODE=OUTEN2, THEN
1380 I 08F9 2609              BNE    PMOD13       ;   TOGGLE OUT1
1381 I 08FB B653              LDA    OUTEN2
1382 I 08FD A801              EOR    #$01
1383 I 08FF B753              STA    OUTEN2       ;   BRANCH TO PMODX
1384 I 0901 CC0980             JMP    PMODX        ;ELSE, BRANCH TO PMOD13
1385 I 0904 A184     PMOD13:  CMP    #$84         ;IF PMODE=OUTEN3, THEN
1386 I 0906 2609              BNE    ENDPMOD1     ;   TOGGLE OUT1
1387 I 0908 B654              LDA    OUTEN3
1388 I 090A A801              EOR    #$01
1389 I 090C B754              STA    OUTEN3       ;   BRANCH TO PMODX
1390 I 090E CC0980             JMP    PMODX        ;ELSE, BRANCH TO PSTBY
1391 I 0911 CC0990    ENDPMOD1:JMP    PMODEND
1392
1393 I 0914 B676     PMOD2:   LDA    PMODE        ;IF PMODE=0, THEN
1394 I 0916 A180              CMP    #$80         ;   SET PMODE=OUTEN2
1395 I 0918 2607              BNE    PMOD21       ;   SET DISPLB=OUTEN2
1396 I 091A 1276              BSET   OUT2,PMODE   ;   BRANCH TO PMODX
1397 I 091C B653              LDA    OUTEN2       ;ELSE,BRANCH TO PMOD21
1398 I 091E CC0980             JMP    PMODX
1399 I 0921 A181     PMOD21:  CMP    #$81         ;IF PMODE=OUTEN1, THEN
1400 I 0923 2609              BNE    PMOD22       ;   TOGGLE OUT2
1401 I 0925 B652              LDA    OUTEN1
1402 I 0927 A802              EOR    #$02
1403 I 0929 B752              STA    OUTEN1       ;   BRANCH TO PMODX
1404 I 092B CC0980             JMP    PMODX        ;ELSE, BRANCH TO PMOD22
1405 I 092E A182     PMOD22:  CMP    #$82         ;IF PMODE=OUTEN2, THEN
1406 I 0930 2609              BNE    PMOD23       ;   TOGGLE OUT2
1407 I 0932 B653              LDA    OUTEN2
1408 I 0934 A802              EOR    #$02
1409 I 0936 B753              STA    OUTEN2       ;   BRANCH TO PMODX
1410 I 0938 CC0980             JMP    PMODX        ;ELSE, BRANCH TO PMOD23
1411 I 093B A184     PMOD23:  CMP    #$84         ;IF PMODE=OUTEN3, THEN
1412 I 093D 2651              BNE    PMODEND      ;   TOGGLE OUT3
1413 I 093F B654              LDA    OUTEN3
1414 I 0941 A802              EOR    #$02
1415 I 0943 B754              STA    OUTEN3       ;   BRANCH TO PMODX
1416 I 0945 CC0980             JMP    PMODX        ;ELSE, BRANCH TO PSTBY
1417
1418 I 0948 B676     PMOD3:   LDA    PMODE        ;IF PMODE=0, THEN
1419 I 094A A180              CMP    #$80         ;   SET PMODE=OUTEN3
1420 I 094C 260B              BNE    PMOD31       ;   SET DISPLB=OUTEN3
1421 I 094E 1476              BSET   OUT3,PMODE   ;   BRANCH TO PMODX
```

```
1422 I 0950 B656              LDA     PWRUP       ;   SET DISPLA=PWRUP
1423 I 0952 B788              STA     DISPLA
1424 I 0954 B654              LDA     OUTEN3
1425 I 0956 CC0980            JMP     PMODX       ;ELSE,BRANCH TO PMOD31
1426 I 0959 A181      PMOD31: CMP     #$81        ;IF PMODE=OUTEN1, THEN
1427 I 095B 2609              BNE     PMOD32      ;   TOGGLE OUT3
1428 I 095D B652              LDA     OUTEN1      ;   SAVE @OUTEN1
1429 I 095F A804              EOR     #$04
1430 I 0961 B752              STA     OUTEN1      ;   BRANCH TO PMODX
1431 I 0963 CC0980            JMP     PMODX       ;ELSE, BRANCH TO PMOD32
1432 I 0966 A182      PMOD32: CMP     #$82        ;IF PMODE=OUTEN2, THEN
1433 I 0968 2609              BNE     PMOD33      ;   TOGGLE OUT2
1434 I 096A B653              LDA     OUTEN2      ;   SAVE @OUTEN2
1435 I 096C A804              EOR     #$04
1436 I 096E B753              STA     OUTEN2      ;   BRANCH TO PMODX
1437 I 0970 CC0980            JMP     PMODX       ;ELSE, BRANCH TO PMOD33
1438 I 0973 A184      PMOD33: CMP     #$84        ;IF PMODE=OUTEN3, THEN
1439 I 0975 2619              BNE     PMODEND     ;   TOGGLE OUT3
1440 I 0977 B654              LDA     OUTEN3      ;   SAVE @OUTEN3
1441 I 0979 A804              EOR     #$04
1442 I 097B B754              STA     OUTEN3
1443 I 097D 2001              BRA     PMODX
1444 I 097F 4F        PMODCLR: CLRA
1445 I 0980 3F8C      PMODX:  CLR     DISPLB
1446 I 0982 B78C              STA     DISPLB      ;SET DISPLB=OUTEN?
1447 I 0984 B676      PMODX1: LDA     PMODE
1448 I 0986 B455              AND     TAPEN
1449 I 0988 2704              BEQ     PMODX2
1450 I 098A 1C8B              BSET    6,DISPLA
1451 I 098C 2002              BRA     PMODEND
1452 I 098E 1D8B      PMODX2: BCLR    6,DISPLA
1453 I 0990 CD04E7    PMODEND: JSR    CSUM        ;UPDATE CHECKSUM
1454 I 0993 81                RTS                 ;RETURN
1455
1456 I 0994 B676      PPBA:   LDA     PMODE
1457 I 0996 A180              CMP     #$80
1458 I 0998 2610              BNE     PPBA1
1459 I 099A B651              LDA     ALTEN
1460 I 099C A4F8              AND     #$F8
1461 I 099E B78C              STA     DISPLB
1462 I 09A0 B657              LDA     THRSEL
1463 I 09A2 B78B              STA     DISPLA
1464 I 09A4 1676              BSET    3,PMODE
1465 I 09A6 CD04E7            JSR     CSUM        ;UPDATE CHECKSUM
1466 I 09A9 81                RTS
1467 I 09AA B676      PPBA1:  LDA     PMODE
1468 I 09AC A188              CMP     #$88
1469 I 09AE 260A              BNE     PPBA2
1470 I 09B0 B651              LDA     ALTEN
1471 I 09B2 A808              EOR     #$08
1472 I 09B4 B751              STA     ALTEN
1473 I 09B6 A4F8              AND     #$F8
1474 I 09B8 B78C              STA     DISPLB
1475 I 09BA CD04E7    PPBA2:  JSR     CSUM        ;UPDATE CHECKSUM
1476 I 09BD 81                RTS
1477
1478 I 09BE B676      PPBB:   LDA     PMODE
```

```
1479 I 09C0 A180              CMP   #$80
1480 I 09C2 2610              BNE   PPBB1
1481 I 09C4 B651              LDA   ALTEN
1482 I 09C6 A4F8              AND   #$F8
1483 I 09C8 B78C              STA   DISPLB
1484 I 09CA B657              LDA   THRSEL
1485 I 09CC B78B              STA   DISPLA
1486 I 09CE 1676              BSET  3,PMODE
1487 I 09D0 CD04E7            JSR   CSUM        ;UPDATE CHECKSUM
1488 I 09D3 81                RTS
1489 I 09D4 B676    PPBB1:    LDA   PMODE
1490 I 09D6 A188              CMP   #$88
1491 I 09D8 260E              BNE   PPBB2
1492 I 09DA B651              LDA   ALTEN
1493 I 09DC A810              EOR   #$10
1494 I 09DE B751              STA   ALTEN
1495 I 09E0 A4F8              AND   #$F8
1496 I 09E2 B78C              STA   DISPLB
1497 I 09E4 CD04E7            JSR   CSUM        ;UPDATE CHECKSUM
1498 I 09E7 81                RTS
1499 I 09E8 B676    PPBB2:    LDA   PMODE
1500 I 09EA A190              CMP   #$90
1501 I 09EC 2608              BNE   PPBB3
1502 I 09EE B659              LDA   YELTHOUT
1503 I 09F0 A810              EOR   #$10
1504 I 09F2 B759              STA   YELTHOUT
1505 I 09F4 B78C              STA   DISPLB
1506 I 09F6 CD04E7  PPBB3:    JSR   CSUM        ;UPDATE CHECKSUM
1507 I 09F9 81                RTS
1508
1509 I 09FA B676    PPBC:     LDA   PMODE
1510 I 09FC A180              CMP   #$80
1511 I 09FE 2610              BNE   PPBC1
1512 I 0A00 B651              LDA   ALTEN
1513 I 0A02 A4F8              AND   #$F8
1514 I 0A04 B78C              STA   DISPLB
1515 I 0A06 B657              LDA   THRSEL
1516 I 0A08 B78B              STA   DISPLA
1517 I 0A0A 1676              BSET  3,PMODE
1518 I 0A0C CD04E7            JSR   CSUM        ;UPDATE CHECKSUM
1519 I 0A0F 81                RTS
1520 I 0A10 B676    PPBC1:    LDA   PMODE
1521 I 0A12 A188              CMP   #$88
1522 I 0A14 260A              BNE   PPBC2
1523 I 0A16 B651              LDA   ALTEN
1524 I 0A18 A820              EOR   #$20
1525 I 0A1A B751              STA   ALTEN
1526 I 0A1C A4F8              AND   #$F8
1527 I 0A1E B78C              STA   DISPLB
1528 I 0A20 CD04E7  PPBC2:    JSR   CSUM        ;UPDATE CHECKSUM
1529 I 0A23 81                RTS
1530
1531 I 0A24 B676    PPBD:     LDA   PMODE
1532 I 0A26 A180              CMP   #$80
1533 I 0A28 2610              BNE   PPBD1
1534 I 0A2A B651              LDA   ALTEN
1535 I 0A2C A4F8              AND   #$F8
```

```
1536 I 0A2E 878C                       STA    DISPLB
1537 I 0A30 B657              LDA    TMRSEL
1538 I 0A32 B788                       STA    DISPLA
1539 I 0A34 1676                       BSET   3,PMODE
1540 I 0A36 CD04E7                     JSR    CSUM           ;UPDATE CHECKSUM
1541 I 0A39 81                         RTS
1542 I 0A3A B676           PPBD1:      LDA    PMODE
1543 I 0A3C A188                       CMP    #$88
1544 I 0A3E 260A                       BNE    PPBD2
1545 I 0A40 B651                       LDA    ALTEN
1546 I 0A42 A840                       EOR    #$40
1547 I 0A44 B751                       STA    ALTEN
1548 I 0A46 A4F8                       AND    #$F8
1549 I 0A48 B78C                       STA    DISPLB
1550 I 0A4A CD04E7          PPBD2:     JSR    CSUM           ;UPDATE CHECKSUM
1551 I 0A4D 81                         RTS
1552
1553 I 0A4E B676           PPBE:       LDA    PMODE
1554 I 0A50 A180                       CMP    #$80
1555 I 0A52 2610                       BNE    PPBE1
1556 I 0A54 B651                       LDA    ALTEN
1557 I 0A56 A4F8                       AND    #$F8
1558 I 0A58 B78C                       STA    DISPLB
1559 I 0A5A B657                       LDA    TMRSEL
1560 I 0A5C B788                       STA    DISPLA
1561 I 0A5E 1676                       BSET   3,PMODE
1562 I 0A60 CD04E7                     JSR    CSUM           ;UPDATE CHECKSUM
1563 I 0A63 81                         RTS
1564 I 0A64 B676           PPBE1:      LDA    PMODE
1565 I 0A66 A188                       CMP    #$88
1566 I 0A68 260A                       BNE    PPBE2
1567 I 0A6A B651                       LDA    ALTEN
1568 I 0A6C A880                       EOR    #$80
1569 I 0A6E B751                       STA    ALTEN
1570 I 0A70 A4F8                       AND    #$F8
1571 I 0A72 B78C                       STA    DISPLB
1572 I 0A74 CD04E7          PPBE2:     JSR    CSUM           ;UPDATE CHECKSUM
1573 I 0A77 81                         RTS
1574
1575 I 0A78 1876           PTONEX:     BSET   4,PMODE
1576 I 0A7A B659                       LDA    YELTMOUT
1577 I 0A7C B78C                       STA    DISPLB
1578 I 0A7E B658                       LDA    SIRENS
1579 I 0A80 201A                       BRA    PRGRMX
1580
1581 I 0A82 B757           PTMRX:      STA    TMRSEL
1582 I 0A84 2016                       BRA    PRGRMX
1583
1584 I 0A86 B758           PSIRX:      STA    SIRENS
1585 I 0A88 B788                       STA    DISPLA
1586 I 0A8A CD04E7                     JSR    CSUM           ;UPDATE CHECKSUM
1587 I 0A8D 81                         RTS
1588
1589 I 0A8E B756           PWRX:       STA    PWRUP          ;IF PWRUP=0;THEN
1590 I 0A90 2602                       BNE    PWRX1          ;  SET PWRUP=STBY
1591 I 0A92 AA01                       ORA    #$01           ;SET DISPLA=PWRUP
1592 I 0A94 B756           PWRX1:      STA    PWRUP
```

```
1593 I 0A96 B688              LDA     DISPLA
1594 I 0A98 A440              AND     #$40
1595 I 0A9A BA56              ORA     PWRUP
1596
1597 I 0A9C 8788     PRGRMX:  STA     DISPLA
1598 I 0A9E CD04E7             JSR     CSUM              ;UPDATE CHECKSUM
1599 I 0AA1 81                 RTS
1600
1602                  ************************************************************
1603                  *     THIS AREA FOR INTERRUPT SERVICE ROUTINES              *
1604                  ************************************************************
1605                  ****************** SERIAL PORT I.S.R. ******************
1606     00000AA2     SCINT:   EQU     *
1607 I 0AA2 B610              LDA     SCSR              ;IF ERROR FLAGS SET, THEN
1608 I 0AA4 A40E              AND     #$0E              ;  BRANCH TO SCINTE
1609 I 0AA6 2634              BNE     SCINTE            ;IF RDRF FLAG SET, THEN
1610 I 0AA8 0B1033            BRCLR   RDRF,SCSR,SCINTX  ;  PUT SCI TO SLEEP
1611 I 0AAB 120F              BSET    RWU,SCCR2
1612 I 0AAD B611              LDA     SCDAT             ;{IN/OUT WORD}
1613 I 0AAF A180              CMP     #$80              ;IF INPUT KEY=NUL, THEN
1614 I 0AB1 2618              BNE     SCINT1
1615 I 0AB3 0E7628   NUL:     BRSET   7,PMODE,SCINTX    ;  IF NOT PRGRM MODE, THEN
1616 I 0AB6 B651              LDA     ALTEN             ;    TURN OFF MOM OUTPUTS
1617 I 0AB8 B475              AND     RSTAT             ;    TURN MOM DISPLAYS
1618 I 0ABA B775              STA     RSTAT             ;    BRANCH TO BDISPLY
1619 I 0ABC 1F88              BCLR    7,DISPLA          ;    BRANCH TO SCINT1
1620 I 0ABE 1D73              BCLR    PEAK,SIREN
1621 I 0AC0 1D88              BCLR    6,DISPLA
1622 I 0AC2 067302            BRCLR   AHORN,SIREN,NUL1
1623 I 0AC5 1572              BCLR    TONEFLG,FLAG
1624 I 0AC7 1B73     NUL1:    BCLR    AHORN,SIREN
1625 I 0AC9 2013              BRA     SCINTX            ;ELSE, BRANCH TO SCINTX
1626 I 0ACB A1C0     SCINT1:  CMP     #$C0
1627 I 0ACD 2500              BLO     SCINTE
1628 I 0ACF A1EF              CMP     #$EF
1629 I 0AD1 2209              BHI     SCINTE
1630 I 0AD3 A42F              AND     #$2F              ;COMPUTE ADDR FOR BUTTON PUSHED
1631 I 0AD5 AE03              LDX     #$03              ;BRANCH TO SUBROUTINE
1632 I 0AD7 42                MUL
1633 I 0AD8 97                TAX
1634 I 0AD9 DD0457            JSR     JMPTAB,X          ;{USING THE JUMP TABLE}
1635 I 0ADC B611     SCINTE:  LDA     SCDAT             ;CLEAR ERROR FLAGS
1636 I 0ADE 80       SCINTX:  RTI                       ;ELSE, RETURN FROM INTERRUPT
1637                  ********************** TIMER I.S.R. **********************
1638     00000ADF     TMRINT:  EQU     *
1639 I 0ADF 0D1221            BRCLR   OCIE,TCR,TIMER    ;IF COMPARE ENABLED,THEN
1640 I 0AE2 0D131E            BRCLR   OCF,TSR,TIMER     ;  IF OCF SET, THEN
1641 I 0AE5 98                CLC
1642 I 0AE6 B691              LDA     OFFSETL           ;    ADD OFFSETL TO COUNTER
1643 I 0AE8 BB17              ADD     OCL
1644 I 0AEA B792              STA     OCLTEMP
1645 I 0AEC B690              LDA     OFFSETH
1646 I 0AEE B916              ADC     OCH               ;    ADD OFFSETH TO COUNTER
1647 I 0AF0 B716              STA     OCH               ;    SAVE IN HI COMPARE REG
1648 I 0AF2 B600              LDA     AMP
1649 I 0AF4 A801              EOR     #$01              ;    TOGGLE TONE BIT
1650 I 0AF6 B700              STA     AMP
```

```
1651 I 0AF8 B692                 LDA     OCLTEMP
1652 I 0AFA B717                 STA     OCL
1653 I 0AFC 3A95                 DEC     CYCLCNT         ;DECREMENT CYCLE CNT
1654 I 0AFE 2602                 BNE     RTN             ;IF COUNT=0, THEN
1655 I 0B00 1072                 BSET    SEGEND,FLAG     ;   SET SEGEND FLAG
1656 I 0B02 80          RTN:     RTI                    ;RETURN FROM INTERRUPT
1657 I 0B03 0B1328      TIMER:   BRCLR   TOF,TSR,THRINTX ;IF TOF SET, THEN
1658 I 0B06 017F02      STBTIMER:BRCLR   STBTH,THREN,TIMER1
1659 I 0B09 3C80                 INC     STBTHR          ;   INCREMENT STBTHR
1660 I 0B0B 037F02      TIMER1:  BRCLR   HLTM,THREN,TIMERA
1661 I 0B0E 3C87                 INC     HLTHR           ;        "  HLTHR
1662 I 0B10 077F02      TIMERA:  BRCLR   OUTATH,THREN,TIMERB
1663 I 0B13 3C81                 INC     THRA            ;        "  THRA
1664 I 0B15 097F02      TIMERB:  BRCLR   OUTBTH,THREN,TIMERC
1665 I 0B18 3C82                 INC     THRB            ;        "  THRB
1666 I 0B1A 0B7F02      TIMERC:  BRCLR   OUTCTM,THREN,TIMERD
1667 I 0B1D 3C83                 INC     THRC            ;        "  THRC
1668 I 0B1F 0D7F02      TIMERD:  BRCLR   OUTDTH,THREN,TIMERE
1669 I 0B22 3C84                 INC     THRD            ;        "  THRD
1670 I 0B24 0F7F02      TIMERE:  BRCLR   OUTETM,THREN,YELTIMER
1671 I 0B27 3C85                 INC     THRE            ;        "  THRE
1672 I 0B29 057F02      YELTIMER:BRCLR   YELTH,THREN,THRINTX
1673 I 0B2C 3C86                 INC     YELTHR          ;        "  YELTHR
1674 I 0B2E B619        THRINTX: LDA     THRL            ;   CLEAR INTERRUPT
1675 I 0B30 80                   RTI                    ;ELSE, RETURN FROM INTERRUPT
1676 I 0B31 80          SPI:     RTI
1677 I 0B32 80          IRQ:     RTI
1678 I 0B33 80          SWI:     RTI
1679
1680 A 0B34             A        SECTION AMLOSTO,$0B34
1681 A 0B34                      ORG     $0B34
1683 A 0B34 9D9D9D9D9D9D9D9D  AMLOSTO: DB  8 DUP ($9D)    ; 354 ($0162) Bytes Filled Here
1687                            ORG     $0BFD            ; must start at $0BFD and end at $0BFF
1688 A 0BFD CC0100              JMP     INITM
1690
1691 W 0C00             W        SECTION WAIL_TABLE,$0C00
1692 W 0C00                      ORG     $0C00
1695                   *********LOOKUP TABLE FOR SIRENTONES*********************
1696                   *                                        GB 12-Jun-1989  *
1697                   *                                                        *
1698                   *    WAIL TABLE   XREG SET AT 0(WAIL), INCREMENT XREG TO INDEX *
1699                   *                                                        *
1700                   **********************************************************
1701
1702 W 0C00 02         TABLE:   DB      $02     ;COUNTS/SEGMENT(XCEL RATE)=CYCLCNT
1703 W 0C01 30                  DB      $30     ;# SEGMENTS@ABOVE XCEL RATE=SEGCNT
1704 W 0C02 04                  DB      $04     ;XCEL RATE>$7F=DECEL
1705 W 0C03 20                  DB      $20
1706 W 0C04 08                  DB      $08     ; This half of the table increases the frequency
1707 W 0C05 10                  DB      $10
1708 W 0C06 10                  DB      $10
1709 W 0C07 10                  DB      $10
1710 W 0C08 20                  DB      $20
1711 W 0C09 05                  DB      $05     ;    The data in this table is in pairs
1712 W 0C0A 30                  DB      $30     ; <-- This is the duration of the tone before freq. inc.
1713 W 0C0B 05                  DB      $05     ; <-- This is the number of similar duration / inc. pairs
1714 W 0C0C 40                  DB      $40
```

```
1715 W 0C0D 05                    DB      $05
1716 W 0C0E 57                    DB      $57     ; <-- midpoint was $60
1717 W 0C0F 10                    DB      $10     ; This value changed from $10 to get offset as high as A1
1718 W 0C10 7F                    DB      $7F     ; $10 got only as high as A9, then was $18
1719 W 0C11 20                    DB      $20     ; Then changed form 22 to 10
1720 W 0C12 A0                    DB      $a0     ; This half of the table decreases frequency
1721 W 0C13 20                    DB      $20     ;    The data in this table is in pairs
1722 W 0C14 A0                    DB      $a0     ; <-- This is the duration of the tone before freq. dec.
1723 W 0C15 20                    DB      $20     ; <-- This is the number of similar duration / dec. pairs
1724 W 0C16 A0                    DB      $a0
1725 W 0C17 20                    DB      $20
1726 W 0C18 A0                    DB      $a0
1727 W 0C19 20                    DB      $20
1728 W 0C1A A0                    DB      $a0
1729 W 0C1B 20                    DB      $20
1730 W 0C1C 97                    DB      $97     ; was A0
1731 W 0C1D 32                    DB      $32     ; was 20
1732 W 0C1E 00                    DB      $00     ; <-- End of Table {YTONE2}
1733 W 0C1F 00                    DB      $00
1734 W 0C20 00                    DB      $00
1735 W 0C21 00                    DB      $00
1736
1737                              *****************************************************
1738                              *                                                   *
1739                              *   YELP TABLE    XREG SET @TABLE+34 (YELP) GB 12-Jun-89  *
1740                              *                                                   *
1741                              *****************************************************
1742
1743 Y 0C22               Y       SECTION YELP_TABLE,TABLE+34
1744 Y 0C22                       ORG     TABLE+34
1745
1746       00000C22       YTABLE: EQU     *
1747
1748 Y 0C22 01                    DB      $01     ; <-- CYCLCNT Duration
1749 Y 0C23 0140                  DW      $0140   ; <-- OFFSET  Period
1750 Y 0C25 02                    DB      $02
1751 Y 0C26 0130                  DW      $0130
1752 Y 0C28 02                    DB      $02
1753 Y 0C29 0121                  DW      $0121
1754 Y 0C2B 02                    DB      $02
1755 Y 0C2C 0114                  DW      $0114
1756 Y 0C2E 02                    DB      $02
1757 Y 0C2F 0108                  DW      $0108
1758 Y 0C31 02                    DB      $02
1759 Y 0C32 00FD                  DW      $00FD
1760 Y 0C34 03                    DB      $03
1761 Y 0C35 00F3                  DW      $00F3
1762 Y 0C37 03                    DB      $03
1763 Y 0C38 00E9                  DW      $00E9
1764 Y 0C3A 04                    DB      $04
1765 Y 0C3B 00E0                  DW      $00E0
1766 Y 0C3D 04                    DB      $04
1767 Y 0C3E 00D8                  DW      $00D8
1768 Y 0C40 05                    DB      $05
1769 Y 0C41 00D1                  DW      $00D1
1770 Y 0C43 05                    DB      $05
1771 Y 0C44 00CA                  DW      $00CA
```

```
1772 Y 0C46 06         DB    $06
1773 Y 0C47 00C3       DW    $00C3
1774 Y 0C49 07         DB    $07
1775 Y 0C4A 008D       DW    $008D
1776 Y 0C4C 09         DB    $09
1777 Y 0C4D 0087       DW    $0087
1778 Y 0C4F 0A         DB    $0A
1779 Y 0C50 00B2       DW    $00B2
1780 Y 0C52 0D         DB    $0D
1781 Y 0C53 00AD       DW    $00AD
1782 Y 0C55 10         DB    $10
1783 Y 0C56 00A8       DW    $00A8
1784 Y 0C58 15         DB    $15
1785 Y 0C59 00A3       DW    $00A3
1786 Y 0C5B 1F         DB    $1F
1787 Y 0C5C 009F       DW    $009F
1788 Y 0C5E 37         DB    $37
1789 Y 0C5F 009B       DW    $009B
1790 Y 0C61 4A         DB    $4A              ; <-- MIDPOINT (Highest Frequency, Shortest Period)
1791 Y 0C62 0097       DW    $0097            ; was $00A1
1792 Y 0C64 08         DB    $08
1793 Y 0C65 009B       DW    $009B
1794 Y 0C67 08         DB    $08
1795 Y 0C68 009F       DW    $009F
1796 Y 0C6A 09         DB    $09
1797 Y 0C6B 00A3       DW    $00A3
1798 Y 0C6D 09         DB    $09
1799 Y 0C6E 00A8       DW    $00A8
1800 Y 0C70 09         DB    $09
1801 Y 0C71 00AD       DW    $00AD
1802 Y 0C73 09         DB    $09
1803 Y 0C74 00B2       DW    $00B2
1804 Y 0C76 0A         DB    $0A
1805 Y 0C77 00B7       DW    $00B7
1806 Y 0C79 0A         DB    $0A
1807 Y 0C7A 008D       DW    $008D
1808 Y 0C7C 0B         DB    $0B
1809 Y 0C7D 00C3       DW    $00C3
1810 Y 0C7F 0B         DB    $0B
1811 Y 0C80 00CA       DW    $00CA
1812 Y 0C82 0C         DB    $0C
1813 Y 0C83 00D1       DW    $00D1
1814 Y 0C85 0D         DB    $0D
1815 Y 0C86 00D8       DW    $00D8
1816 Y 0C88 0E         DB    $0E
1817 Y 0C89 00E0       DW    $00E0
1818 Y 0C8B 0F         DB    $0F
1819 Y 0C8C 00E9       DW    $00E9
1820 Y 0C8E 11         DB    $11
1821 Y 0C8F 00F3       DW    $00F3
1822 Y 0C91 13         DB    $13
1823 Y 0C92 00FD       DW    $00FD
1824 Y 0C94 17         DB    $17
1825 Y 0C95 0108       DW    $0108
1826 Y 0C97 1C         DB    $1C
1827 Y 0C98 0114       DW    $0114
1828 Y 0C9A 36         DB    $36
```

BEST AVAILABLE COPY

```
1829 Y 0C9B 0121                       DW      $0121
1830 Y 0C9D 3E                         DB      $3E
1831 Y 0C9E 0130                       DW      $0130
1832 Y 0CA0 35                         DB      $35
1833 Y 0CA1 0140                       DW      $0140
1834
1835 Y 0CA3 00                         DB      $00
1836
1837                    ;************************************************
1838                    *   PKTONE    TABLE    XREG SET @ YTABLE+160   1-16-89   *
1839                    ;************************************************
1840
1841 P 0CA4              P     SECTION PK_TABLE,YTABLE+130
1842 P 0CA4                    ORG     YTABLE+130
1843 P 0CA4 02           PKTABLE: DB    $02          ;COUNTS/SEGMENT(XCEL RATE)=CYCLCNT
1844 P 0CA5 30                    DB    $30          ;# SEGMENTS@ABOVE XCEL RATE=SEGCNT
1845 P 0CA6 04                    DB    $04          ;XCEL RATE>$7F=DECEL
1846 P 0CA7 10                    DB    $10          ; was $20
1847 P 0CA8 08                    DB    $08
1848 P 0CA9 10                    DB    $10
1849 P 0CAA 10                    DB    $10
1850 P 0CAB 10                    DB    $10
1851 P 0CAC 20                    DB    $20
1852 P 0CAD 05                    DB    $05
1853 P 0CAE 30                    DB    $30
1854 P 0CAF 05                    DB    $05
1855 P 0CB0 40                    DB    $40
1856 P 0CB1 05                    DB    $05
1857 P 0CB2 50                    DB    $50
1858 P 0CB3 09                    DB    $09
1859 P 0CB4 70                    DB    $70
1860 P 0CB5 10                    DB    $10
1861 P 0CB6 FF                    DB    $FF
1862 P 0CB7 FF                    DB    $FF
1863 P 0CB8 FF                    DB    $FF
1864 P 0CB9 FF                    DB    $FF
1865 P 0CBA FF                    DB    $FF
1866 P 0CBB FF                    DB    $FF
1867 P 0CBC FF                    DB    $FF
1868 P 0CBD FF                    DB    $FF
1869 P 0CBE FF                    DB    $FF
1870 P 0CBF FF                    DB    $FF
1871 P 0CC0 FF                    DB    $FF
1872 P 0CC1 FF                    DB    $FF
1873 P 0CC2 FF                    DB    $FF
1874 P 0CC3 FF                    DB    $FF
1875
1876
1877                    ;************************************************
                        *   SP1TONE   TABLE    XREG SET @ PKTABLE +32   1-7-89   *
1878                    ;************************************************
1879
1880 S 0CC4              S     SECTION SP1_TABLE,PKTABLE+32
1881 S 0CC4                    ORG     PKTABLE+32
1882 S 0CC4 0000000000000000  SP1TABLE:DB   32 DUP (0)
              0000000000000000
              0000000000000000
              0000000000000000
1883
```

```
1885 S 0CE4 9D9D9D9D9D9D9D9D    LOSTABLE:DB   8 DUP ($9D)     ; 796 ($031C) Bytes Filled Here
1890                                    ORG   $0FFD           ; must start at $0FFD and end at $0FFF
1891 S 0FFD CC0100                      JMP   INITM
1893
1894 A 1000                 A         SECTION AMLOST1,$1000
1895 A 1000                             ORG   $1000
1897 A 1000 9D9D9D9D9D9D9D9D    AMLOST1: DB   8 DUP ($9D)     ; 256 ($0100) Bytes Filled Here
1901                                    ORG   $10FD           ; must start at $10FD and end at $10FF
1902 A 10FD CC0100                      JMP   INITM
1904
1906 A 1100                 A         SECTION AMLOST2,$1100
1907 A 1100                             ORG   $1100           ; comment out this section when using MC68HC05C4
1909 A 1100 9D9D9D9D9D9D9D9D    AMLOST2: DB   8 DUP ($9D)     ; 3584 ($0E00) Bytes Filled Here
1919                                    ORG   $1EFD           ; must start at $1EFD and end at $1EFF
1920 A 1EFD CC0100                      JMP   INITM
1922
1924                         *********************************************************
1925                         *    INTERRUPT VECTOR TABLE-POINTERS TO INT SERVICE ROUTINES    *
1926                         *********************************************************
1927
1928 I 1FF4              I            SECTION ISR_VECTORS,USRVEC
1929 I 1FF4                             ORG   USRVEC
1930 I 1FF4 0831                        DW    SPI
1931 I 1FF6 0AA2                        DW    SCINT           ; {SERIAL PORT I.S.R.}
1932 I 1FF8 0ADF                        DW    TMRINT          ; {TIMER I.S.R}
1933 I 1FFA 0832                        DW    IRQ
1934 I 1FFC 0833                        DW    SWI
1935 I 1FFE 0100                        DW    INITM
1936
1937                                  SECTION SET_PROTECTION,OPTION
1938                                    ORG   OPTION          ; SET PROM $0020-$004F, SET PROM $0100-$015F
1939                                    DB    $08             ; SET SECURITY, SET IRQ on EDGE & LEVEL
1940                                    MSG   'SETTING SECURITY BIT'
1941    2000                            END
There were: 0000 Errors
```

SECTIONS USED:

| Section | Relocation | Alignment | Type | Begins | Ends |
|---|---|---|---|---|---|
| ROM_CONSTANTS | absolute | | | 0020 | 0020 |
| RAM_VARIABLES | absolute | | | 0050 | 0097 |
| INITM | absolute | | | 0100 | 0833 |
| AMLOST0 | absolute | | | 0834 | 0BFF |
| MAIL_TABLE | absolute | | | 0C00 | 0C21 |
| HELP_TABLE | absolute | | | 0C22 | 0CA3 |
| PK_TABLE | absolute | | | 0CA4 | 0CC3 |
| SPI_TABLE | absolute | | | 0CC4 | 0FFF |
| AMLOST1 | absolute | | | 1000 | 10FF |
| AMLOST2 | absolute | | | 1100 | 1EFF |
| ISR_VECTORS | absolute | | | 1FF4 | 1FFF |

Assembly time: 0 min, 19 sec

APPENDIX B

```
wed Apr 11 09:47:34 1990                                    REM00100.S

1   *************************************************************
 2   * Program Name:    REM00100                                  *
 3   * Programmer:      WARD GIEFFERS / GEORGE BERANEK / KENT KEKEIS *
 4   * Initial Start Date: 3/30/89                                *
 5   * Most Recent Date:   3/29/90                                *
 6   *                                                            *
 7   * System:          6805-C8                                   *
 8   * Assembler:       EZASM                                     *
 9   *                                                            *
10   * PGM Description: REMOTE.SRC This program controls the operation *
11   *                  of a remote control head for a Computerized *
12   *                  Light And Siren System. It communicates with a *
13   *                  main unit via 4 wires and an RS-232 interface. *
14   *                  See REMOTE.PSU for psuedo code of this program. *
15   *                                                            *
16   * Version Information:                                       *
17   *                                                            *
18   * Version   What Changed from Previous    Who Changed   Date *
19   *                                                            *
20   *  N/A      Initial Version                  WJG       3/30/89 *
21   *   12      Shotgun Lock and Prog. Mod.      GB        6/1/89  *
22   *           Return LED dimming eliminated.                   *
23   *           Watchdog Enhanced.                               *
24   *   13      Shotgun and Exit Prog. Mode LED  GB        6/26/89 *
25   *           intensity change corrected.                      *
26   *   14      Watchdog additions               GB        7/12/89 *
27   *  0100     Changed Name from REM014 to REM00100 KENT   3/29/90 *
28   *           to comply with new naming convention.           *
29   *************************************************************
30
31           SUBTTL 'EQUATES'
32           TITLE  'REM014.SRC WJG GB 12-Jul-1989'
33           RADIX 10
34           LIST
35
36   *************************************************************
37   *            EQUATES                                         *
38   *************************************************************
39
40   KEYPAD   EQU  $00       ;PORTA=KEYPAD
41   DSPLAY   EQU  $01       ;PORTB=MULTIPLEXED DISPLAY
42   PORTC    EQU  $02       ;PORTC=MISC I/O BITS
43
44   DDRA     EQU  $04       ;DATA DIRECTION REGISTERS
45   DDRB     EQU  $05       ;   "      "       "
46   DDRC     EQU  $06       ;   "      "       "
47
48   D1       EQU  $07       ;DIGIT 1 STROBE
49   D2       EQU  $08       ;DIGIT 2 STROBE
50   DURFLG   EQU  $09       ;DISPLAY DURATION FLAG BIT
```

BEST AVAILABLE COPY

```
51    AFLG     EQU  $04      ;DISPLAY "A" FLAG
52    OFFLG    EQU  $05      ;FLAG TO TURN OFF DISPLAYS
53    GUNFLG   EQU  $06      ;SHOTGUN FLAG
54    PMDFLG   EQU  $07      ;PROGRAM MODE ENDING FLAG
55    STBY     EQU  $00      ;STBY LED OF DISPLA
56
57    TCR      EQU  $12      ;TIMER CONTROL REGISTER
58    TSR      EQU  $13      ;TIMER STATUS REGISTER
59    THRH     EQU  $18      ;TIMER COUNTER-HI BYTE
60    THRL     EQU  $19      ;TIMER COUNTER-LO BYTE
61
62    BAUDR    EQU  $0D      ;SCI BAUD RATE REG
63    SCCR1    EQU  $0E      ;SCI CONTROL REG #1
64    SCCR2    EQU  $0F      ;SCI CONTROL REG #2
65    SCSR     EQU  $10      ;SCI STATUS REG
66    SCDAT    EQU  $11      ;SCI SND/RCV DATA REG
67    RDRF     EQU  $05      ;SCI RCV DATA REG FULL
68    RE       EQU  $02      ;SCI RCVR ENABLE
69    RIE      EQU  $05      ;SCI RCV INTERRUPT ENABLE
70    TDRE     EQU  $07      ;SCI XMIT DATA REG EMPTY
71    TE       EQU  $03      ;SCI XMTR ENABLE
72    USRVEC   EQU  $1FF4    ;START USER VECTOR TABLE
73
74       SUBTTL 'DEFINITION OF ROM CONSTANTS'
75    ****************************************************
76    *              DEFINE ROM CONSTANTS                 *
77    ****************************************************
78
79            SECTION ROM_CONSTANTS,$0020
80            ORG  $20
81
82    * LOOK UP TABLE FOR LED INTENSITY CONTROL-SEE SENDHD ROUTINE
83
84    INTENS:  DB   $FF      ;MIN BLRATE
85             DB   $FF      ;MAX DURATN
86             DB   $2F      ;NO BLINKING
87             DB   $2F      ;MAX DURATN W/NO BLINK
88             DB   $2F      ;NO BLINKING
89             DB   $0F      ;MED DURATN
90             DB   $2F      ;NO BLINKING
91             DB   $02      ;MIN DURATN
92
93    ****************************************************
94    *                                                   *
95    *              RAM MEMORY ALLOCATIONS               *
96    *                                                   *
97    ****************************************************
98
99       SUBTTL 'RAM MEMORY ALLOCATIONS'
100           SECTION RAM_VARIABLES,$0050
```

```
101            ORG  $0050
102
103   INKEY    DS   1
104   KEYCODE  DS   1
105   CNTEN    DS   1
106   CNTR0    DS   1
107   CNTR1    DS   1
108   CNTR2    DS   1
109   TCNT4    DS   1
110   TCNT5    DS   1
111   TCNT6    DS   1
112   DISPLA   DS   1
113   DISPLB   DS   1
114   FLAG     DS   1
115   OUTKEY   DS   1
116   BLRATE   DS   1
117   DURATN   DS   1
118   FLASH    DS   1   ;COUNTER FOR STBY PUSHES FOR INTENSITY TRAP
119   XREG     DS   1   ;TEMP XREG FOR INTENSITY CONTROL ROUTINE
120   LED0     DS   16  ;TABLE FOR LED STATUS, LED0 THRU LEDF
121
122       SUBTTL 'INITR'
123   ***************************************************
124   *                                                 *
125   *     INITR: SETS THE DDR FOR EACH PORT AND SETS INITIAL *
126   *     VALUES IN EACH DATA REGISTER                *
127   *     CLEARS TIMER INTERRUPTS                     *
128   *     PA0-3=INPUT,PA4-7=OUTPUT(KEYPAD)            *
129   *     PB0-7=OUTPUT(DSPLAY)                        *
130   *     PC7,6=STROBE DSPLAY                         *
131   *     PC5=BEEPER                                  *
132   *                                                 *
133   ***************************************************
134
135            SECTION INITR,$100
136            ORG  $100
137
138   INITR:   LDA  #$F0    ;SET DATA DIRECTION REGISTERS
139            STA  DDRA    ;"    "    "         "
140            LDA  #$10    ;INITIALIZE KEYPAD
141            STA  KEYPAD
142            LDA  #$FF    ;SET DATA DIRECTION REGISTERS
143            STA  DDRB    ;"    "    "         "
144            STA  DDRC    ;"    "    "         "
145
146            LDA  #$FF    ;SET INTENSITY TO MAX AND BLINK
147            STA  BLRATE  ;"    "     "    "   "    "
148            STA  DURATN  ;"    "     "    "   "    "
149            CLRA         ;SET ALL LEDS OFF
150            STA  DISPLA  ;"    "    "
```

```
151             STA  DISPLB    ; "    "    "    "
152             STA  FLASH
153             STA  CNTR2     ;CLEAR CNTR2
154             STA  TCNT4     ;CLEAR TIMER #4
155             STA  FLAG      ;CLEAR ALL FLAGS
156             STA  SCDAT     ;CLEAR SCI DATA REG
157             STA  SCCR1     ;CLEAR SCI CONTROL REG #1
158             STA  SCCR2     ;CLEAR SCI CONTROL REG #2
159
160             BSET 4,PORTC   ;SET LAMPS TO ON
161             LDA  #$02      ;SET INTENSITY PTR XREG TO 2nd INTENSITY
162             STA  XREG
163             LDA  #$33      ;SET BAUD RATE TO 1200 BPS
164             STA  BAUDR
165             BSET RE,SCCR2  ;ENABLE SCI RECEIVER
166             BSET RIE,SCCR2 ;ENABLE SCI RCV INTERRUPTS
167             BSET TE,SCCR2  ;ENABLE XMITTR
168             BSET 1,CNTR1   ;INIT CNTR1 FOR IMMEDIATE OVFL
169             LDA  TSR       ;CLEAR TIMER INTERRUPTS
170             LDA  TMRL      ; "   "    "
171             BSET 5,TCR     ;ENABLE TIMER OVFL (TOIE)INTERRUPTS
172             BSET 4,CNTEN   ;ENABLE TIMER #4
173
174 MODECHK:    LDA  #$11      ;IF KEY=STBY, THEN
175             CMP  KEYPAD    ;    BRANCH TO KEYBD
176             BEQ  KEYBD     ;ELSE, SET MODE=RUN
177             BSET 1,FLAG    ;    STOP TIMER
178             LDA  #$FF
179             STA  BLRATE    ;    SET LED BLINK RATE=SLOW
180             BCLR 4,CNTEN   ;END MODECHK
181
182     SUBTTL 'HDLP'
183 ************************************************
184 *       HDLP: MAIN LOOP FOR CONTROL HEAD        *
185 ************************************************
186
187 HDLP:       EQU  *         ;DO FOREVER
188 WATCHDG:    LDA  PORTC     ;TOGGLE WATCH DOG
189             EOR  #$08
190             STA  PORTC
191
192 ************************************************
193 *                                              *
194 *   KEYBD: DETECTS KEY CLOSURES, DEBOUNCES AND DECODES KEY *
195 *   LEAVES A KEYCODE IN "KEYCODE", SETS A FLAG BIT.        *
196 *                                              *
197 ************************************************
198
199 KEYBD:      LDA  #$F0
200             STA  KEYPAD    ;SET KEYPAD=$F0
```

BEST AVAILABLE COPY

```
201             CMP  KEYPAD          ;READ KEYPAD
202             BEQ  NOKEY           ;IF SAME, THEN
203             BRSET 0,FLAG,KYBDX ;   BRANCH TO NOKEY
204             LDA  KEYPAD          ;IF ALREADY ENCODED, THEN
205             STA  INKEY           ;   BRANCH TO KYBDX
206     *                            ;ELSE, SAVE @ INKEY
207             JSR  DEBNCE          ;CALL DEBNCE
208             LDA  KEYPAD          ;READ KEYPAD AGAIN
209             CMP  INKEY           ;IF NOT SAME AS INKEY, THEN
210             BNE  NOKEY           ;   BRANCH TO NOKEY
211
212             CLRX
213             LDA  #$10            ;INIT ROW COUNT
214     KEYBD1: STA  KEYPAD          ;DO UNTIL ALL ROWS CHECKED
215             CMP  KEYPAD          ;    OUTPUT ROW VALUE
216             BNE  KEYBD2          ;    READ KEYPAD
217             ASLA                 ;    IF NOT SAME, THEN
218             BCS  NOKEY           ;      BRANCH TO FIND COLUMN
219             INCX                 ;    ELSE, MULTIPLY ROW COUNTx2
220             BRA  KEYBD1          ;IF NO COLUMN FOUND, THEN
221     *                            ;   BRANCH TO NOKEY
222     KEYBD2: LDA  KEYPAD          ;READ KEYPAD
223             AND  #$0F            ;MASK MSD
224             ASLX                 ;MULTIPLY ROWx4
225             ASLX
226
227     KEYBD3: ASRA                 ;DO UNTIL COLUMN FOUND
228             BCS  KEYBD4          ;    SHIFT RIGHT
229             INCX                 ;    COUNT COLUMNS
230             BNE  KEYBD3
231
232     KEYBD4: STX  KEYCODE         ;SAVE @ KEYCODE
233             BSET 7,KEYCODE       ;SET WAKE UP BIT
234             BSET 0,FLAG          ;SET FLAG BIT
235             JSR  BEEP            ;CALL BEEP
236             BRA  KYBDX
237
238     NOKEY:  CLC                  ;IF NOKEY FOUND, THEN
239             BRCLR 0,FLAG,KYBDX ;   IF FLAG SET, THEN
240             CLR  OUTKEY          ;      SET RWU BIT
241             BSET 7,OUTKEY        ;      SEND NUL
242             JSR  SENDHD
243             BCLR 0,FLAG          ;      CLEAR FLAG BIT
244     KYBDX:  NOP                  ;END KEYBD
245
246         SUBTTL 'MODE'
247     ***********************************************
248     *                        MODE.SRC 4-28-88 WJG  *
249     *  MODE:SETS CONTROL HEAD TO RUN MODE 4 SECS AFTER PWR UP  *
250     *  UNLESS STBY PUSHED DURING PWR UP, IN WHICH CASE IT IS  *
```

```
251  *   SET TO PRGRM MODE. ANY KEY BUT STBY WILL KEEP IT IN    *
252  *   PRGRM. WILL REVERT TO PRGRM MODE 4 SECS AFTER STBY IS  *
253  *   PUSHED.                                                *
254  *                                                          *
255  ************************************************************
256
257  MODE:   BPSET 1,FLAG,MODX  ;IF RUN MODE, THEN
258          LDA  #$7F
259          STA  BLRATE
260          BRCLR 6,TCNT4,MOD1 ;   BRANCH TO END
261          BSET 1,FLAG        ;IF PRGRM TIMER EXPIRES, THEN
262          BCLR 2,FLAG        ;   SET RUN MODE
263          LDA  #$FF
264          STA  BLRATE        ;   SET LED BLINK RATE=SLOW
265          LDA  #$C0          ;   SEND STBY&RWU TO MAIN UNIT
266          STA  OUTKEY
267          JSR  SENDHD
268          JSR  BEEP          ;   CALL BEEP
269          BRA  MODX          ;   STOP TIMER
270  MOD1:   BRCLR 0,FLAG,MODX  ;   BRANCH TO END
271          LDA  #$80          ;IF KEYFLAG SET, THEN
272          CMP  KEYCODE       ;   SET LED BLINK RATE=SLOW
273          BNE  MOD2          ;   IF KEYCODE=STBY, THEN
274          CLR  TCNT4         ;      STARTTIMER
275          BSET 4,CNTEN       ;      SET PRGRM MODE
276          BSET 2,FLAG        ;      CALL BEEP
277          JSR  BEEP          ;      CALL BEEP
278          LDA  #$FF
279          JSR  DLY1          ;      BRANCH TO END
280          JSR  BEEP          ;   IF KEYCODE NOT=STBY, THEN
281          LDA  #$FF
282          JSR  DLY1
283          JSR  BEEP
284          BRA  MODX          ;      STOP TIMER
285  MOD2:   LDA  #$7F
286          STA  BLRATE        ;      SET LED BLINK RATE=SLOW
287          BCLR 4,CNTEN
288  MODX:   CLI
289          NOP
290
291      SUBTTL 'OUTHD'
292  ************************************************************
293  *                                          WJG 4-25-88     *
294  *                                                          *
295  *   OUTHD: CHECKS FOR A KEY PUSHED AND CONVERTS KEYCODE TO *
296  *   ASCII AND CALLS SENDHD. IF IN PRGRM MODE, CONVERTS TO  *
297  *   LOWER CASE, IF IN RUN MODE, CONVERTS TO UPPER CASE.    *
298  *                                                          *
299  ************************************************************
300
```

```
301  OUTHD:   BRCLR 0,FLAG,OUTHDX    ;IF KEY PUSHED, THEN
302           LDA   KEYCODE          ;   IF RUN MODE, THEN
303           CMP   #$88             ;CHECK TO SEE IF IT IS GUNLOCK
304           BNE   OUTHD0
305           BSET  GUNFLG,FLAG      ;   IF SO, SET THE FLAG
306  OUTHD0:  BRCLR 1,FLAG,OUTHD1   ;          CONVERT TO UPPER
307           ORA   #$40             ;          SAVE @ OUTKEY
308           BRA   OUTHD2
309  OUTHD1:  BRCLR 2,FLAG,OUTHDX   ;   IF PRGRM MODE, THEN
310           BSET  PNDFLG,FLAG     ;       SET LED INTENSITY CONTROL LOCK
311           ORA   #$60             ;          CONVERT TO LOWER
312  OUTHD2:  STA   OUTKEY           ;          SAVE @ OUTKEY
313           BRCLR 7,SCSR,OUTHDX   ;   IF XMITR IDLE, THEN
314           JSR   SENDHD           ;          CALL SENDHD
315           BCLR  7,KEYCODE        ;          CLEAR WAKE UP BIT
316  OUTHDX:  NOP                    ;ELSE, END OUTHD
317
318       SUBTTL 'MPLX'
319  ***********************************************************
320  *                                                         *
321  *    MPLX:ALTERNATELY DISPLAYS STATUS OF ONE SET OF 8 LEDs *
322  *    THEN THE OTHER SET OF 8, i.e. MULTIPLEXES THE DISPLAY *
323  *    USING ONE 8 BIT PORT; PORT B. PORT C, BITS 7&6 ARE    *
324  *    USED AS DIGIT STROBES.                                *
325  *                                                         *
326  ***********************************************************
327
328  MPLX:    BRSET OFFLG,FLAG,MPLX3
329           DEC   CNTR0
330           BNE   MPLX2
331           LDA   BLRATE
332           STA   CNTR0
333           LDA   DURATN
334           STA   CNTR1
335           BSET  DURFLG,FLAG
336           BRSET AFLG,FLAG,MPLX1
337           LDA   DISPLA
338           STA   DSPLAY
339           BSET  D1,PORTC
340           BCLR  D2,PORTC
341           BSET  AFLG,FLAG
342           BRA   MPLX2
343  MPLX1:   LDA   DISPLB
344           STA   DSPLAY
345           BSET  D2,PORTC
346           BCLR  D1,PORTC
347           BCLR  AFLG,FLAG
348  MPLX2:   BRCLR DURFLG,FLAG,MPLX3
349           DEC   CNTR1
350           BNE   MPLX3
```

```
351             BCLR    D1,PORTC
352             BCLR    D2,PORTC
353             BCLR    DURFLG,FLAG
354  MPLX3:     NOP
355
356      SUBTTL 'UPDATE'
357  *................................................
358  *                                    UPDATE:WJG 3-20-88 *
359  *   UPDATE:FETCHES LED STATUS IN TABLE STARTING @ LED0 *
360  *        SHUFFLES EACH BIT 4 SO IT ENDS UP IN DISPLA AND *
361  *        DISPLB AS REQ'D                              *
362  *................................................
363
364  UPDATE:    CLRX
365             CLR     DISPLA
366             CLR     DISPLB
367  UPDAT1:    LDA     LED0,X
368             AND     #$10
369             BEQ     UPDAT2
370             SEC
371             BRA     UPDAT3
372  UPDAT2:    CLC
373  UPDAT3:    ROR     DISPLB
374             ROR     DISPLA
375             INCX
376             CPX     #$10
377             BNE     UPDAT1
378  UPDATX:    NOP
379  HDLPX:     JMP     HDLP        ; END OF MAIN LOOP
380             NOP
381
382      SUBTTL 'SUBROUTINES'
383  *................................................
384  *    THIS AREA FOR SUBROUTINES                      *
385  *................................................
386
387      SUBTTL 'DLY1'
388  *................................................
389  *                                    DLY1:WJG 6-4-88 *
390  *   DLY1:TIMING LOOP GETS TIME VAR IN ACC, COUNTS DOWN TCNTS *
391  *        TO ZERO AND RETURNS                        *
392  *................................................
393
394  DLY1:      STA     TCNTS
395             LDA     #$FF
396             STA     TCNTS
397  DLY12:     DEC     TCNTS
398             BNE     DLY12
399             LDA     PORTC       ;TOGGLE WATCH DOG
400             EOR     #$08
```

BEST AVAILABLE COPY

```
401            STA  PORTC
402            DEC  TCNT6
403            BNE  DLY12
404            RTS
405
406    SUBTTL 'DEBNCE'
407 ****************************************************
408 *   DEBNCE:USES ACC FOR A DELAY CNTR, DEBOUNCES KEYBOARD    *
409 ****************************************************
410
411 DEBNCE:    LDA  #$10    ;DEBOUNCE DELAY FOR KEYBOARD
412 DEBNC1:    DECA
413            BNE  DEBNC1
414 *          LDA  PORTC   ;TOGGLE WATCH DOG
415 *          EOR  #$08
416 *          STA  PORTC
417            RTS
418
419    SUBTTL 'BEEP'
420 ****************************************************
421 *                                                    *
422 *                            BEEP.SRC 3-15-88 WJG   *
423 *                                                    *
424 * BEEP OUTPUTS SQUARE WAVE TONE TO THE CERAMIC BEEPER *
425 * Uses x reg, port PC5 for output in an in-line code  *
426 * type timing loop.                                   *
427 *                                                    *
428 *                                                    *
429 * USES RAM LOCATION "CNTR1" FOR A DURATION TIMER     *
430 * DURATION WILL DEPEND ON LOOP TIME.                 *
431 *                                                    *
432 ****************************************************
433
434 BEEP:      LDA  #$FF    ;SET BEEP DURATION
435            STA  CNTR2
436 BEEP1:     LDX  #$16    ;Set loop duration(frequency)
437            LDA  PORTC   ;TOGGLE WATCH DOG
438            EOR  #$08
439            STA  PORTC
440 BEEP2:     BSET 5,2     ;BEEPER=PC5
441            DECX         ;Change one idx value for symmetry
442            BNE  BEEP2
443            LDX  #$16
444 BEEP3:     BCLR 5,2
445            DECX
446            BNE  BEEP3
447            DEC  CNTR2
448            BNE  BEEP1
449            RTS
450            NOP
```

```
451
452        SUBTTL  'SENDHD'
453   *****************************************************
454   *                                    4-25-88 WJG  *
455   *                                    26-Jun-89 GB *
456   *   SENDHD:MOVE KEYCODE TO SCI AND TRANSMIT TO MAIN UNIT  *
457   *   TEST TDRE BIT FOR EMPTY SCI REGISTER                  *
458   *   EXTENSIVELY MODIFIED TO TRAP UNDESIRED LED INTENSITY  *
459   *   CHANGES ON SHOTGUN INTERLOCK AND PROGRAM MODE EXIT.   *
460   *****************************************************
461
462   SENDHD:   NOP
463   *         LDA   PORTC    ;TOGGLE WATCH DOG
464   *         EOR   #$08
465   *         STA   PORTC
466             BRSET TDRE,SCSR,SENDHD1
467             BRCLR TDRE,SCSR,SENDHD
468   SENDHD1:  LDA   OUTKEY
469             STA   SCDAT
470             BRCLR STBY,DISPLA,SENDHDX
471             LDA   OUTKEY
472             CMP   #$00        ; IF STANDBY
473             BNE   SENDHDX     ; THEN
474             BRSET GUNFLG,FLAG,FCOUNT  ; IF EITHER THE GUNFLAG OR THE
475             BRSET PMDFLG,FLAG,FCOUNT  ; PROG MODE END FLAG ARE SET
476             LDX   XREG                ; WE SKIP THIS
477             CPX   #$08
478             BEQ   OFF
479             BSET  4,PORTC
480             LDA   INTENS,X
481             STA   BURATE
482             INCX
483             LDA   INTENS,X
484             STA   DURATN
485             INCX
486             STX   XREG
487             BCLR  OFFLG,FLAG
488             BRA   SENDHDX
489   OFF:      BCLR  4,PORTC
490             CLR   XREG
491             CLR   DISPLA
492             CLR   DISPLB
493             CLR   DSPLAY
494             BSET  OFFLG,FLAG
495             BRA   SENDHDX
496   FCOUNT:   NOP               ; AND COUNT THE NUMBER OF TIMES
497             INC   FLASH       ; STBY IS PRESSED EITHER BY THE
498             LDA   FLASH       ; OPERATOR, OR THE PROGRAM.
499             CMP   #$01        ; WHICH MUST NOW BE MORE THAN ONCE
500             BLO   SENDHDX     ; TO CHANGE THE INTENSITY.
```

```
501            CLR   FLASH
502            BCLR  GUNFLG,FLAG         ; WHEN PUCHED TWICE, THE INTENSITY
503            BCLR  PNDFLG,FLAG         ; INTERLOCK FLAGS ARE CLEARED.
504   SENDHDX: NOP
505            RTS                        ;END SENDHD
506            NOP
507
508     SUBTTL 'INTERRUPT SERVICE ROUTINES'
509   ********************************************************
510   *   THIS AREA FOR INTERRUPT SERVICE ROUTINES            *
511   ********************************************************
512
513   THRINT:  EQU   *           ;IF TOF SET, THEN
514            BRCLR 5,TSR,THRINTX  ;IF TIMER ENABLED, THEN
515            BRCLR 4,CNTEN,THRINT1 ; INCREMENT TCNT4
516            INC   TCNT4
517   THRINT1: LDA   THRL         ; CLEAR INTERRUPT
518   THRINTX: RTI                ; RETURN FROM INTERRUPT
519   SCINT:   LDA   SCSR         ;ELSE,RETURN FROM INTERRUPT
520            AND   #$CE
521            BNE   SCINTE
522            BRCLR RDRF,SCSR,SCINTX
523            LDA   SCDAT
524            CMP   #$1F
525            BHI   SCINTE
526            AND   #$0F
527            TAX
528            LDA   SCDAT
529            STA   LEDS,X
530            BRA   SCINTX
531   SCINTE:  LDA   SCDAT
532   SCINTX:  RTI
533            NOP
534   SPINT:   RTI
535   IRQINT:  RTI
536   SWINT:   RTI
537
538     SUBTTL 'Fill Unused ROM with harmless NOPs {MC68HC05C4)'
539   AMLOSTO: DB    8 DUP ($9D)  ; This fill section MUST be
540      NOLIST
541            DB    465 DUP ($9D) ; adjusted in length when the
542            DB    512 DUP ($9D) ; program is modified!
543            DB    512 DUP ($9D)
544            DB    512 DUP ($9D)
545            DB    512 DUP ($9D)
546            DB    512 DUP ($9D)
547            DB    512 DUP ($9D)
548      LIST
549            ORG   $10FD        ; such that this statement ends up
550            JMP   INITR        ; starting at $10FD and ending at $10FF
```

BEST AVAILABLE COPY

```
551              MSG     'Assembly through $10FF complete for MC68HC05C4'
552      SUBTTL  'Fill unused ROM with harmless NOPs (MC68HC705C8)'
553              SECTION AMLOST,$1100
554              ORG     $1100           ; comment out this section when using MC68HC05C4
555              MSG     'Assembling for MC68HC705C8'
556      AMLOST: DB      8 DUP ($9D)
557      NOLIST
558              DB      512 DUP ($9D)
559              DB      512 DUP ($9D)
560              DB      512 DUP ($9D)
561              DB      512 DUP ($9D)
562              DB      512 DUP ($9D)
563              DB      512 DUP ($9D)
564              DB      501 DUP ($9D)
565      LIST
566   *          ORG     $1EFD
567              JMP     INITR
568              MSG     'Assembly through $1EFF complete for MC68HC705C8'
569
570   * SUBTTL  'USER ISR VECTORS'
571   *****************************************************
572   *    INTERRUPT VECTOR TABLE-POINTERS TO INT SERVICE ROUTINES   *
573   *****************************************************
574
575              SECTION ISR_VECTORS,USRVEC
576              ORG     USRVEC
577              DW      SPINT
578              DW      SCINT
579              DW      TMRINT
580              DW      IRQINT
581              DW      SWINT
582              DW      INITR
583              END
584
```

BEST AVAILABLE COPY

I claim:

1. A signalling system alternatively operable in programming and operating modes, said signalling system comprising:
   an array of manually operable switches;
   a control means responsive to actuations of the switches in the array for alternatively operating in the programming and operating modes;
   a plurality of signalling devices selectively activated by the control means in the operating mode in order to generate a plurality of different signalling configurations;
   first means of the control means responsive to a first set of actuations of the switches in the array for first placing the system in the programming mode and also responsive to a subsequent second set of actuations of the switches in the array for selecting the signalling devices that comprise each of the said signalling configuration, which may be generated by actuating switches in the array when the system is in the operating mode;
   a memory in communication with said first means for storing the signalling configurations;
   second means of the control means in communication with the memory and responsive to a third set of actuations of the switches in the array when the system is in the operating mode for activating different ones of the signalling configurations.

2. A signalling system as set forth in claim 1 wherein the first and second means comprise a control head responsive to the actuations of the switches in array of switches and a control unit in communication with the control head.

3. A signalling system as set forth in claim 2 where each of the control head and the control unit includes a microprocessor and the microprocessor of the control head provides data to the microprocessor of the control unit in response to the actuation of switches in the array by way of a serial communications line.

4. A signalling system as set forth in claim 2 where the control head and the array of switches are part of a two-way radio system.

5. A signalling system as set forth in claim 1 where the signalling devices include warning lights and siren tones and the array of switches includes a plurality of switches organized into groups with a first group responsive to the second set of actuations of the switches in the programming mode for selecting which of the warning lights will be included in a signalling configuration and a second group responsive to actuation of switches in the programming mode for selection which of the siren tones will be included in the same signalling configuration.

6. A signalling system as set forth in claim 5 where the signalling devices include auxiliary devices and the array of switches includes a third group of switches responsive to the second set of actuations in the programming mode for programming the auxiliary devices to have predetermined responses in the operating mode to the third set of actuations to the array of switches.

7. A signalling system as set forth in claim 1 wherein the array of switches is a keypad and actuations of the switches in the array are keystrokes to the keypad.

8. A signalling system as set forth in claim 1 operable in an idle mode in addition to the operating and programming modes, the system including:
 means of the second means responsive to the third set of actuations to the switches of the array of switches for alternatively placing the system in either one of the signalling configurations of the operating mode or the idle mode; and
 a switch means separate from the array of switches and mounted remotely therefrom for transferring the system from the idle mode or from one of the signalling configurations of the operating mode to a predetermined one of the signalling configurations in the operating mode.

9. An emergency signalling system alternatively operable in programming and operating modes, the system including:
 a power source;
 a speaker;
 an array of switches;
 a memory for storing a plurality of alternative emergency tones for the speaker;
 a public address microphone for generating voice signals and a push-to-talk (PTT) control signal;
 a control unit and control head comprising,
  (1) a first means responsive to a first set of actuations of the switches in the array of switches for placing the system in the programming mode and for programming the system to select which one of the plurality of alternative emergency tones will be enabled in the operating mode upon application of power from the power source;
  (2) a second means responsive to a second set of actuations of the switches in the array of switches to select the one of the plurality of alternative emergency tones to be delivered to the speaker in the operating mode; and
  (3) third means responsive to the PTT control signal for delivering the voice signals to the speaker.

10. A system as set forth in claim 9 wherein each of the control unit and control head includes a microprocessor, the microprocessors being in serial communication with one another and the control head providing an interface to the array of switches whereas the control unit provides an interface to the speaker.

11. A system as set forth in claim 9 wherein the array of switches is a keypad and actuations of the switches in the array are keystrokes to the keypad.

12. The emergency signalling system of claim 9 wherein the first and second means comprises at least one microprocessor.

13. A system as set forth in claim 9 wherein the first means includes means for programming the operation of each one of auxiliary functions.

14. A system as set forth in claim 13 wherein one of the auxiliary functions is a fixed light.

15. A system as set forth in claim 13 wherein the first means for programming each of the auxiliary functions is responsive to the first set of actuations of switches in the array of switches for selectively enabling each of the said functions to operate either as an on/off function, a momentary on function or a timed function.

16. The system as set forth in claim 13 including a switch mounted at a location that allows the switch to be easily actuated by a foot of an operator of the system, the switch providing a signal to the second means causing it to transfer the system to or from a particular signalling configuration in the operating mode.

17. A system as set forth in claim 9 including at least first and second groups of emergency lights under control of the first means in the programming mode for selecting different ones of the at least first and second groups to be activated in the operating mode by the second means to create a signalling configuration.

18. When the system as set forth in claim 17 is in the operating mode, it includes a first group of adjacent switches associated with the signalling configurations of the operating mode, and a second group of adjacent switches associated with the operation of the speaker.

19. The system as set forth in claim 9 including means for providing a signal to the second means in response to activation of a standard horn switch of a vehicle associated with the system, the second means being responsive to the signal for providing a predetermined one of the plurality of tones to the speaker.

20. The system as set forth in claim 19 wherein the means for providing a signal to the second means in response to activation of a standard horn switch is selectively enabled by the first means in response to the first set of actuations to the array of switches when the system is in the programming mode.

21. The system as set forth in claim 20 including at least first and second signalling configurations wherein each of the said signalling configurations is programmed by way of the first set of actuations to the array of switches when the system is in the programming mode so that each of the configurations enables or disables the means responsive to the horn switch independently of the other configurations.

22. A method of using an emergency signalling system installed in a vehicle, the system including an array of switches mounted to an interior structure of the vehicle, a programmable control circuit operable in a programming or an operating mode and responsive to actuations of switches in the array of switches, at least two groups of warning lights, and a plurality of tones for a speaker and auxiliary functions, the method comprising the steps of:
 placing the control circuit in the programming mode;
 enabling selected ones of the at least two groups of warning lights and at least one of the plurality of tones while in the programming mode for activation in the operating mode of the control circuit;
 selecting a type of response to be provided by the auxiliary functions when in the operating mode by way of the actuations of the switches in the array of switches while the control circuit is in the programming mode;
 switching the programmable control circuit to the operating mode; and
 operating the system in the operating mode in accordance with the selections made in the programming mode.

23. An emergency signalling system comprising:
a speaker;
a plurality of warning lights divided into groups, each group being independently operable;
a memory for storing a plurality of alternative tones for the speaker;
an array of switches;
a first means responsive to actuations of the switches in the array of switches for generating difficult signalling configurations, wherein each configuration comprises a selected one of the plurality of tones for the speaker and/or selected ones of the groups of warning lights and;
a second means responsive to actuations of the switches in the array of switches for determining which ones of the groups of warning lights and which ones of the plurality of tones for the speaker, if any, comprise each of the signalling configurations generated by the first means.

24. An emergency signalling system as set forth in claim 23 wherein the array of switches is a keypad and actuations of the switches in the array are keystrokes to the keypad.

25. A signalling system for use with an emergency vehicle comprising:
at least two groups of warning lights;
a speaker;
a plurality of tones for generation by the speaker;
an array of switches mounted to an area of the vehicle within reach of an operator of the vehicle;
a control unit and control head responsive to actuations of the switches in the array of switches for controlling operation of the signalling system in each of an operating mode, an idle mode and a programming mode;
a first signalling configuration in the operating mode of the system generated by the control unit and control head in response to a first set of actuations of the switches in the array of switches and comprising a first predetermined one of the at least two groups of warning lights and one of the plurality of tones for the speaker.
a second signalling configuration in the operating mode of the system generated by the control unit and control head in response to a second set of actuations of the switches in the array of switches and comprising a second predetermined one of the at least two groups of warning lights;
the control head and control unit including first means responsive to a third set of actuations of switches in the array of switches for transferring the signalling system between modes; and
the control head and control unit including a second means responsive to a fourth set of actuations of switches in the array of switches when the system is in the programming mode for programming which ones of the at least two groups of warning lights are to be enabled in each of the signalling configurations of the operating mode.

26. A signalling system as set forth in claim 25 wherein the array of switches is a keypad and actuations of the switches in the array are keystrokes to the keypad.

27. A signalling system as set forth in claim 25 wherein the control head and control unit includes third means responsive to the fourth set of actuations of switches in the array of switches when the system is in the programming mode for programming which one, if any, of the plurality of tones for the speaker is to be enabled in one of the signalling configurations of the operating mode.

28. A signalling system as set forth in claim 27 including auxiliary functions operable in at least one of the signalling configurations of the operating mode and in the idle mode; and
the control unit and control head including fourth means responsible to actuations of the switches in the array of switches when the system is in the programming mode for programming the operation of the auxiliary functions in the at least one signalling configuration of the operating mode and in the idle mode.

29. A signalling system as set forth in claim 28 wherein the array of switches includes a first group of switches associated with the signalling configurations of the system for activating different ones of the configurations, a second group of switches associated with the auxiliary functions for enabling the auxiliary functions in any of the signalling configurations or the idle mode and a third group of switches associated with the plurality of tones for enabling the tones in at least one of the signalling configurations.

30. A system as set forth in claim 29 wherein the actuations of the switches when the system is in the programming mode are directed to the first group of switches for selecting the predetermined ones of the at least two groups of warning lights that will be enabled in each of the signalling configurations of the operating mode.

31. A system as set forth in claim 29 wherein the actuations of the switches when the system is in the programming mode are directed to the second group of switches for programming the operation of the auxiliary functions in the signalling configurations of the operating mode and the idle mode.

32. A system as set forth in claim 29 wherein the actuations of switches when the system is in the programming mode are directed to the third group of switches for selecting the tones that may be enabled in at least one of the signalling configurations of the operating mode.

33. A signalling system as set forth in claim 25 including a switch mounted to the floor board area of the vehicle and a means associated with the control unit responsive to the switch for transferring the signalling system to one signalling configuration from another configuration or from the idle mode.

34. A signalling system as set forth in claim 25 wherein the control head also controls a two-way radio.

* * * * *